(12) United States Patent
Kim et al.

(10) Patent No.: US 12,007,681 B2
(45) Date of Patent: Jun. 11, 2024

(54) CAMERA ACTUATOR AND CAMERA MODULE INCLUDING SAME

(71) Applicant: LG INNOTEK CO., LTD., Seoul (KR)

(72) Inventors: Min Ook Kim, Seoul (KR); Kyung Won Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 40 days.

(21) Appl. No.: 17/921,834

(22) PCT Filed: Apr. 26, 2021

(86) PCT No.: PCT/KR2021/005253
§ 371 (c)(1),
(2) Date: Oct. 28, 2022

(87) PCT Pub. No.: WO2021/221410
PCT Pub. Date: Nov. 4, 2021

(65) Prior Publication Data
US 2023/0161227 A1    May 25, 2023

(30) Foreign Application Priority Data

Apr. 28, 2020 (KR) .................. 10-2020-0051569

(51) Int. Cl.
*G03B 5/00* (2021.01)
*G03B 13/36* (2021.01)

(52) U.S. Cl.
CPC ............... *G03B 5/00* (2013.01); *G03B 13/36* (2013.01); *G03B 2205/0061* (2013.01)

(58) Field of Classification Search
CPC .................. G03B 2205/0023; G03B 17/17
See application file for complete search history.

(56) References Cited

U.S. PATENT DOCUMENTS

| 9,081,203 | B2 | 7/2015 | Shin |
| 11,347,077 | B2 | 5/2022 | Son et al. |
| 11,487,081 | B2 * | 11/2022 | Lee .................. G03B 5/00 |

(Continued)

FOREIGN PATENT DOCUMENTS

| JP | 2007-047547 A | 2/2007 |
| KR | 10-0770866 B1 | 10/2007 |

(Continued)

*Primary Examiner* — Noam Reisner
(74) *Attorney, Agent, or Firm* — Birch, Stewart, Kolasch & Birch, LLP

(57) ABSTRACT

A camera actuator according to an embodiment includes a housing; a prism unit disposed in the housing; a first driving unit disposed in the housing and controlling a tilt of the prism unit; and a second driving unit disposed under the housing and controlling a tilt of the housing, wherein the first driving unit includes a first piezoelectric device disposed in a region overlapping a center of the prism unit in a first direction, wherein the second driving unit includes a second piezoelectric device disposed in a region overlapping the center of the prism unit in a second direction different from the first direction, wherein the prism unit is provided to be tiltable in the second direction by the first driving unit, and wherein the housing is provided to be tiltable in the first direction by the second driving unit.

19 Claims, 37 Drawing Sheets

(56) References Cited

U.S. PATENT DOCUMENTS

| | | |
|---|---|---|
| 2007/0035631 A1 | 2/2007 | Ueda |
| 2007/0280667 A1 | 12/2007 | Shin |
| 2009/0122406 A1* | 5/2009 | Rouvinen ............ H04N 23/687 |
| | | 359/555 |
| 2010/0091392 A1 | 4/2010 | Jung et al. |
| 2015/0002683 A1* | 1/2015 | Hu ......................... G03B 17/17 |
| | | 348/208.11 |
| 2020/0257132 A1* | 8/2020 | Im ............................ G02B 7/08 |

FOREIGN PATENT DOCUMENTS

| | | |
|---|---|---|
| KR | 10-2010-0042020 A | 4/2010 |
| KR | 10-1509256 B1 | 4/2015 |
| KR | 10-2019-0101104 A | 8/2019 |
| KR | 10-2019-0139574 A | 12/2019 |

* cited by examiner

[FIG. 1]
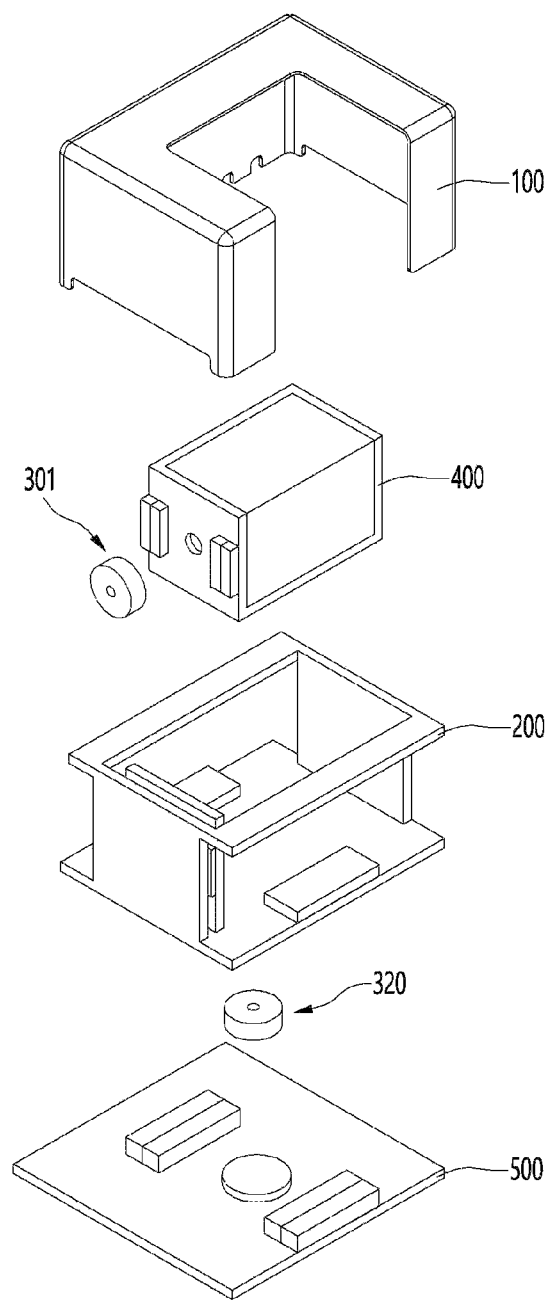

[FIG. 2]
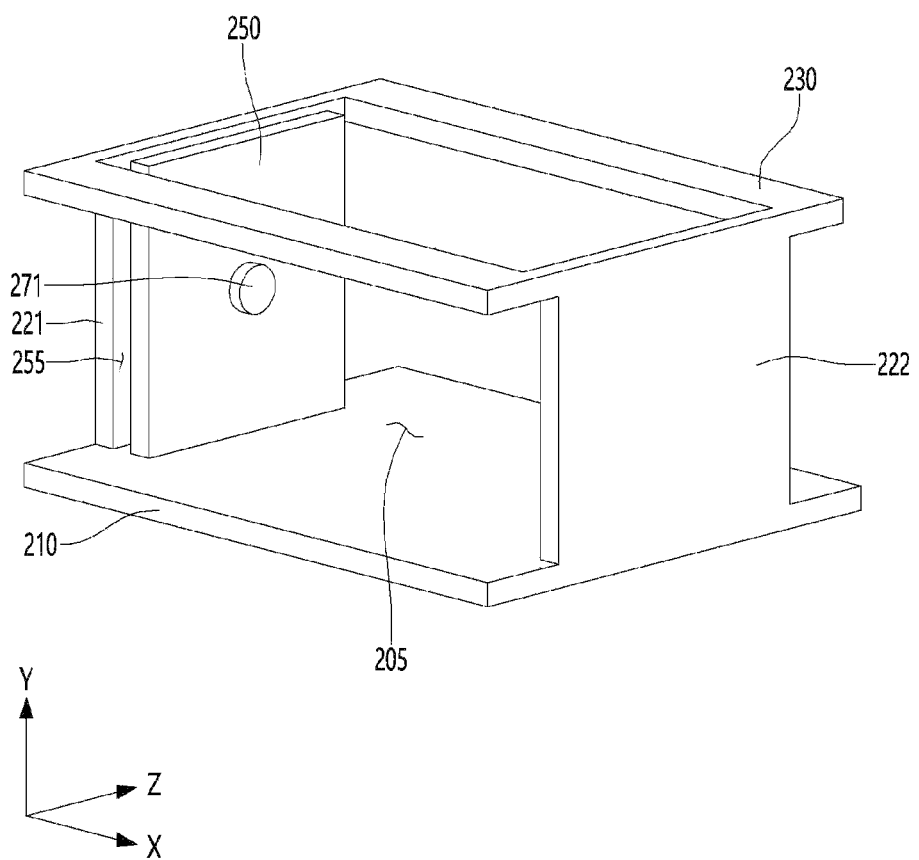

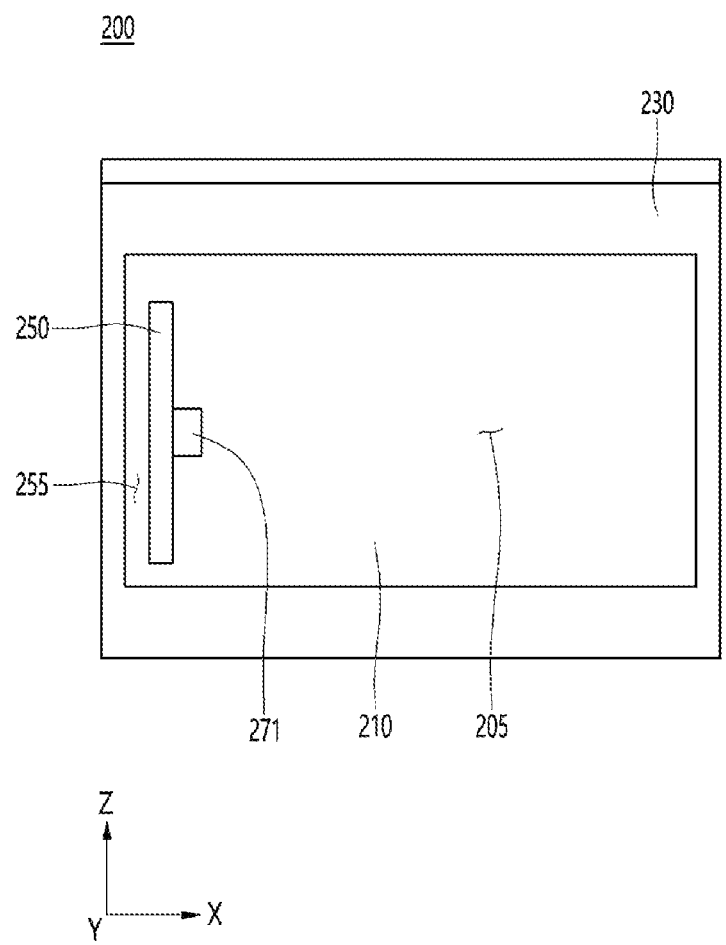
[FIG. 3]

【FIG. 4】
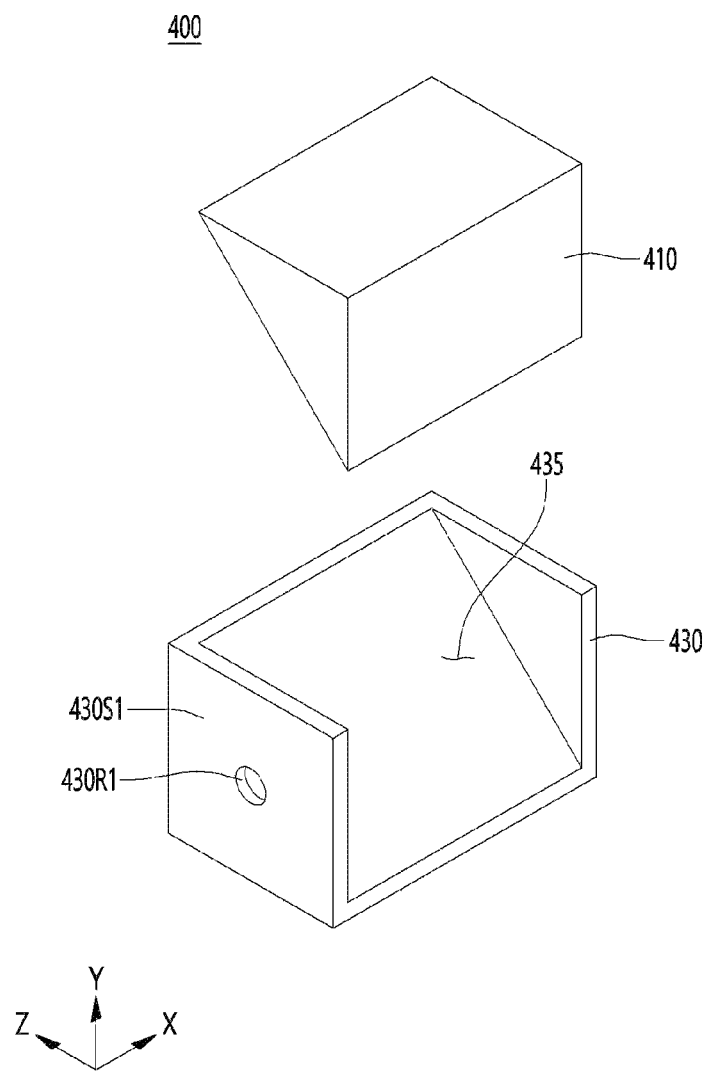

[FIG. 5]
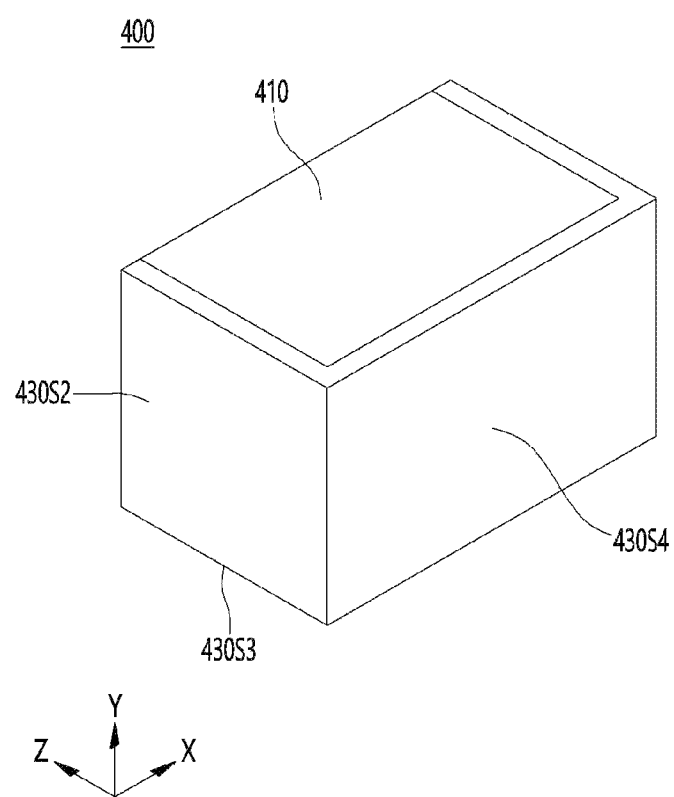

[FIG. 6]
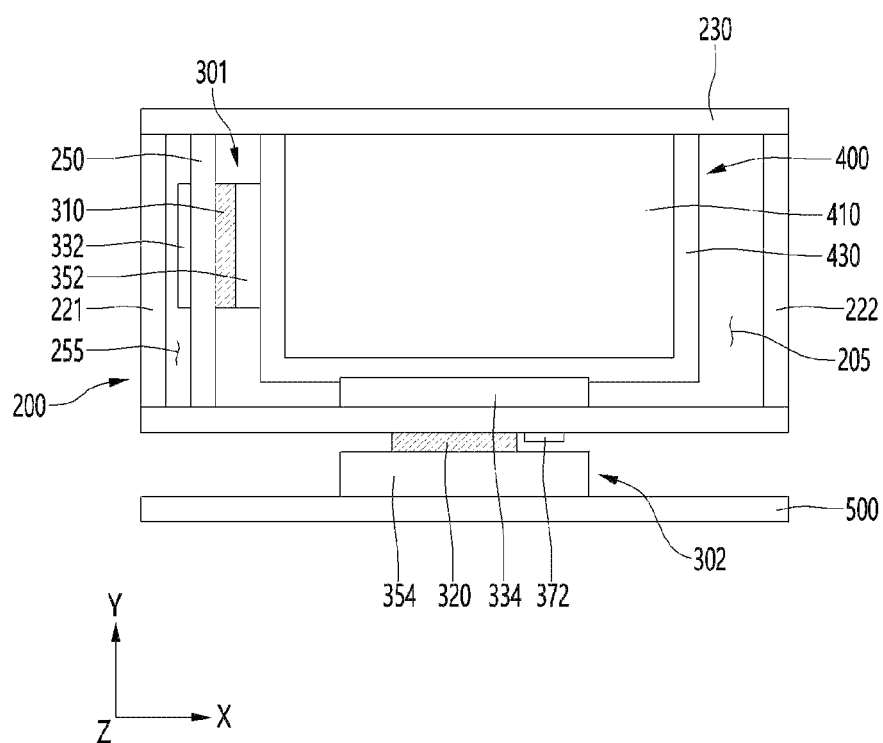

[FIG. 7]
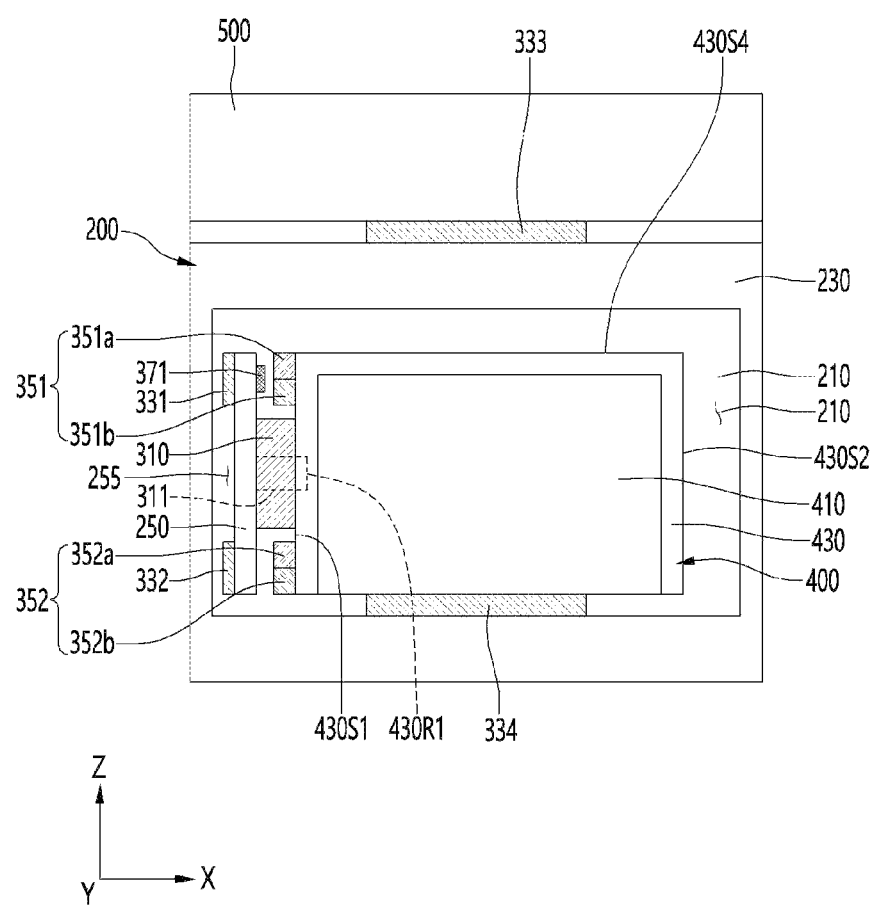

[FIG. 8]
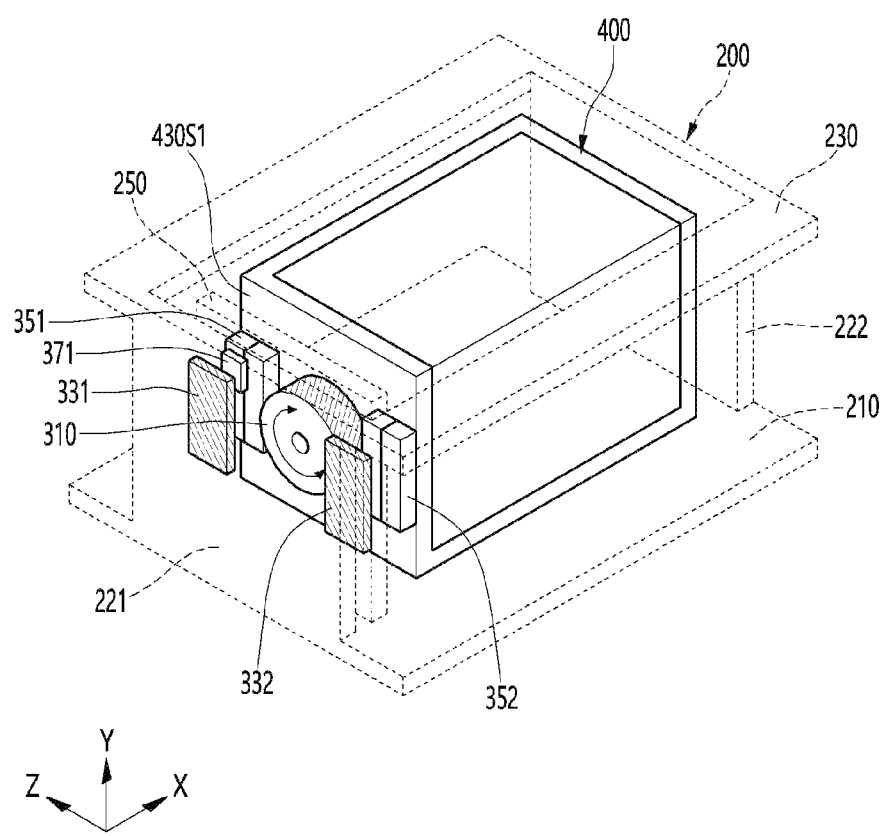

[FIG. 9]
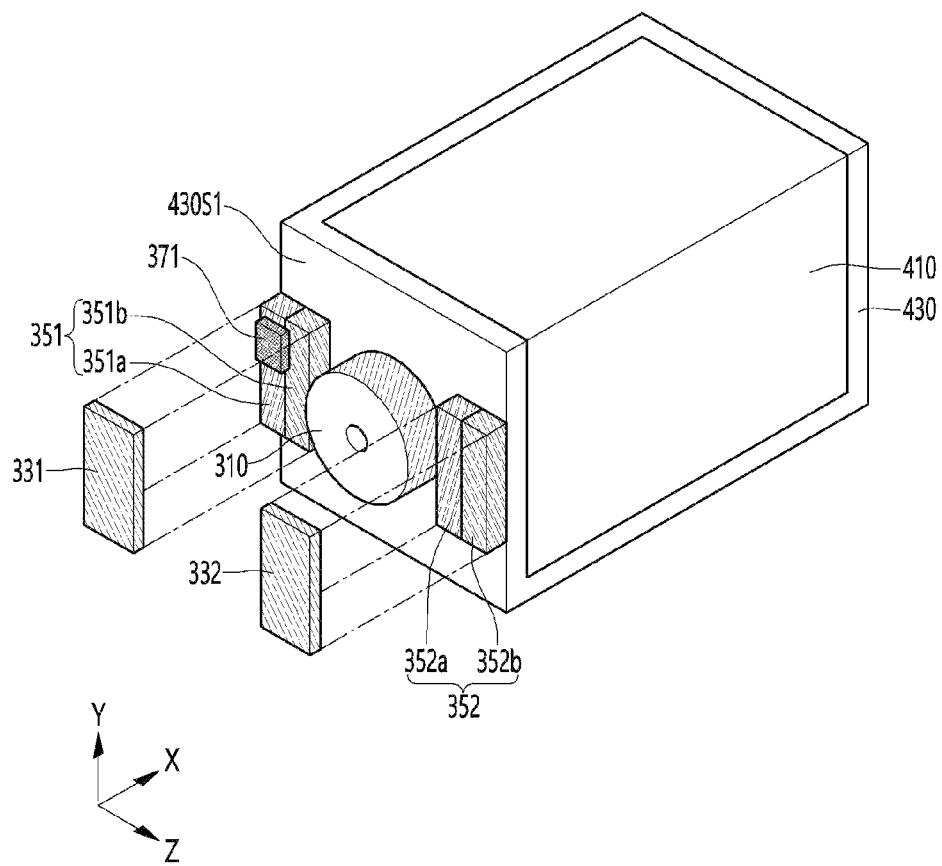

[FIG. 10]
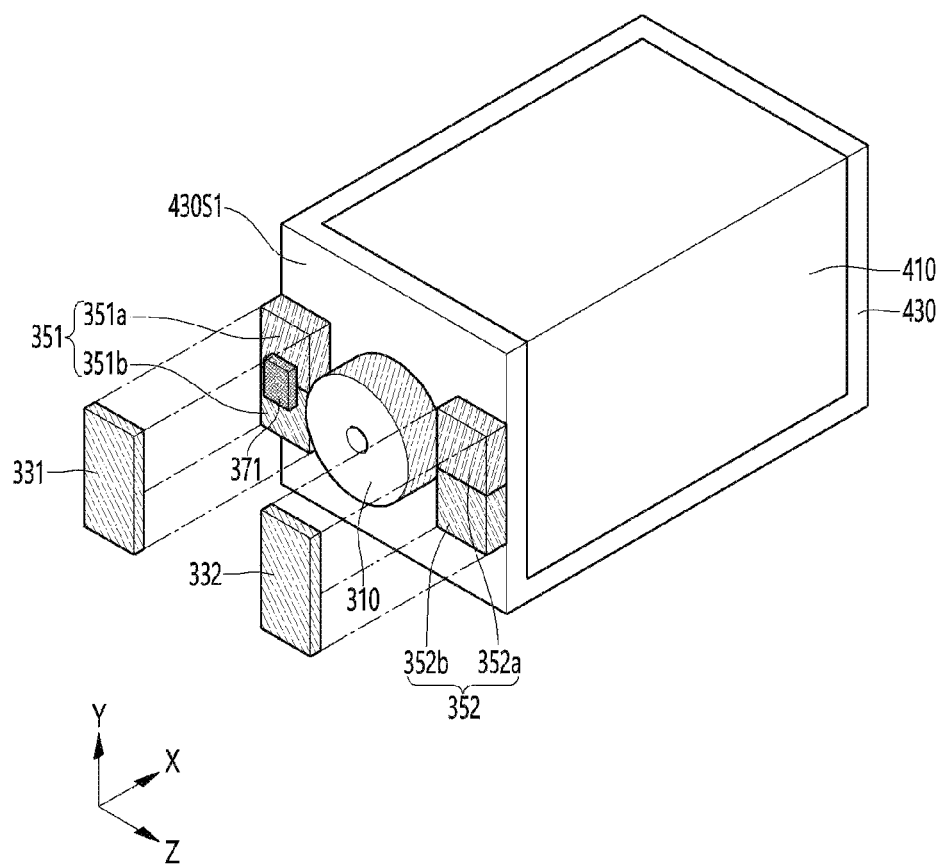

[FIG. 11]
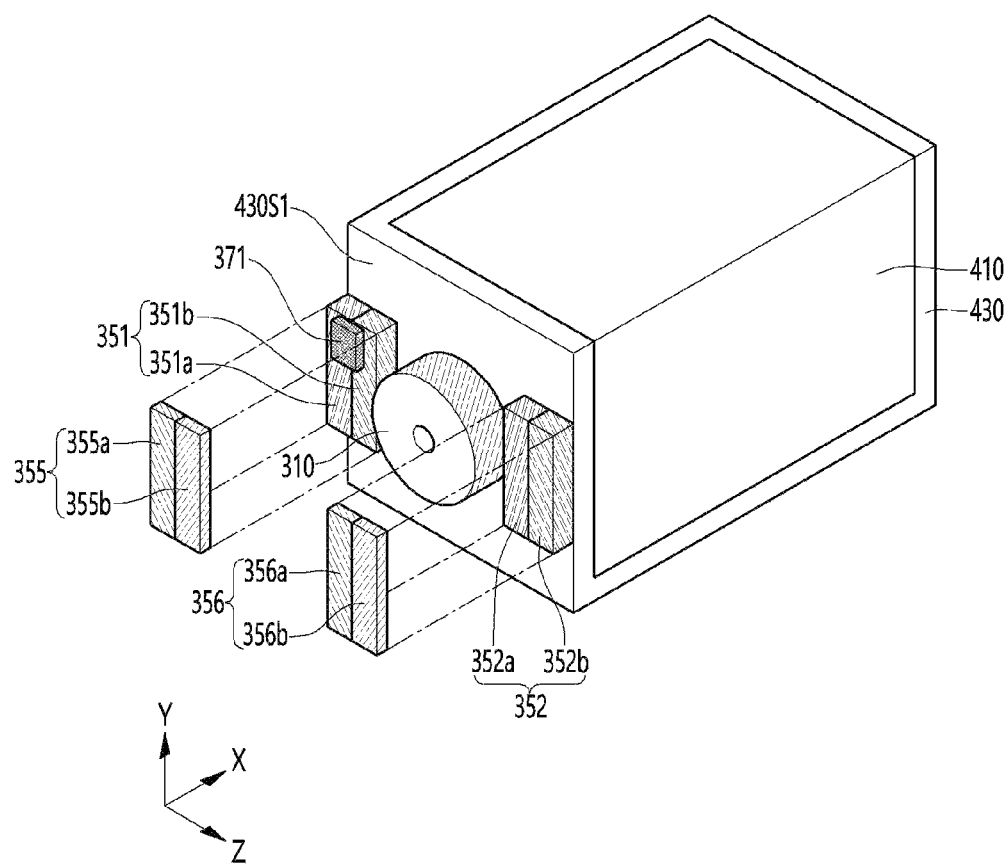

[FIG. 12]
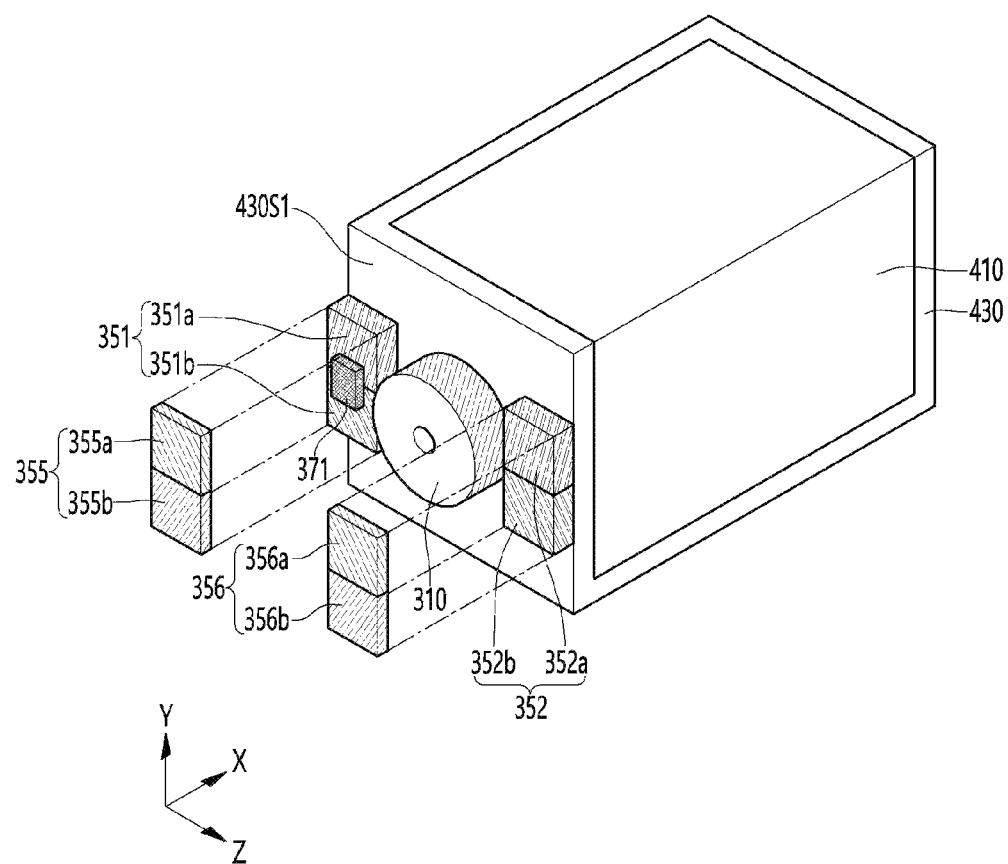

【FIG. 13】
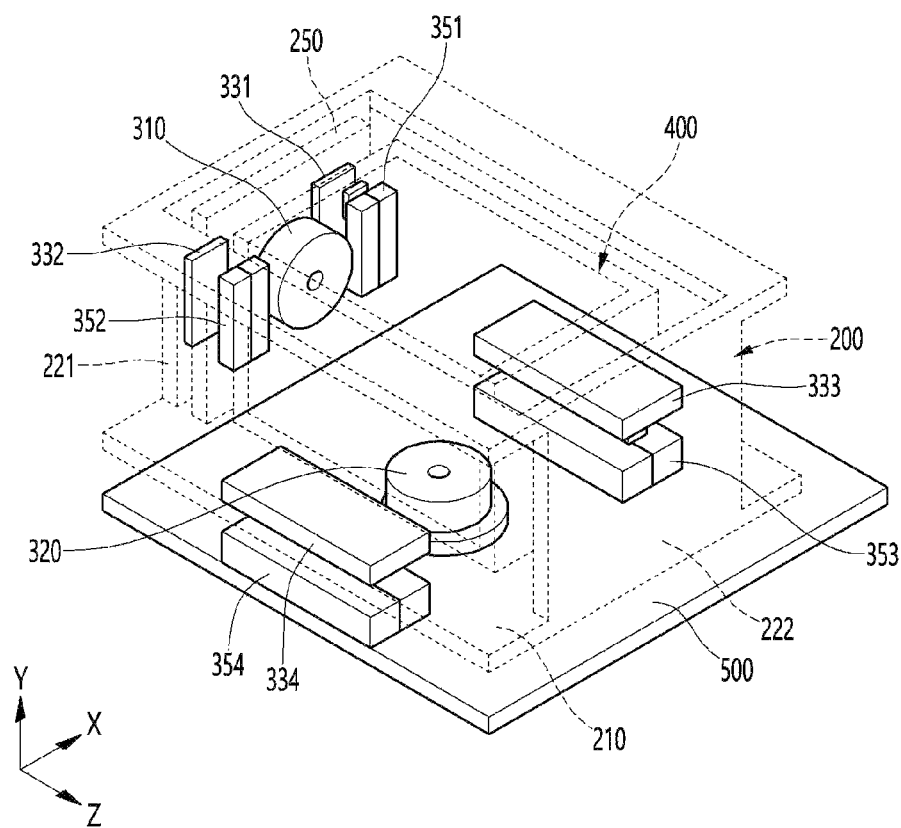

[FIG. 14]
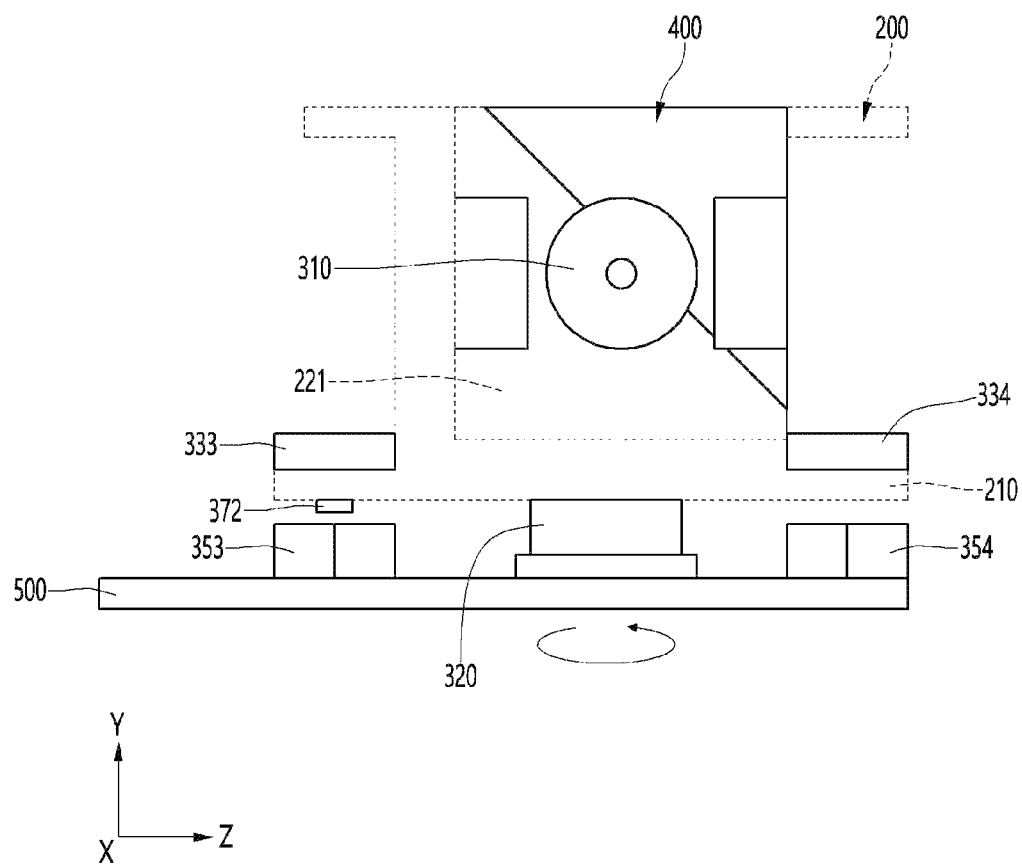

[FIG. 15]
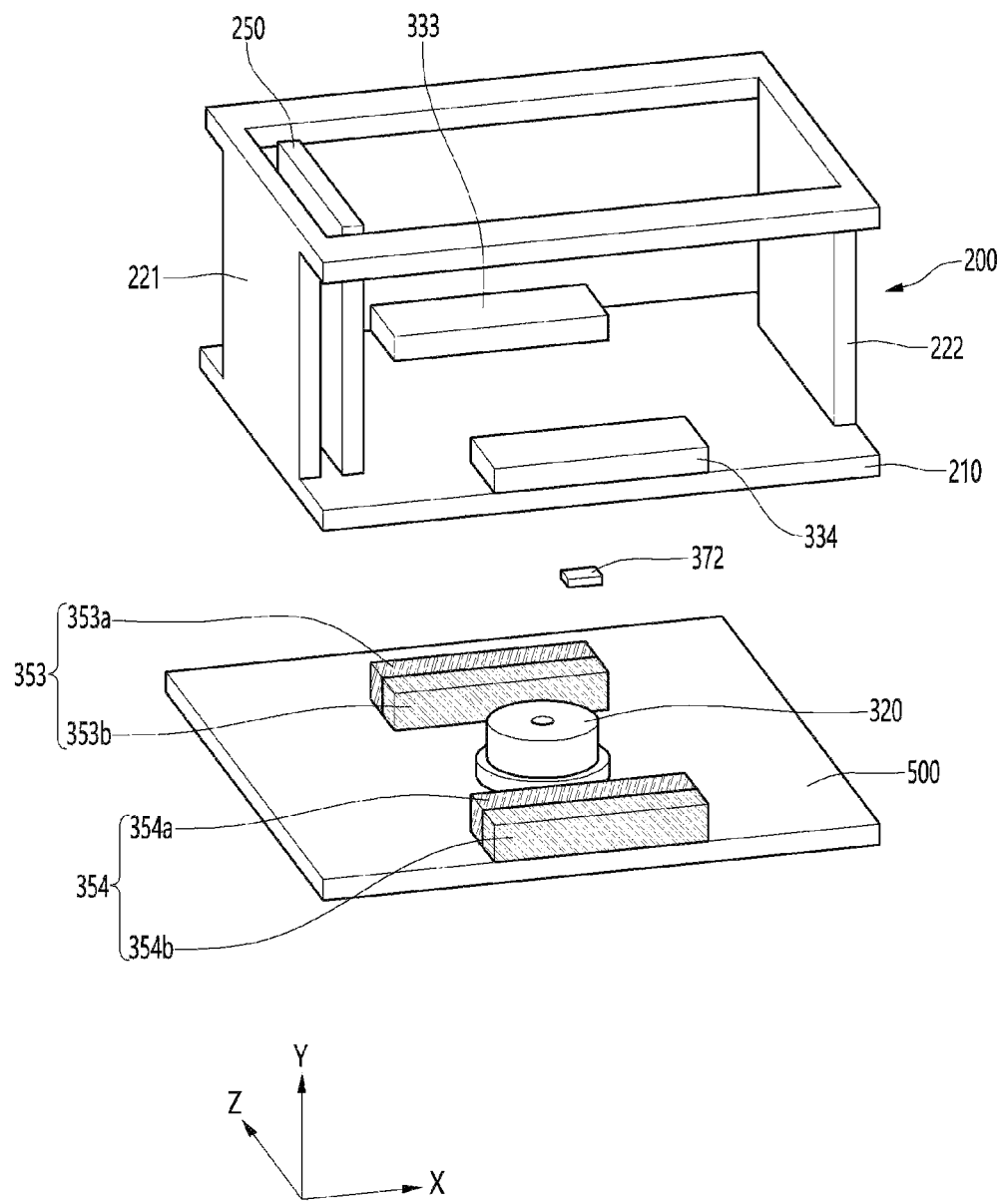

[FIG. 16]
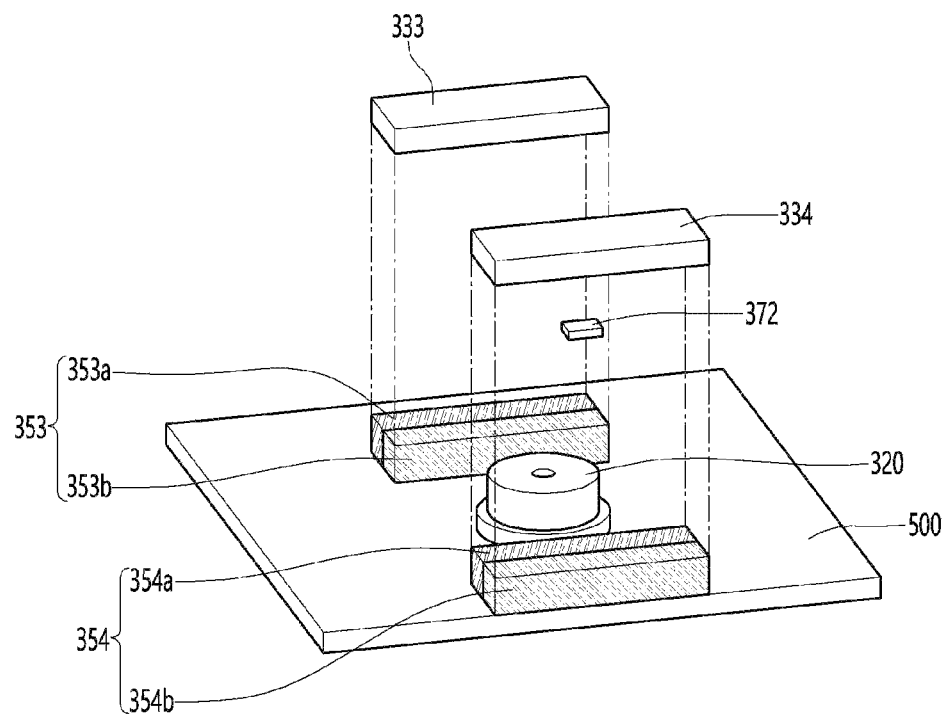

[FIG. 17]
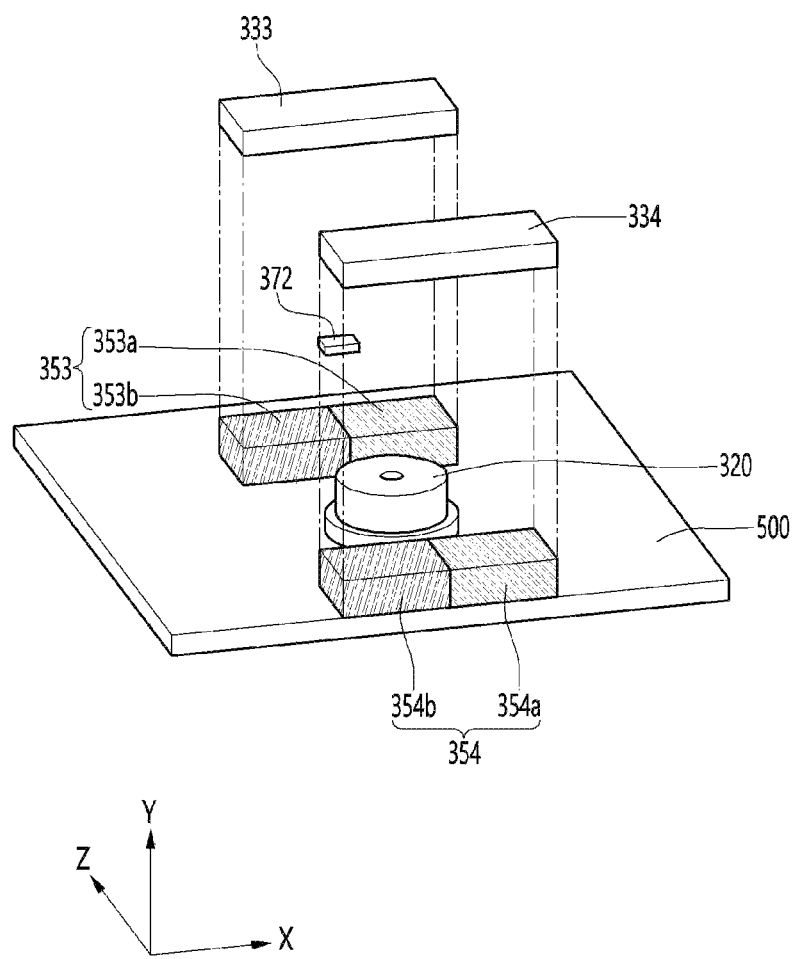

[FIG. 18]
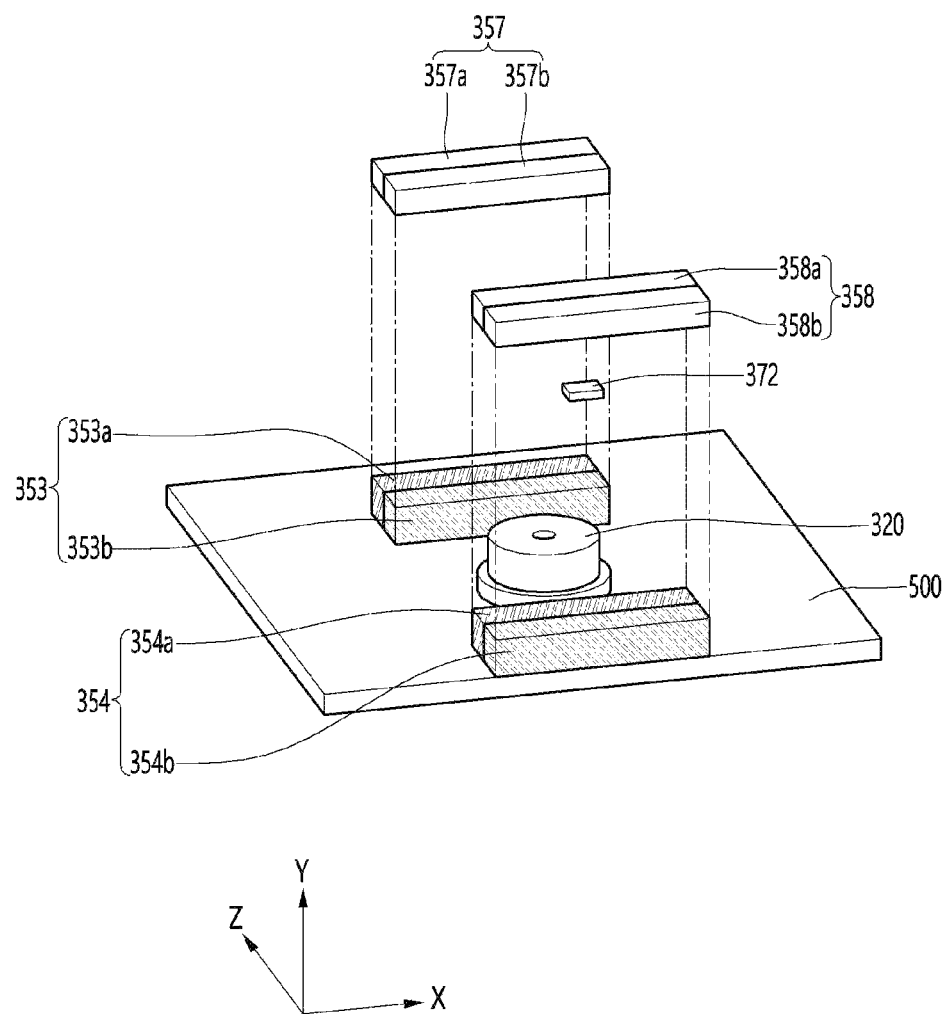

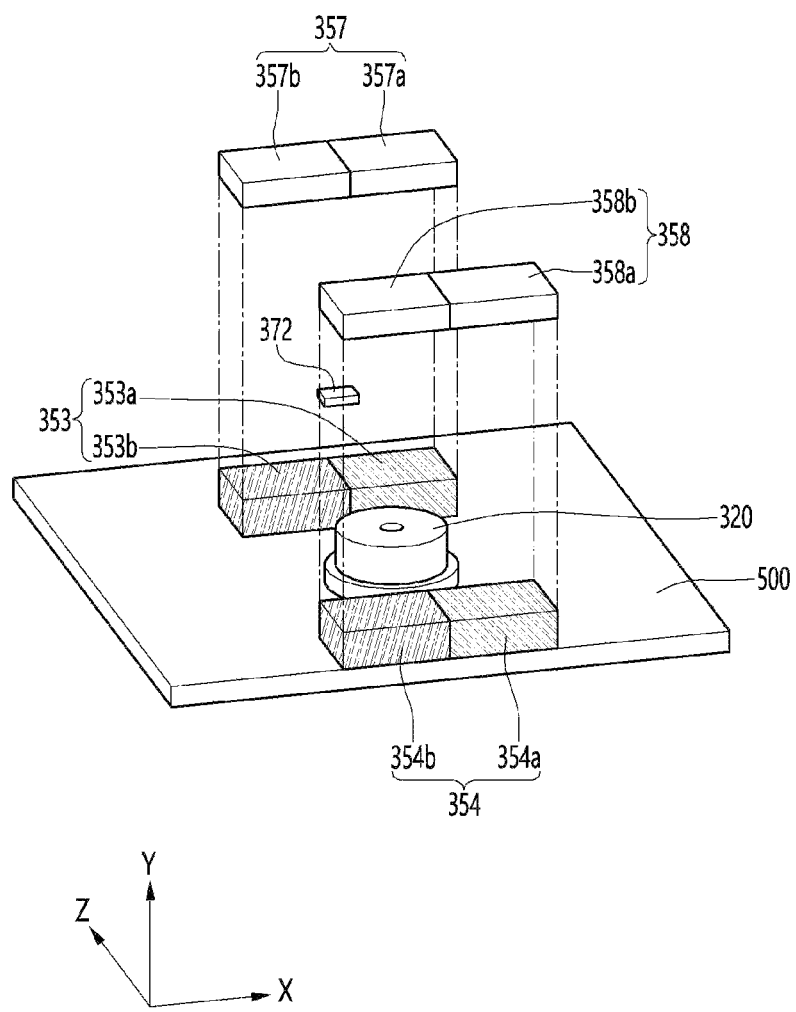
[FIG. 19]

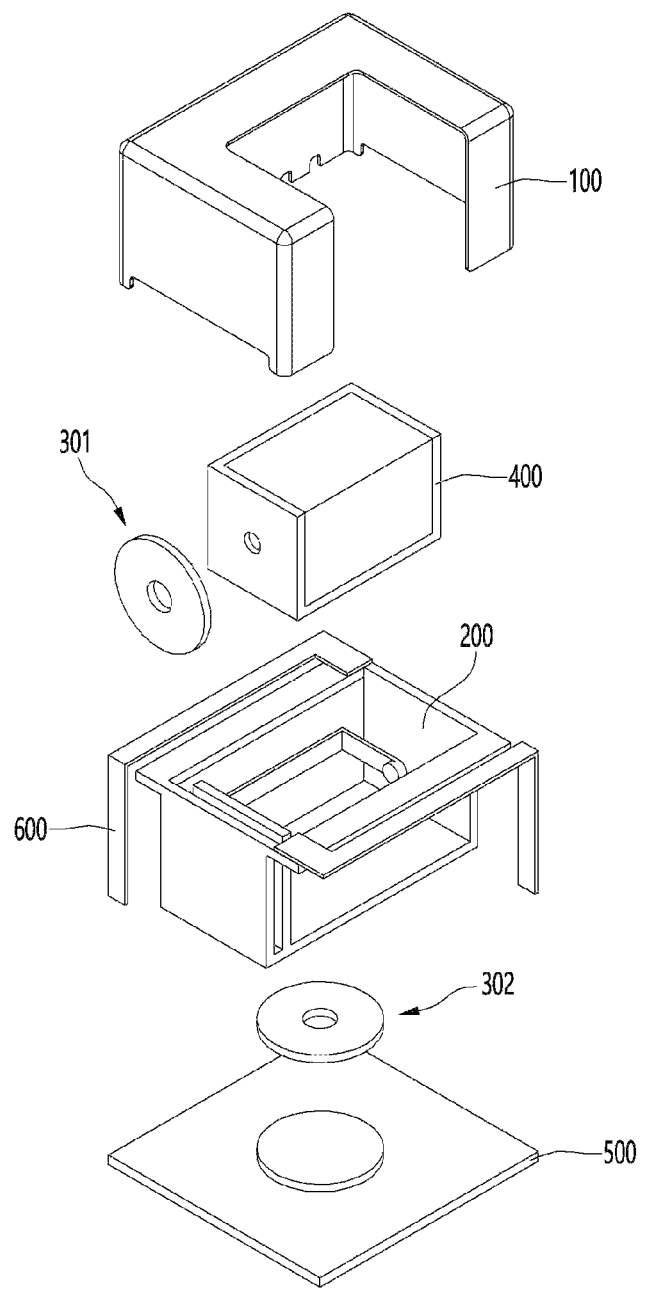
[FIG. 20]

【FIG. 21】
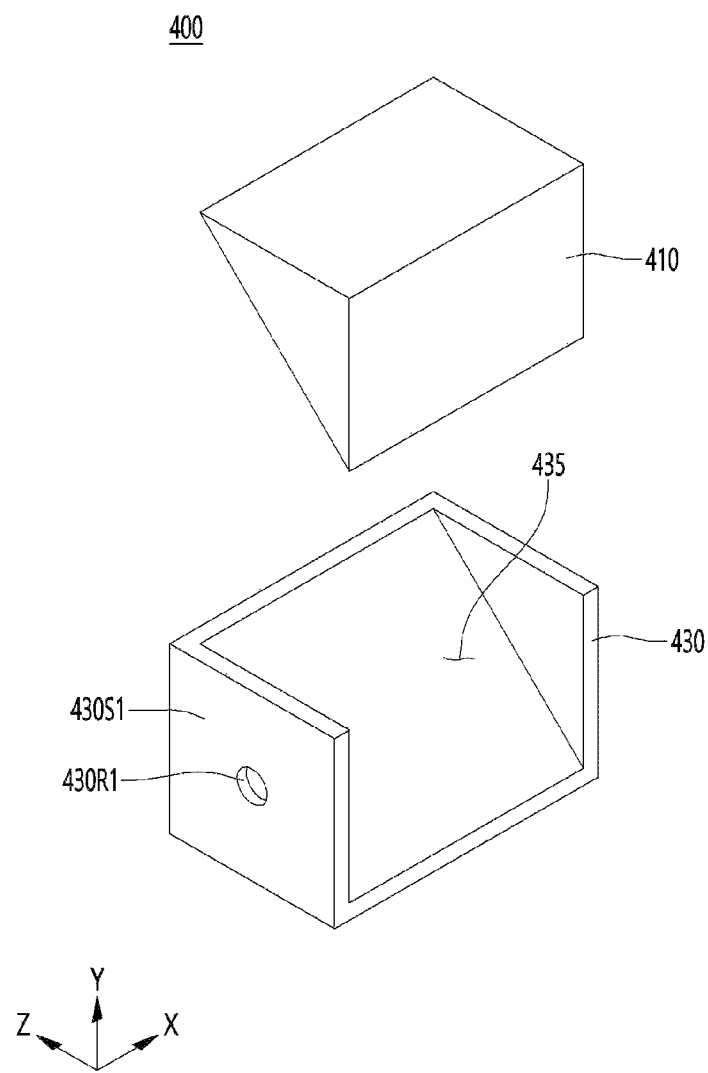

[FIG. 22]
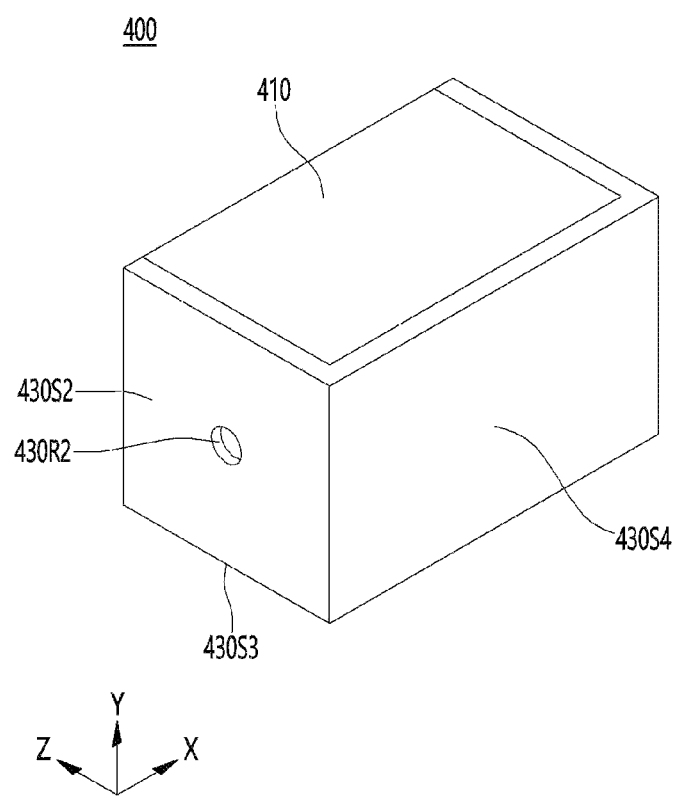

[FIG. 23]
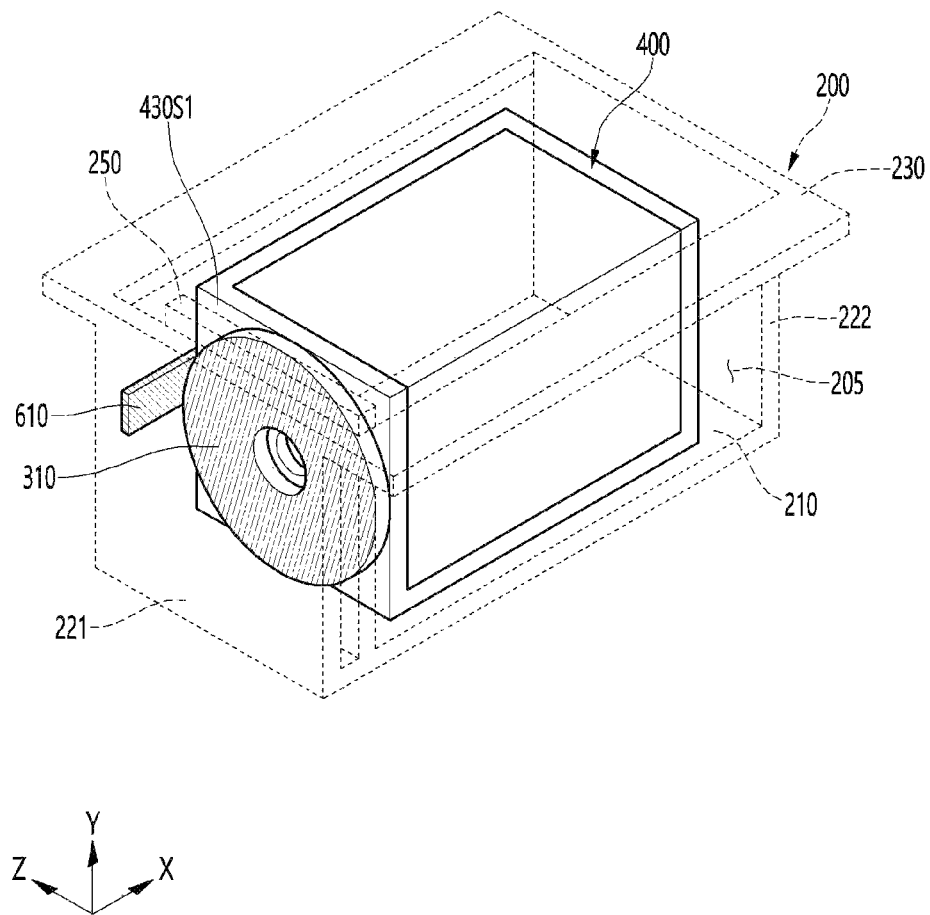

[FIG. 24]
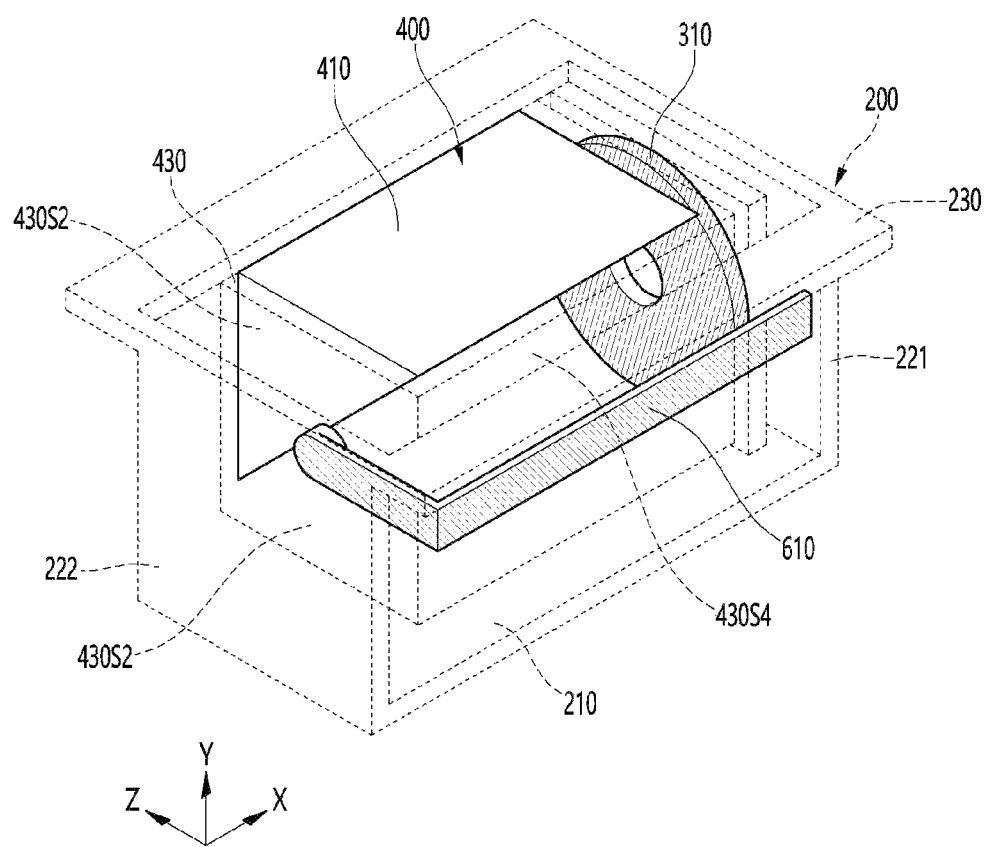

[FIG. 25]
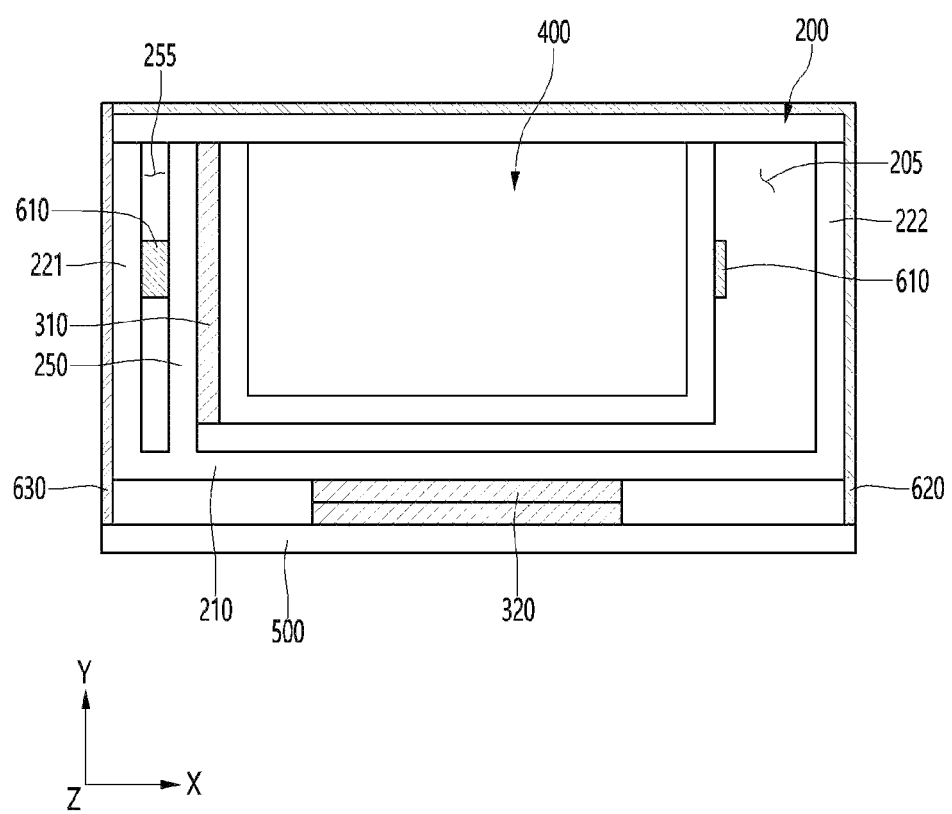

[FIG. 26]
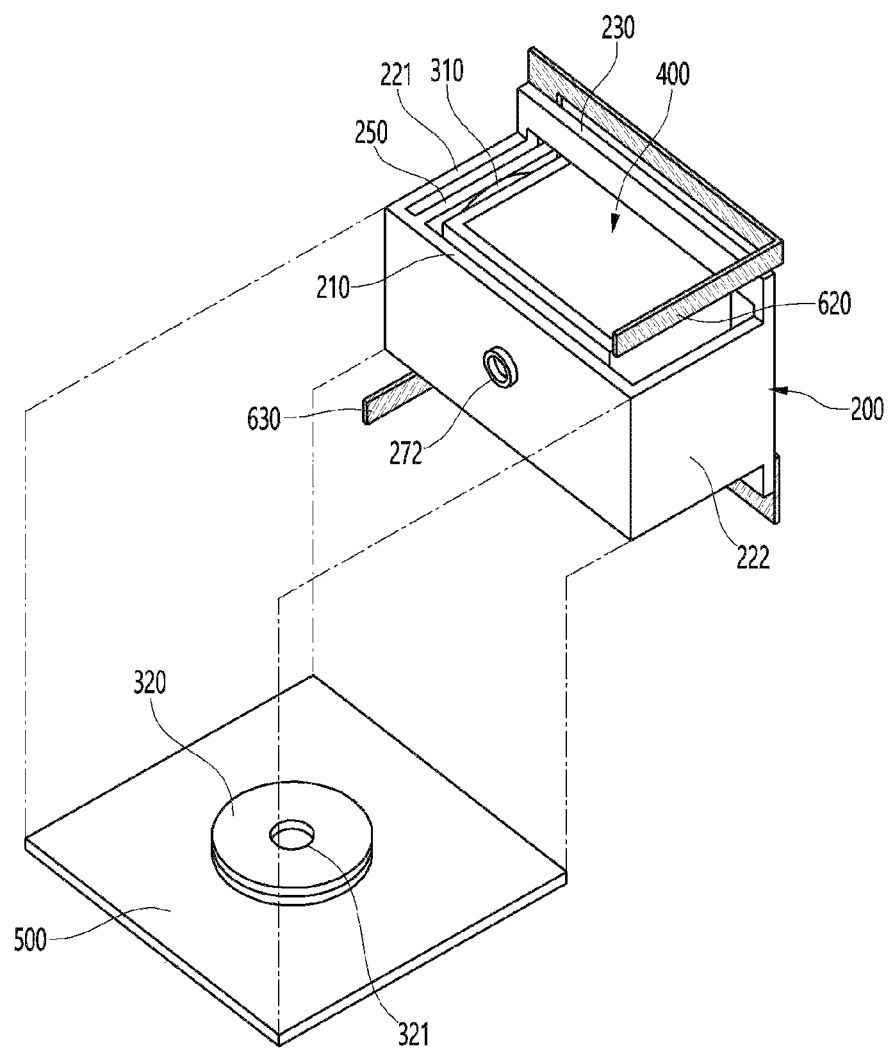

[FIG. 27]
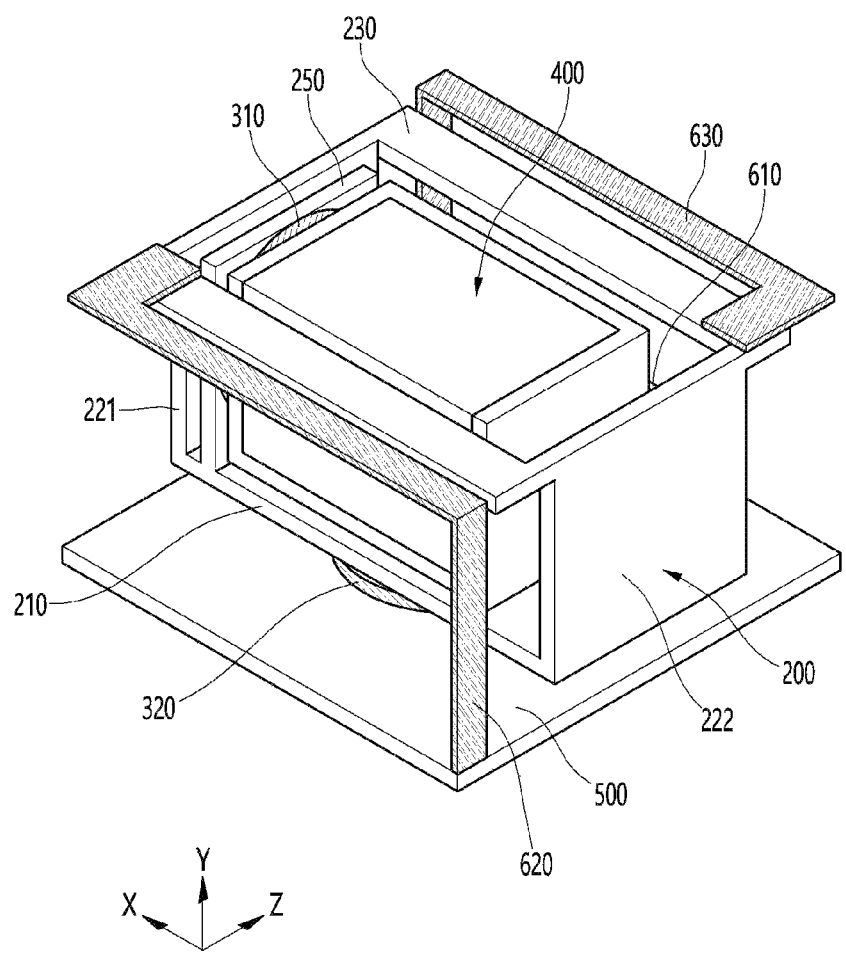

[FIG. 28]
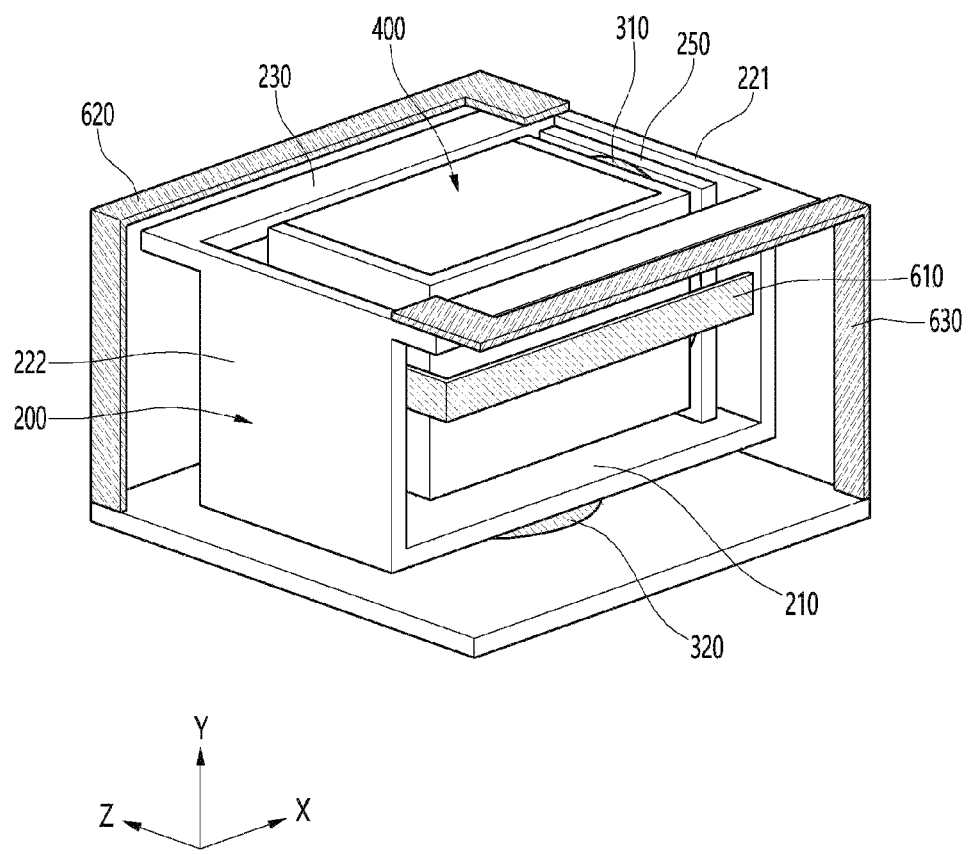

[FIG. 29]
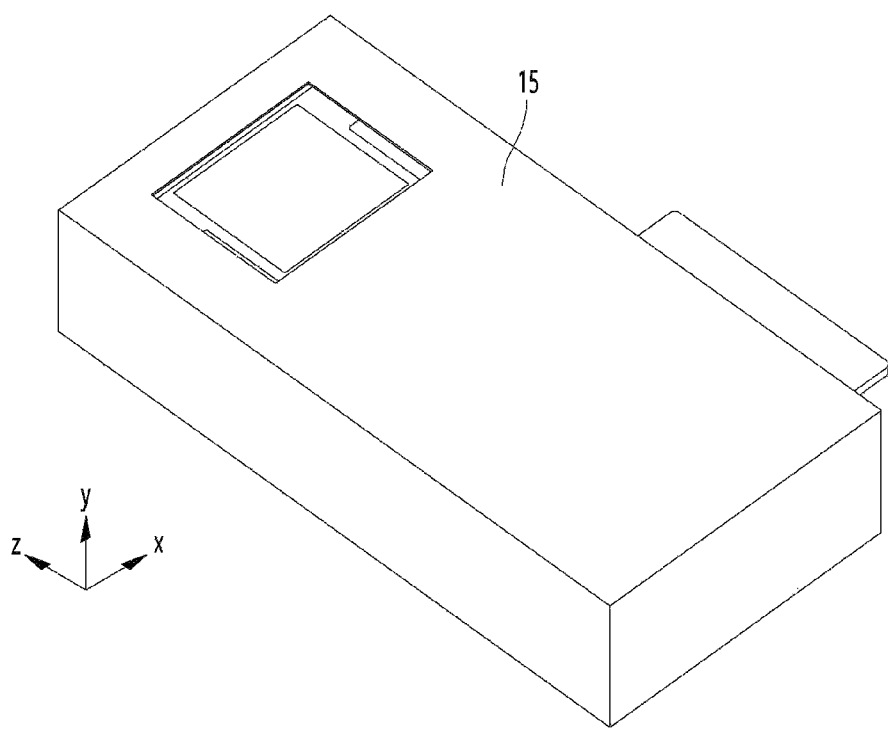

[FIG. 30]
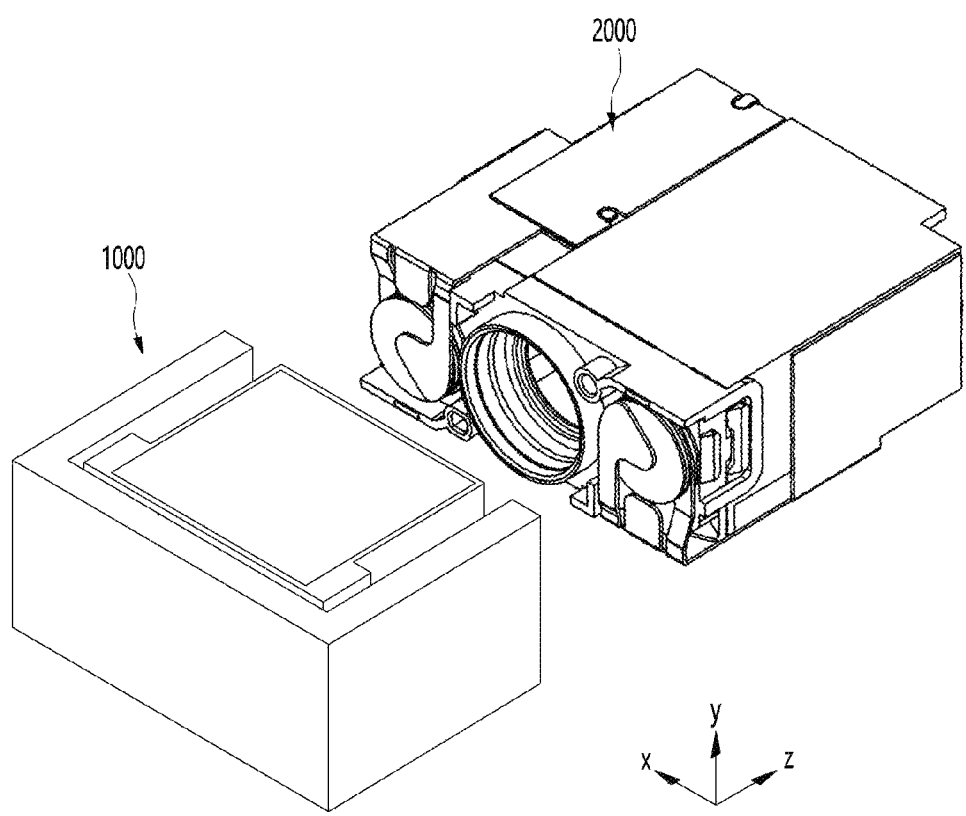

[FIG. 31]
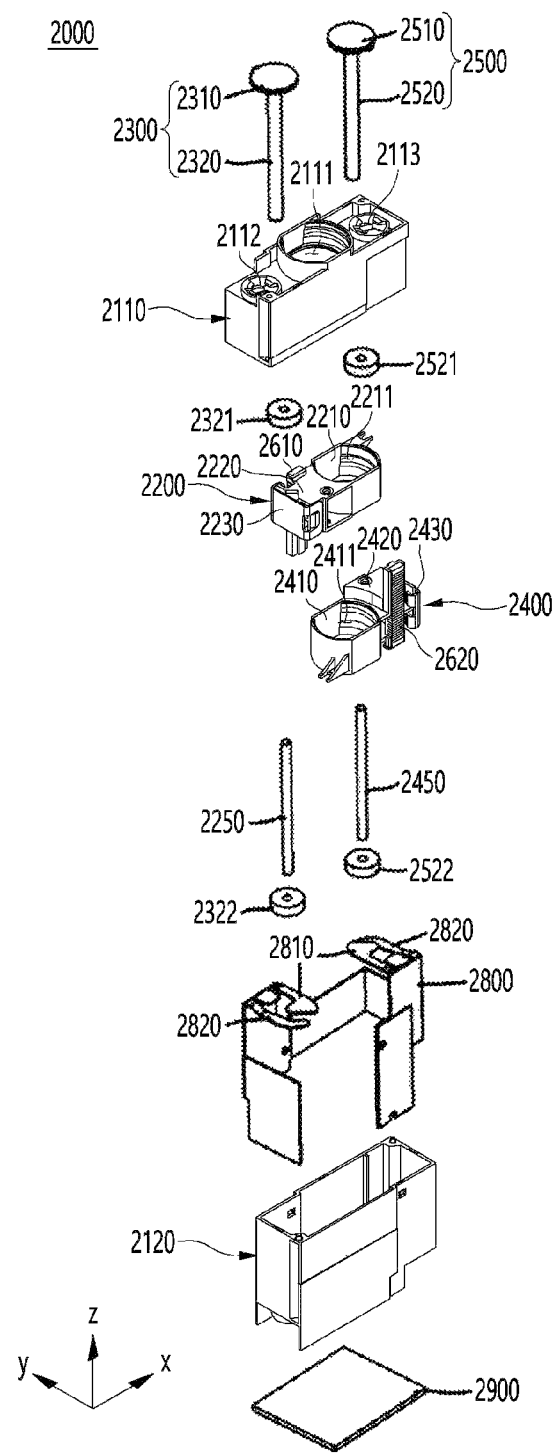

[FIG. 32]
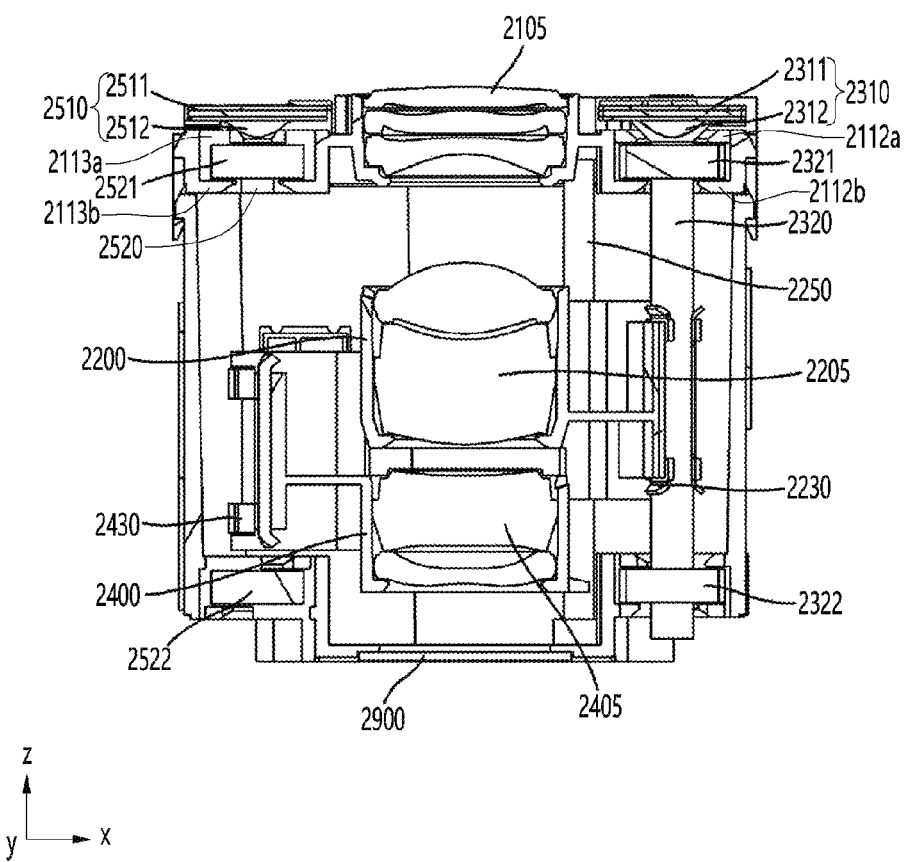

[FIG. 33]
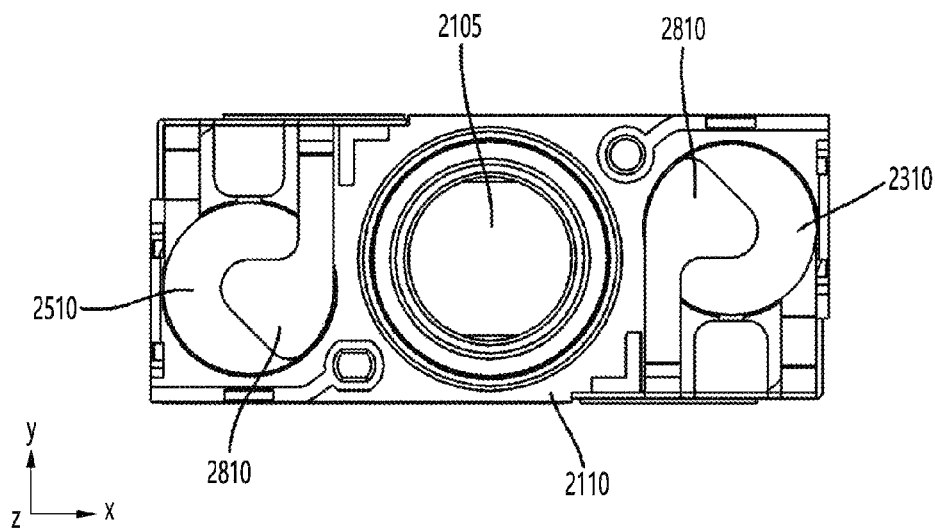
[FIG. 34]
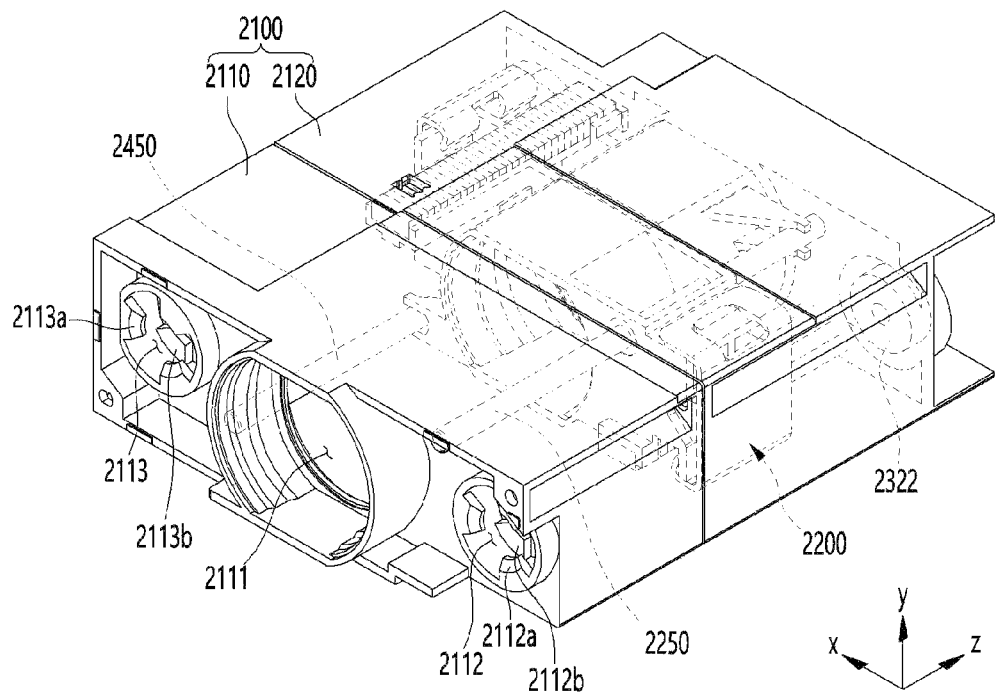

[FIG. 35]
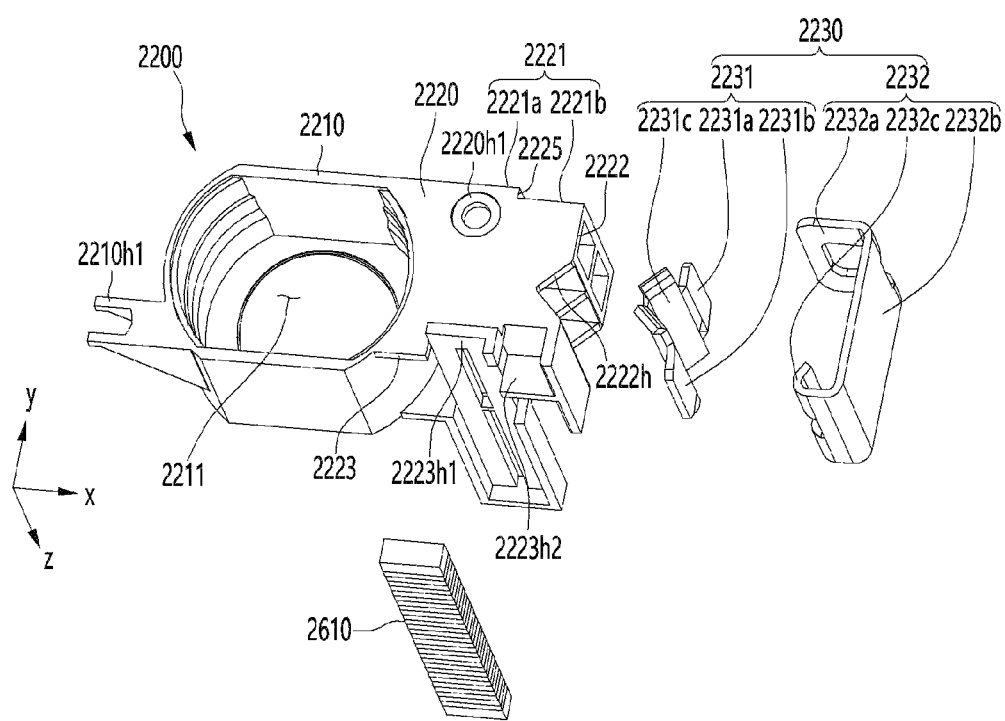

[FIG. 36]
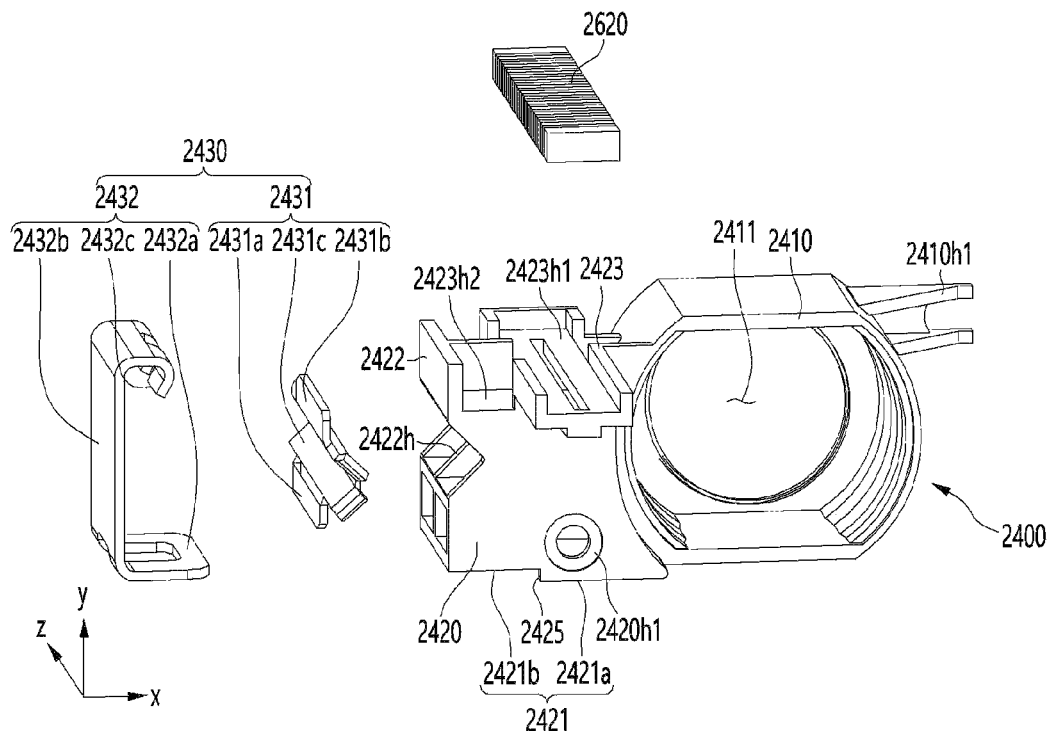
[FIG. 37]
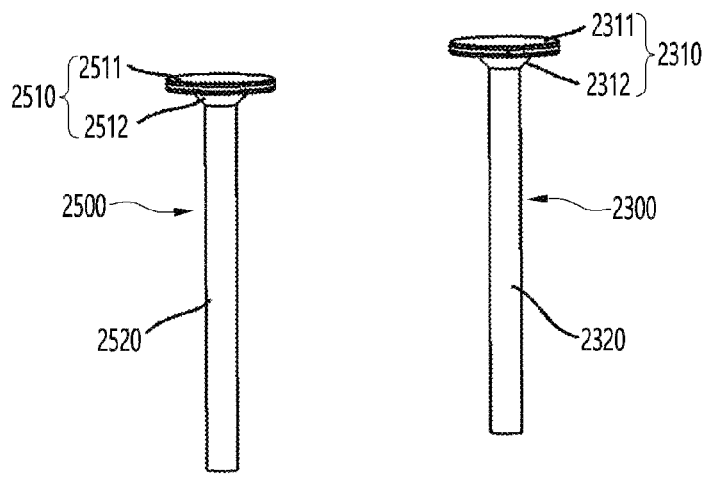

[FIG. 38]
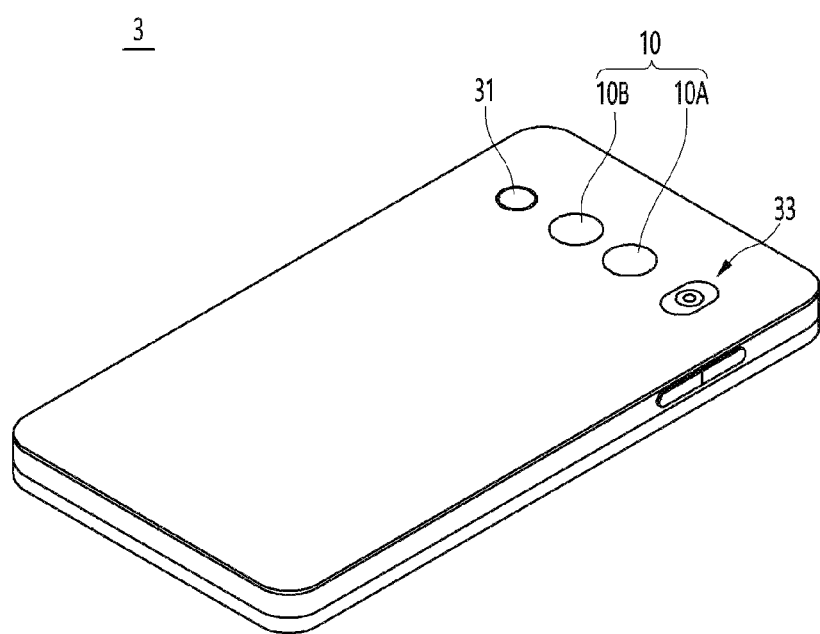

[FIG. 39]
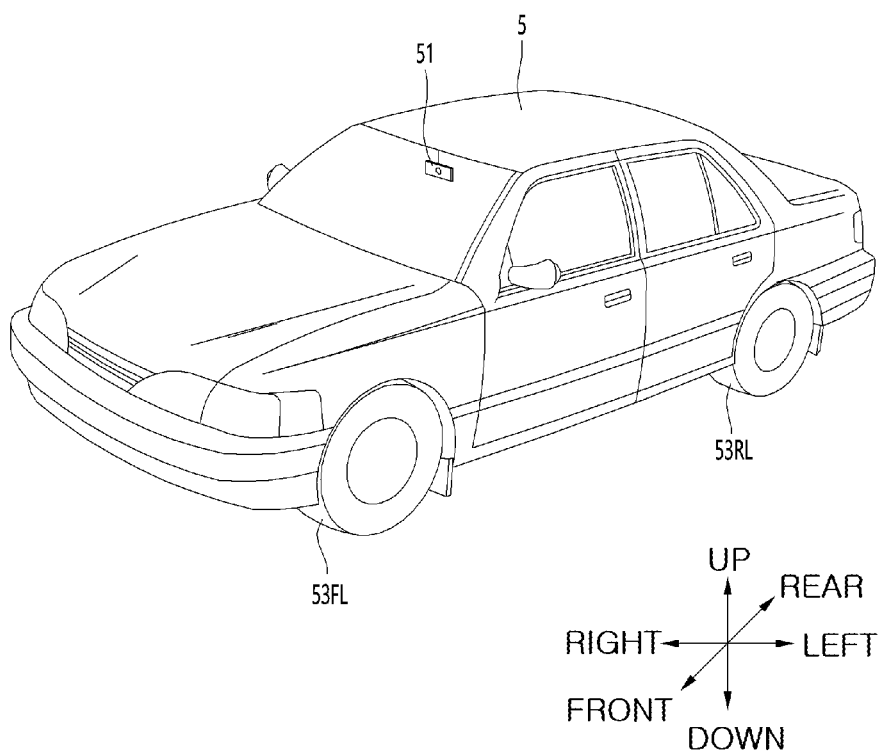

CAMERA ACTUATOR AND CAMERA MODULE INCLUDING SAME

CROSS REFERENCE TO RELATED APPLICATIONS

This application is the National Phase of PCT International Application No. PCT/KR2021/005253, filed on Apr. 26, 2021, which claims priority under 35 U.S.C. 119(a) to Patent Application No. 10-2020-0051569, filed on Apr. 28, 2020 in the Republic of Korea, all of which are hereby expressly incorporated by reference into the present application.

TECHNICAL FIELD

An embodiment relates to a camera actuator and a camera module.

BACKGROUND ART

A camera module captures a subject and stores it as an image or video, and is installed in various devices such as mobile terminals such as cell phones, laptops, drones, and vehicles.

In general, the device described above is equipped with a miniature camera module, and the camera module can perform an autofocus (AF) function of automatically adjusting the distance between the image sensor and the lens to align the focal lengths of the lenses. In addition, the camera module may perform a zooming function of zooming up or zooming out by increasing or decreasing the magnification of a distant subject through a zoom lens.

Meanwhile, a zoom actuator is used for a zooming function in the camera module. However, friction torque is generated when the lens is moved due to the mechanical movement of the actuator, and problems such as a decrease in driving force, an increase in power consumption, and a decrease in control characteristics occur due to the friction torque.

In particular, in order to derive the optical properties, not only alignment between a plurality of lens groups but also alignment of a plurality of lens groups with the image sensor must be well matched. However, when the center of the spherical surface between the lens groups deviates from the optical axis, tilt, which is a lens inclination phenomenon, or a phenomenon that the central axis of the lens group and the image sensor is not aligned, there is a problem in that the image quality or resolution is deteriorated because the angle of view is changed or the focus is out of focus.

In addition, when increasing the separation distance in a region where friction is generated to reduce friction torque resistance when moving the lens for the zoom function in the camera module, there is a technical problem in that a lens decent or a lens tilt is deepened when the zoom movement or the zoom movement is reversed.

In addition, recent camera modules employ image stabilization (IS) technology to correct or prevent image stabilization due to camera movement caused by an unstable fixing device or a user's movement.

Such image stabilization (IS) technology includes an optical image stabilizer (OIS) technology and an image stabilization prevention technology using an image sensor. Here, OIS technology is a technology that corrects motion by changing the path of light, and the image stabilization prevention technology using the image sensor is a technology that compensates for motion in both mechanical and electronic ways, and recently, OIS technology is being adopted more and more.

Meanwhile, the camera module may include a reflective member, a driving unit, etc. that can change the path of light to implement the OIS function. In detail, the camera module may change the path of light by controlling the position of the reflective member with the driving force applied from the driving unit. The position of the reflective member may be controlled by using a VCM (Voice Coil Motor) type driving unit including a coil, a magnet, etc. as the driving unit.

However, in the case of the above method, a support part such as a ball bearing and a guide rail for supporting the reflective member is additionally required and thus takes up a lot of volume, which limits implementation in a small size.

In addition, in the case of the above method, there is a problem in that accuracy deviation occurs due to problems such as noise and sync generated during driving, and there is a problem in that it is difficult to finely control the position of the reflective member.

Due to this, the optical characteristics of the camera module may be deteriorated, and there is a problem that the effect according to the OIS operation is insignificant.

Therefore, a new camera module capable of solving the above problems is required.

DISCLOSURE

Technical Problem

An embodiment provides a camera actuator and a camera module having improved optical properties.

In addition, the embodiment provides a camera actuator and a camera module that can effectively control the vibration generated by hand shake.

In addition, the embodiment provides a camera actuator and a camera module that can be implemented in a compact size having a small volume.

In addition, the embodiment provides a camera actuator and a camera module having improved autofocus and high magnification zoom functions.

In addition, the embodiment provides a camera actuator and a camera module capable of preventing problems such as de-centering, tilting, friction, etc. occurring when the lens group is moved.

Technical Solution

A camera actuator according to an embodiment includes a housing; a prism unit disposed in the housing; a first driving unit disposed in the housing and controlling a tilt of the prism unit; and a second driving unit disposed under the housing and controlling a tilt of the housing, wherein the first driving unit includes a first piezoelectric device disposed in a region overlapping a center of the prism unit in a first direction, wherein the second driving unit includes a second piezoelectric device disposed in a region overlapping the center of the prism unit in a second direction different from the first direction, wherein the prism unit is provided to be tiltable in the second direction by the first driving unit, and wherein the housing is provided to be tiltable in the first direction by the second driving unit.

In addition, the housing includes a lower part; first and second side parts extending upwardly on the lower part and facing each other; and an upper part disposed on the first and second side parts and connecting the first and second side parts; and wherein the first piezoelectric device is disposed between the first side part and a first outer surface of the prism unit.

In addition, the housing further includes a partition wall disposed between the first side part and the prism unit, wherein the first piezoelectric device is disposed between the partition wall and the first outer surface.

In addition, the first driving unit includes: a first yoke disposed between the first side part and the partition wall; and a first magnet disposed between the partition wall and the first outer surface, wherein the first yoke and the first magnet are disposed in a region that does not overlap the first piezoelectric device in the first direction, and wherein the prism unit is pressed in a direction toward of the partition wall by an attractive force of the first yoke and the first magnet.

In addition, the first driving unit further includes: a second yoke disposed between the first side part and the partition wall; and a second magnet disposed between the partition wall and the first outer surface, and wherein the first piezoelectric device is disposed between the first and second magnets.

In addition, the first magnet includes a first-first magnet having a first polarity; and a first-second magnet having a second polarity opposite to the first polarity, wherein the first-first magnet is disposed on the first-second magnet.

In addition, the camera actuator further includes a first sensing unit disposed between the first magnet and the first yoke, and wherein the first sensing unit is disposed in a region corresponding to a boundary of the first-first and first-second magnets.

In addition, the camera actuator further includes a base member disposed under the housing, and wherein the second piezoelectric device is disposed between the housing and the base member.

In addition, the second driving unit includes: a third yoke disposed on the housing; and a third magnet disposed between the housing and the base member, wherein the third yoke and the third magnet are disposed in a region that does not overlap the second piezoelectric device in the second direction, and wherein the housing is pressed in a direction toward of the base member by an attractive force of the third yoke and the third magnet.

In addition, the second driving unit further includes a fourth yoke disposed on the housing and spaced apart from the third yoke, and a fourth magnet disposed between the housing and the base member, and wherein the second piezoelectric device is disposed between the third and fourth magnets.

In addition, the camera actuator further includes a second sensing unit disposed between the third magnet and the third yoke.

In addition, the first piezoelectric device is in direct contact with the prism unit, and the second piezoelectric device is in direct contact with the housing.

In addition, the first driving unit includes a first elastic member for pressing the prism unit in a direction toward of the first piezoelectric device.

In addition, the second driving unit includes a second elastic member for pressing the housing in a direction toward of the second piezoelectric device.

In addition, the camera actuator further includes a first guide protrusion disposed on one side of the partition wall and having a shape protruding toward the prism unit, and wherein the first guide protrusion is disposed in a region overlapping the center of the prism unit in the first direction.

In addition, the camera actuator further includes a second guide protrusion disposed on the lower part of the housing and having a shape protruding toward the base member, wherein the second guide protrusion is disposed in a region overlapping the center of the prism unit in the second direction.

In addition, a camera module according to an embodiment includes a first camera actuator and a second camera actuator, wherein the first camera actuator performs an OIS (Optical Image Stabilizer) function, and the second camera actuator performs an auto focusing or zoom function, and the first camera actuator may include the camera actuator.

In addition, light incident on the camera module from an outside is incident on the second camera actuator through the first camera actuator.

Advantageous Effects

The camera actuator and the camera module according to the embodiment may have improved optical properties. In detail, in the camera actuator and the camera module according to the embodiment, the driving unit for controlling the position of the prism may include a piezoelectric device, and the position of the prism may be more precisely controlled by the driving unit. Accordingly, the embodiment can more effectively control vibrations caused by hand shake, thereby providing an improved OIS function.

In addition, the camera actuator and the camera module according to the embodiment may be implemented in a smaller size. In detail, the driving unit may control the position of the prism by frictional force caused by mechanical deformation of the piezoelectric device. Accordingly, the driving unit according to the embodiment may be provided in a smaller size compared to the VCM type driving unit including a ball bearing, a guide rail, and the like, and friction generated during position control of the prism may be minimized.

In addition, the camera actuator and the camera module according to the embodiment may have improved optical properties. In detail, in the camera actuator and camera module according to the embodiment, the driving unit for moving the lens group includes a piezoelectric device, and the driving unit can more precisely control the lens group. In addition, the camera actuator and the camera module according to the embodiment can minimize friction that occurs when the lens group is moved, and can prevent de-centering and tilting, so that the position of the lens group can be more precisely controlled. Accordingly, the embodiment may provide improved autofocus and zoom functions.

In addition, the camera module according to the embodiment may include a plurality of camera actuators, for example, OIS and zoom/AF actuators, and each of the plurality of camera actuators may include a piezoelectric device as a driving unit. Accordingly, the camera module may omit a separate driving driver, for example, a VCM driving driver, in addition to the driving driver for driving the piezoelectric device, thereby simplifying the structure and having a slim shape.

DESCRIPTION OF DRAWINGS

FIG. 1 is an exploded perspective view of a first camera actuator according to an embodiment.

FIG. 2 is a perspective view of a first housing of a first camera actuator according to an embodiment.

FIG. 3 is a top view of a first housing of a first camera actuator according to an embodiment.

FIG. 4 is an exploded perspective view of a prism unit of a first camera actuator according to an embodiment.

FIG. 5 is a perspective view of a prism unit of a first camera actuator according to an embodiment.

FIGS. 6 to 8 are a front view, a top view, and a perspective view in which a cover member is omitted in the first camera actuator according to the embodiment.

FIGS. 9 to 12 are views for explaining an arrangement relationship of a first driving unit of a first camera actuator according to an embodiment.

FIGS. 13 to 15 are views for explaining a second driving unit of a first camera actuator according to an embodiment.

FIGS. 16 to 19 are views for explaining an arrangement relationship of a second driving unit of a first camera actuator according to an embodiment.

FIG. 20 is another exploded perspective view of a first camera actuator according to an embodiment.

FIG. 21 is an exploded perspective view of a prism unit of the first camera actuator according to FIG. 20.

FIG. 22 is a perspective view of a prism unit of a first camera actuator according to FIG. 20.

FIG. 23 is a front view of a first camera actuator according to FIG. 20.

FIGS. 24 and 25 are views for explaining an arrangement relationship of a first driving unit of a first camera actuator according to FIG. 20.

FIGS. 26 to 28 are views for explaining an arrangement relationship of a second driving unit of a first camera actuator according to FIG. 20.

FIG. 29 is a perspective view of a camera module according to an embodiment.

FIG. 30 is a perspective view in which some components are omitted from a camera module according to an embodiment.

FIG. 31 is an exploded perspective view of a second camera actuator according to an embodiment.

FIG. 32 is a cross-sectional view of a second camera actuator according to an embodiment.

FIG. 33 is a front view of a second camera actuator according to an embodiment.

FIG. 34 is a perspective view illustrating third and fourth driving units disposed in a first housing of a second camera actuator according to an embodiment.

FIG. 35 is an exploded perspective view of a third driving unit according to an embodiment.

FIG. 36 is an exploded perspective view of a fourth driving unit according to the embodiment.

FIG. 37 is a perspective view of a partial configuration of the second camera actuator according to the embodiment.

FIG. 38 is a perspective view of a mobile terminal to which a camera module according to an embodiment is applied.

FIG. 39 is a perspective view of a vehicle to which a camera module according to an embodiment is applied.

MODES OF THE INVENTION

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and substituted for use.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art.

Further, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

An optical axis direction used below may be defined as an optical axis direction of a lens coupled to a camera actuator and a camera module, and a vertical direction may be defined as a direction perpendicular to the optical axis.

A autofocus function used below may be defined a function to automatically focus on the subject by adjusting the distance from the image sensor by moving the lens in the optical axis direction according to the distance of the subject so that a clear image of the subject can be obtained by the image sensor.

Meanwhile, the auto focus may correspond to auto focus (AF). In addition, closed-loop auto focus (CLAF) control may be defined as real-time feedback control of the lens position by sensing the distance between the image sensor and the lens to improve focus adjustment accuracy.

In addition, before the description of the embodiment of the invention, a first direction may mean a x-axis direction shown in the drawings, a second direction may be a different direction from the first direction. For example, the second direction may mean a y-axis direction shown in the drawing in a direction perpendicular to the first direction. Also, a third direction may be different from the first and second directions. For example, the third direction may mean a z-axis direction shown in the drawing in a direction perpendicular to the first and second directions. Here, the third direction may mean an optical axis direction.

Hereinafter, the configuration of the camera module according to the present embodiment will be described with reference to the drawings.

FIG. 1 is an exploded perspective view of a first camera actuator according to an embodiment. The first camera actuator 1000 may be an optical image stabilizer (OIS) actuator. The first camera actuator 1000 may change the path of the light incident on the camera module 10.

Referring to FIG. 1, the first camera actuator 1000 according to the embodiment may include a cover member 100, a first housing 200, a first driving unit 301, a second driving unit 302, a prism unit 400 and a base member 500.

The cover member 100 may include an accommodating space therein, and at least one side surface may be open. For example, the cover member 100 may have a structure in which a plurality of side surfaces connected to each other are opened. In detail, the cover member 100 may have an open structure in which an upper surface through which light is incident from an outside, one side corresponding to the first camera actuator 1000 and a lower surface opposite to the upper surface are open, and a light movement path of the prism unit 400 to be described later may be provided.

The cover member 100 may include a rigid material. For example, the cover member 100 may include a material having a predetermined reliability, such as resin, metal, ceramic, and the like, and may support the first housing 200 disposed in the accommodation space. For example, the cover member 100 may be disposed surrounding the first housing 200, the prism unit 400, the first driving unit 301 and the second driving unit 302 and the like, and may support the components.

FIG. 2 is a perspective view of a first housing of a first camera actuator according to an embodiment, and FIG. 3 is a top view of a first housing of a first camera actuator according to an embodiment.

FIGS. 2 and 3, the first housing 200 may have a structure in which a plurality of side surfaces are opened. For example, the first housing 200 may include a lower part 210, a first side part 221, a second side part 222, and an upper part 230.

The lower part 210 has a plate shape and may extend in a first direction (x-axis direction).

The first side part 221 and the second side part 222 may be respectively disposed in an edge region of the lower part 210. The first side part 221 and the second side part 222 may extend in an upper direction (y-axis direction) from an edge of the lower part 210. The first side part 221 and the second side part 222 may be disposed to face each other in the first direction. The first side part 221 and the second side part 222 may be parallel.

The upper part 230 may be disposed on the lower part 210. The upper part 230 may be disposed on the first side part 221 and the second side part 222 and may connect ends of the first side part 221 and the second side part 222. The upper part 230 may be disposed to face the lower part 210 in the second direction. The upper part 230 may be parallel to the lower part 210.

The upper part 230 of the first housing 200 may be opened. In detail, the upper part 230 of the first housing 200 may have an open region corresponding to an upper surface of the cover member 100. Also, a region corresponding to one side of the cover member 100, for example, a region between the first side part 221 and the second side part 222 may be opened. Also, a region corresponding to the other side opposite to one side of the cover member 100 in the first housing 200 may be opened. Accordingly, the first housing 200 may provide a light movement path of the prism unit 400 to be described later.

The first housing 200 may further include a partition wall 250 disposed on the lower part 210. The partition wall 250 may extend from the lower part 210 toward the upper part 230. The partition wall 250 may be disposed between the first side part 221 and the second side part 222 and may be parallel to the first side part 221 and the second side part 222. The partition wall 250 may be disposed adjacent to the first side part 221 than the second side part 222.

The partition wall 250 may include a first guide protrusion 271. The first guide protrusion 271 may be disposed on one side facing the second side part 222. The first guide protrusion 271 may have a shape protruding from one side of the partition wall 250 toward the second side part 222. The first guide protrusion 271 may be disposed in a region corresponding to the first piezoelectric device 310 to be described later. The first guide protrusion 271 may be disposed in a region overlapping a center of the prism unit 400 in the first direction (x-axis direction). The first guide protrusion 271 may be disposed in a region overlapping the center of the prism 410 in the first direction.

The first housing 200 may include a plurality of accommodation spaces. For example, the first housing 200 may include a first accommodating space 205 and a second accommodating space 255 separated by the partition wall 250.

The first accommodation space 205 may be disposed between the partition wall 250 and the second side part 222. The prism unit 400 may be disposed in the first accommodation space 205. In addition, the second accommodation space 255 may be disposed between the partition wall 250 and the first side part 221. A part of the configuration of the first driving unit 301 may be disposed in the second accommodation space 255.

FIG. 4 is an exploded perspective view of the prism unit of the first camera actuator according to the embodiment, and FIG. 5 is a perspective view of the prism unit of the first camera actuator according to the embodiment.

Referring to FIGS. 4 and 5, the prism unit 400 may include a prism 410 and a prism mover 430 disposed on the prism 410.

The prism 410 may be a right-angle prism. The prism 410 may reflect the direction of light incident from the outside. That is, the prism 410 may change the path of the light incident on the first camera actuator 1000 from the outside toward the second camera actuator 2000 to be described later.

The prism mover 430 may be disposed on the prism 410. The prism mover 430 may be disposed to surround the prism 410. At least one side of the prism mover 430 may be open and may include an accommodating space therein. In detail, the prism mover 430 may have a structure in which a plurality of outer surfaces connected to each other are opened. For example, the prism mover 430 may have a structure in which an outer surface corresponding to the prism 410 is open, and may include an accommodation space defined as a first space 435 therein. The first space 435 may have a shape corresponding to the prism 410. The prism 410 may be coupled to the prism mover 430 in the first space 435.

The prism unit 400 may include a plurality of outer surfaces. For example, the prism mover 430 may include a plurality of outer surfaces. The prism mover 430 may include a first outer surface 430S1 facing the partition wall 250 and a second outer surface 430S2 facing the second partition wall 250. In addition, the prism mover 430 may include a third outer surface 430S3 facing the lower part 210 and a fourth outer surface 430S4 disposed between the first to third outer surfaces 430S1, 430S2 and 430S3 and connects the first to third outer surfaces 430S1, 430S2 and 430S3.

Also, the prism mover 430 may include a first recess 430R1. The first recess 430R1 may be disposed on the first outer surface 430S1. The first recess 430R1 may be disposed in a region overlapping the center of the prism unit 400 in the first direction (x-axis direction). The first recess 430R1 may have a concave groove shape in a direction from the first outer surface 430S1 to the second outer surface 430S2.

The first recess 430R1 may be disposed in a region corresponding to the first guide protrusion 271. In detail, the first recess 430R1 may be disposed in a region overlapping the first guide protrusion 271 in the first direction. The first recess 430R1 may have a shape corresponding to that of the first guide protrusion 271 and a depth corresponding to that of the first guide protrusion 271. The first recess 430R1 may provide a space in which the first guide protrusion 271 is inserted. The prism unit 400 may be tilted in the vertical direction (y-axis direction) using the first guide protrusion 271 as a rotation axis.

FIGS. 6 to 8 are a front view, a top view, and a perspective view in which a cover member is omitted in the first camera actuator according to the embodiment.

Referring to FIGS. 6 to 8, the first driving unit 301 may be disposed in the first housing 200. The first driving unit 301 may be disposed adjacent to the first side part 221. For example, the first driving unit 301 may be disposed between the first side part 221 and the prism unit 400.

The first driving unit 301 may include a first piezoelectric device 310, a first yoke 331, and a first magnet 351.

The first piezoelectric device 310 may be disposed between the first side part 221 and the prism unit 430. The first piezoelectric device 310 may be disposed in the first accommodation space 205. The first piezoelectric device 310 may be disposed between the first outer surface 430S1 of the prism unit 400 and the partition wall 250. The first piezoelectric device 310 may be disposed on a region corresponding to the first guide protrusion 271 and the first recess 430R1. The first piezoelectric device 310 may be disposed in a region corresponding to the center of the prism unit 400 in the first direction. The first piezoelectric device 310 may be disposed in direct contact with the first outer surface 430S1.

The first piezoelectric device 310 may include a piezoelectric device. The first piezoelectric device 310 may include a ceramic material. For example, the first piezoelectric device 310 may include may include at least one of ZnO, AlN, LiNbO4, lead antimony stannate, lead magnesium tantalate, lead nickel tantalate, titanates, tungstates, zirconates, or lead zirconate titanates [Pb(ZrxTi1−x)O3 (PZT)], lead lanthanum zirconate titanate (PLZT), lead niobium zirconate titanate (PNZT), BaTiO3, SrTiO3, lead magnesium niobate, lead nickel niobate, lead manganese niobate, lead zinc niobate, lead, barium and bismuth, including lead titanate, and niobates of strontium.

The first piezoelectric device 310 may control the tilt of the prism unit 400. The first piezoelectric device 310 may have a cylindrical shape. The first piezoelectric device 310 may cause mechanical deformation by an applied power. For example, an upper surface of the first piezoelectric device 310 facing the first outer surface 430S1 may be deformed into a wave shape by the applied power.

In detail, the first piezoelectric device 310 may include a plurality of first piezoelectric parts (not shown). The plurality of first piezoelectric parts may be disposed along a circumference of a concentric circle shape from a center of the first piezoelectric device 310 in the first direction.

The plurality of first piezoelectric parts may include a plurality of first-first piezoelectric parts spaced apart from each other and a first-second piezoelectric part disposed between the plurality of first-first piezoelectric parts. At this time, the upper surface of the first piezoelectric device 310 may be deformed into a continuous wave shape due to a difference in power applied to each of the plurality of first-first piezoelectric parts and the plurality of first-first piezoelectric parts, and, a frictional force may be generated between the first piezoelectric device 310 and the first outer surface 430S1 due to the deformation. That is, the prism unit 400 may be tilted in the vertical direction (y-axis direction) by a friction force between the first piezoelectric device 310 and the first outer surface 430S1.

In addition, the first piezoelectric device 310 may further include a first guide hole 311. The first guide hole 311 may be disposed in a region corresponding to the first guide protrusion 271 and the first recess 430R1. The first guide hole 311 may be a hole penetrated in the first direction. When the first piezoelectric device 310 includes the first guide hole 311, the first piezoelectric device 310 may have a donut shape.

The first guide hole 311 may have a shape corresponding to the first guide protrusion 271 for insertion of the first guide protrusion 271. The first guide protrusion 271 may be inserted into the first recess 430R1 through the first guide hole 311.

Accordingly, the first piezoelectric device 310 and the prism unit 400 may have positions set by the first guide protrusion 271. In addition, it is possible to prevent the first piezoelectric device 310 and the prism unit 400 from being separated from a set rotation axis, in the process in which the prism unit 400 is tilted in the vertical direction (y-axis direction) by the first guide protrusion 271 and the first guide hole 311.

The first yoke 331 may be disposed in the second accommodation space 255. The first yoke 331 may be disposed between the first side part 221 and the partition wall 250. The first yoke 331 may be disposed on the other side opposite to one side of the partition wall 250.

The first yoke 331 may be disposed in a region that does not correspond to the first piezoelectric device 310. For example, the first yoke 331 may be disposed in a region that does not overlap the first piezoelectric device 310 in the first direction.

The first magnet 351 may be disposed in the first accommodation space 205. The first magnet 351 may be disposed between the partition wall 250 and the prism unit 400. The first magnet 351 may be disposed between the partition wall 250 and the first outer surface 430S1. The first magnet 351 may be fixed on the first outer surface 430S1.

The first magnet 351 may be spaced apart from the first piezoelectric device 310. The first magnet 351 may be disposed in a region that does not correspond to the first piezoelectric device 310. For example, the first magnet 351 may be disposed in a region that does not overlap the first piezoelectric device 310 in the first direction. Also, the first magnet 351 may be disposed in a region corresponding to the first yoke 331. In detail, the first magnet 351 may be disposed in a region overlapping the first yoke 331 in the first direction.

The first yoke 331 and the first magnet 351 may arrange the prism unit 400 at a set position. For example, a magnetic attraction may be generated between the first yoke 331 and the first magnet 351. The prism unit 400 may be pressed in a direction toward of the partition wall 250 by the magnetic attraction. Accordingly, the prism unit 400 may be disposed at a position overlapping the center of the first piezoelectric device 310 in the first direction without a separate fixing member.

In addition, the first driving unit 301 may further include a second yoke 332 and a second magnet 352.

The second yoke 332 may be disposed in the second accommodation space 255. The second yoke 332 may be disposed between the first side part 221 and the partition wall 250. The second yoke 332 may be disposed on the other side of the partition wall 250. The second yoke 332 may be spaced apart from the first yoke 331. For example, the second yoke 332 may be spaced apart from the first yoke 331 in the optical axis (z-axis direction).

Also, the second yoke 332 may be disposed in a region that does not correspond to the first piezoelectric device 310. For example, the second yoke 332 may be disposed in a region that does not overlap the first piezoelectric device 310 in the first direction. The first piezoelectric device 310 may be disposed between the first yoke 331 and the second yoke 332.

The second magnet 352 may be disposed in the first accommodation space 205. The second magnet 352 may be disposed between the partition wall 250 and the prism unit 400. The second magnet 352 may be disposed between the partition wall 250 and the first outer surface 430S1. The first magnet 351 may be fixed on the first outer surface 430S1. The second magnet 352 may be spaced apart from the first magnet 351. For example, the second magnet 352 may be spaced apart from the first magnet 351 in the optical axis (z-axis direction).

Also, the second magnet 352 may be spaced apart from the first piezoelectric device 310. The second magnet 352 may be disposed in a region that does not correspond to the first piezoelectric device 310. For example, the second magnet 352 may be disposed in a region that does not overlap the first piezoelectric device 310 in the first direction. The first piezoelectric device 310 may be disposed between the first magnet 351 and the second magnet 352. Also, the second magnet 352 may be disposed in a region corresponding to the second yoke 332. In detail, the second magnet 352 may be disposed in a region overlapping the second yoke 332 in the first direction.

The second yoke 332 and the second magnet 352 may arrange the prism unit 400 at a set position. For example, a magnetic attraction may be generated between the second yoke 332 and the second magnet 352. The prism unit 400 may be pressed in a direction toward of the partition wall 250 by the magnetic attraction. Accordingly, the prism unit 400 may be disposed at a position overlapping the center of the first piezoelectric device 310 in the first direction without a separate fixing member.

That is, the first camera actuator 1000 may include first and second yokes 331 and 332 and first and second magnets 351 and 352 disposed in the lateral direction of the prism unit 400. At this time, each of the first and second yokes 331 and 332 and the first and second magnets 351 and 352 may be disposed side by side in the optical axis (z-axis direction) and may be disposed in a region surrounding the first piezoelectric device 310. Accordingly, the prism unit 400 may be more stably disposed in the first housing 200, and may be tilted more stably by the driving force of the first piezoelectric device 310. Accordingly, the first camera actuator 1000 according to the embodiment may have improved reliability and optical characteristics.

The first driving unit 301 may include a first sensing unit 371. The first sensing unit 371 may be disposed on one side of the partition wall 250. The first sensing unit 371 may be disposed in a region corresponding to the first magnet 351 in the first direction. The first sensing unit 371 may include a hall sensor. The first sensing unit 371 may sense the position of the first magnet 351. That is, the first sensing unit 371 may sense the position of the prism unit 400.

FIG. 9 is a view for explaining an arrangement relationship of a first driving unit of a first camera actuator according to an embodiment.

Referring to FIG. 9, the first yoke 331 may have a shape extending in the second direction (y-axis direction). A length in the second direction of the first yoke 331 may be longer than a length in the first direction.

The first magnet 351 may be disposed in a region corresponding to the first yoke 331 in the first direction. The first magnet 351 may have a shape extending in the second direction (y-axis direction). A length in the second direction of the first magnet 351 may be longer than a length in the first direction.

The first magnet 351 may include a first-first magnet 351a having a first polarity and a first-second magnet 351b having a second polarity opposite to the first polarity. The first-first magnet 351a and the first-second magnet 351b may be disposed side by side in a third direction. The first-second magnet 351b may be disposed closer to the first piezoelectric device 310 than the first-first magnet 351a.

In addition, the second yoke 332 may be spaced apart from the first yoke 331 in a third direction. The second yoke 332 may have a shape extending in the second direction (y-axis direction). A length in the second direction of the second yoke 332 may be longer than a length in the first direction.

The second magnet 352 may be disposed in a region corresponding to the second yoke 332 in the first direction. The second magnet 352 may be spaced apart from the first magnet 351 in a third direction. The second magnet 352 may have a shape extending in the second direction (y-axis direction). A length in the second direction of the second magnet 352 may be longer than a length in the first direction.

The second magnet 352 may include a second-first magnet 352a having the first polarity and a second-second magnet 352b having the second polarity. The second-first magnet 352a and the second-second magnet 352b may be disposed side by side in a third direction. The second-first magnet 352a may be disposed closer to the first piezoelectric device 310 than the second-second magnet 352b.

The first sensing unit 371 may be disposed on a region between the first-first magnet 351a and the first-second magnet 351b. For example, the first sensing unit 371 may be disposed on a region overlapping the boundary between the first-first magnet 351a and the first-second magnet 351b in the first direction.

Also, although not shown in the drawings, a plurality of magnets may be further disposed between the prism unit 400 and the housing 200. For example, magnets having the same polarity may be disposed on the second outer surface 430S2 of the housing 200 and the second side part 222 facing the second outer surface 430S2. Accordingly, a magnetic repulsive force may be generated between the plurality of magnets, and the prism unit 400 may be pressed in the direction toward of the partition wall 250 by the repulsive force. Accordingly, the prism unit 400 may have improved positional reliability within the housing 200.

In addition, FIGS. 10 to 12 are views for explaining another arrangement relationship of the first driving unit according to the embodiment. In the description using FIGS. 10 to 12, descriptions of the same and similar components as those of the first camera actuator described above are omitted, and the same reference numerals are assigned to the same and similar components.

Referring to FIG. 10, the first magnet 351 may be disposed in a region corresponding to the first yoke 331 in the first direction. The first magnet 351 may have a shape extending in the second direction (y-axis direction). A length in the second direction of the first magnet 351 may be longer than a length in the first direction.

The first magnet 351 may include a first-first magnet 351a having the first polarity and a first-second magnet 351b having the second polarity. The first-first magnet 351a and the first-second magnet 351b may be arranged in parallel in a second direction (y-axis direction). That is, the first-second magnet 351b may be disposed below the first-first magnet 351a and may be adjacent to the lower part 210 of the first housing 200.

In addition, the second magnet 352 may be disposed in a region corresponding to the second yoke 332 in the first direction. The second magnet 352 may be spaced apart from the first magnet 351 in a third direction. The second magnet 352 may have a shape extending in the second direction (y-axis direction). A length in the second direction of the second magnet 352 may be longer than a length in the first direction.

The second magnet 352 may include a second-first magnet 352a having the first polarity and a second-second magnet 352b having the second polarity. The second-first magnet 352a and the second-second magnet 352b may be arranged side by side in the second direction. That is, the second-second magnet 352b may be disposed below the second-first magnet 352a and may be adjacent to the lower part 210 of the first housing 200.

The first sensing unit 371 may be disposed on a region between the first-first magnet 351a and the first-second magnet 351b. For example, the first sensing unit 371 may be disposed on a region overlapping the boundary between the first-first magnet 351a and the first-second magnet 351b in the first direction. A boundary between the first-first magnet 351a and the first-second magnet 351b may overlap a center of the first magnet 351 in a second direction (y-axis direction). That is, the first sensing unit 371 may be disposed in a region overlapping the center of the first magnet 351 in the first direction.

That is, the first sensing unit 371 may be disposed on a region overlapping the center of the first magnet 351. Accordingly, when the prism unit 400 is tilted by the first driving unit 301, the first sensing unit 371 can effectively sense the amount of rotation of the first magnet 351, so that the position is more can be sensed accurately.

Referring to FIG. 11, the first driving unit 301 may omit the first yoke 331 and the second yoke 332. The first driving unit 301 may include a fifth magnet 355 and a sixth magnet 356 instead of the first yoke 331 and the second yoke 332.

The fifth magnet 355 may be disposed in the second accommodation space 255. The fifth magnet 355 may be disposed between the first side part 221 and the partition wall 250. The fifth magnet 355 may be disposed on the other side of the partition wall 250. The fifth magnet 355 may be disposed in a region that does not correspond to the first piezoelectric device 310. For example, the fifth magnet 355 may be disposed in a region that does not overlap the first piezoelectric device 310 in the first direction.

The fifth magnet 355 may be disposed in a region corresponding to the first magnet 351 in the first direction. The fifth magnet 355 may have a shape extending in the second direction (y-axis direction). A length in the second direction of the fifth magnet 355 may be longer than a length in the first direction.

The fifth magnet 355 may include a fifth-first magnet 355a having a second polarity and a fifth-second magnet 355b having the first polarity. The fifth-first magnet 355a and the fifth-second magnet 355b may be disposed side by side in a third direction. The fifth-first magnet 355a may be disposed in a region overlapping with the first-first magnet 351a in the first direction, and the fifth-second magnet 355b may be disposed in a region overlapping with the first-second magnet 351b in the first direction.

The first magnet 351 and the fifth magnet 355 may arrange the prism unit 400 at a set position. For example, a magnetic attraction may be generated between the first-first magnet 351a and the fifth-first magnet 355a, and between the first-second magnet 351b and the fifth-second magnet 355b. and the prism unit 400 may be pressed in the direction toward of the partition wall by the magnetic attraction. Accordingly, the prism unit 400 may be disposed at a position overlapping the center of the first piezoelectric device 310 in the first direction without a separate fixing member.

In addition, the sixth magnet 356 may be disposed in the second accommodation space 255. The sixth magnet 356 may be disposed between the first side part 221 and the partition wall 250. The sixth magnet 356 may be disposed on the other side of the partition wall 250. The sixth magnet 356 may be spaced apart from the fifth magnet 355. For example, the sixth magnet 356 may be spaced apart from the fifth magnet 355 in the optical axis (z-axis direction). Also, the sixth magnet 356 may be disposed in a region that does not correspond to the first piezoelectric device 310. For example, the sixth magnet 356 may be disposed in a region that does not overlap the first piezoelectric device 310 in the first direction. The first piezoelectric device 310 may be disposed between the fifth magnet 355 and the sixth magnet 356.

The sixth magnet 356 may be disposed in a region corresponding to the second magnet 352 in the first direction. The sixth magnet 356 may have a shape extending in the second direction (y-axis direction). A length in the second direction of the sixth magnet 356 may be longer than a length in the first direction.

The sixth magnet 356 may include a sixth-first magnet 356a having a second polarity and a sixth-second magnet 356b having the first polarity. The sixth-first magnet 356a and the sixth-second magnet 356b may be disposed side by side in a third direction. The sixth-first magnet 356a may be disposed in a region overlapping the second-first magnet 352a in the first direction, and the sixth-second magnet 356b may be disposed in a region overlapping the second-second magnet 352b in the first direction.

The second magnet 352 and the sixth magnet 356 may arrange the prism unit 400 at a set position. For example, a magnetic attraction may be generated between the second-first magnet 352a and the sixth-first magnet 356a and between the second-second magnet 352b and the sixth-second magnet 356b, and the prism unit 400 may be pressed in the direction toward of the partition wall by the magnetic attraction. Accordingly, the prism unit 400 may be disposed at a position overlapping the center of the first piezoelectric device 310 in the first direction without a separate fixing member.

The first sensing unit 371 may be disposed on a region between the first-first magnet 351a and the first-second magnet 351b. For example, the first sensing unit 371 may be disposed on a region overlapping the boundary between the first-first magnet 351a and the first-second magnet 351b in the first direction.

That is, the first camera actuator 1000 may include a plurality of magnets 351, 352, 355, and 356 disposed in a lateral direction of the prism unit 400. In this case, the plurality of magnets 351, 352, 355, and 356 may be disposed in a region surrounding the first piezoelectric device 310. Accordingly, the prism unit 400 may be more stably disposed in the first housing 200, and may be tilted more stably by the driving force of the first piezoelectric device 310.

Also, referring to FIG. 12, the first magnet 351 may include a first-first magnet 351a having the first polarity and a first-second magnet 351b having the second polarity. The first-first magnet 351a and the first-second magnet 351b may be arranged in parallel in a second direction (y-axis direction). That is, the first-second magnet 351b may be disposed below the first-first magnet 351a and may be adjacent to the lower part 210 of the first housing 200.

Also, the second magnet 352 may include a second-first magnet 352a having the first polarity and a second-second magnet 352b having the second polarity. The second-first magnet 352a and the second-second magnet 352b may be arranged side by side in the second direction. That is, the second-second magnet 352b may be disposed below the second-first magnet 352a and may be adjacent to the lower part 210 of the first housing 200.

Also, the fifth magnet 355 may include a fifth-first magnet 355a having the second polarity and a fifth-second magnet 355b having the first polarity. The fifth-first magnet 355a and the fifth-second magnet 355b may be arranged side by side in the second direction. That is, the fifth-second magnet 355b may be disposed below the fifth-first magnet 355a and may be adjacent to the lower part 210 of the first housing 200. In addition, the fifth-first magnet 355a may be disposed in a region overlapping the first-first magnet 351a in the first direction, and the fifth-second magnet 355b may be disposed in a region overlapping the first-second magnet 351b in the first direction.

Also, the sixth magnet 356 may include a sixth-first magnet 356a having the second polarity and a sixth-second magnet 356b having the first polarity. The sixth-first magnet 356a and the sixth-second magnet 356b may be arranged side by side in the second direction. That is, the sixth-second magnet 356b may be disposed below the sixth-first magnet 356a and may be adjacent to the lower part 210 of the first housing 200. In addition, the sixth-first magnet 356a may be disposed in a region overlapping the second-first magnet 352a in the first direction, and the sixth-second magnet 356b may be disposed in a region overlapping the second-second magnet 352b in the first direction.

The first sensing unit 371 may be disposed on a region between the first-first magnet 351a and the first-second magnet 351b. For example, the first sensing unit 371 may be disposed on a region overlapping the boundary between the first-first magnet 351a and the first-second magnet 351b in the first direction. A boundary between the first-first magnet 351a and the first-second magnet 351b may overlap a center of the first magnet 351 in a second direction (y-axis direction).

That is, the first sensing unit 371 may be disposed on a region overlapping the center of the first magnet 351. Accordingly, when the prism unit 400 is tilted by the first driving unit 301, the first sensing unit 371 can effectively sense the amount of rotation of the first magnet 351, so that the position is more can be sensed accurately.

FIGS. 13 to 15 are views for explaining a second driving unit of the first camera actuator according to an embodiment.

FIGS. 13 to 15, the base member 500 may be disposed under the first housing 200. The second driving unit 302 may be disposed on the base member 500. The base member 500 may be disposed to face the lower part 210 of the first housing 200. The base member 500 has a plate shape and may support a part of the second driving unit 302.

The second driving unit 302 may include a second piezoelectric device 320, a third yoke 333, and a third magnet 353.

The second piezoelectric device 320 may be disposed on the base member 500. The second piezoelectric device 320 may be disposed between the base member 500 and the first housing 200. In detail, the second piezoelectric device 320 may be disposed between the upper surface of the base member 500 and the lower part 210 of the first housing 200. The second piezoelectric device 320 may be disposed in a region corresponding to the center of the prism unit 400 in the second direction (y-axis direction). In detail, the second piezoelectric device 320 may be disposed in a region overlapping the center of the prism 410 in the second direction. The second piezoelectric device 320 may directly contact the housing 200.

The second piezoelectric device 320 may include a piezoelectric device. The second piezoelectric device 320 may include a ceramic material. For example, the second piezoelectric device 320 may include may include at least one of ZnO, AlN, LiNbO4, lead antimony stannate, lead magnesium tantalate, lead nickel tantalate, titanates, tungstates, zirconates, or lead zirconate titanates [Pb(ZrxTi1−x)O3 (PZT)], lead lanthanum zirconate titanate (PLZT), lead niobium zirconate titanate (PNZT), BaTiO3, SrTiO3, lead magnesium niobate, lead nickel niobate, lead manganese niobate, lead zinc niobate, lead, barium and bismuth, including lead titanate, and niobates of strontium.

The second piezoelectric device 320 may control the tilt of the housing 200. The second piezoelectric device 320 may have a cylindrical shape. The second piezoelectric device 320 may cause mechanical deformation by an applied power. For example, the upper surface of the second piezoelectric device 320 facing the lower part 210 of the first housing 200 may be deformed into a wave shape by the applied power.

In detail, the second piezoelectric device 320 may include a plurality of second piezoelectric parts (not shown). The plurality of second piezoelectric parts may be disposed along a circumference of a concentric circle shape from a center of the second piezoelectric device 320 in the second direction.

The plurality of second piezoelectric parts may include a plurality of second-first piezoelectric parts spaced apart from each other and a second-second piezoelectric part disposed between the plurality of second-first piezoelectric parts. At this time, the upper surface of the second piezoelectric device 320 may be deformed into a continuous wave shape by a difference in power applied to each of the plurality of second-first piezoelectric parts and the plurality of second-second piezoelectric parts, and, a frictional force may be generated between the second piezoelectric device 320 and the lower part 210 of the first housing 200 due to the deformation. That is, the first housing 200 may be tilted in the left and right direction (x-axis direction) by the friction force between the second piezoelectric device 320 and the lower part 210.

In addition, the second piezoelectric device 320 may further include a second guide hole 321. For example, the lower part 210 of the first housing 200 may include a second guide protrusion 270 protruding toward the base member 500. In this case, the second guide protrusion 270 may be disposed in a region overlapping the center of the prism unit 400 in the second direction (y-axis direction). In detail, the second guide protrusion 270 may be disposed in a region overlapping the center of the prism 410 in the second direction. The second guide hole 321 may be disposed in a region corresponding to the second guide protrusion 270. The second guide hole 321 may be a through hole or a concave groove in the second direction. When the second piezoelectric device 320 includes the second guide hole 321, the second piezoelectric device 320 may have a donut shape.

The second guide hole 321 may have a shape corresponding to that of the second guide protrusion 270, and some or all of the second guide protrusion 270 may be inserted in the second guide hole 321.

Accordingly, the second piezoelectric device 320 may have a position set by the second guide protrusion 270. In addition, it is possible to prevent the second piezoelectric device 320 from being separated from the set rotation axis, in the process in which the first housing 200 is tilted in the left and right direction (x-axis direction) by the second guide protrusion 270 and the second guide hole 321.

The third yoke 333 may be disposed on the first housing 200. The third yoke 333 may be disposed in the second accommodation space 255. The third yoke 333 may be disposed on the lower part 210.

Also, the third yoke 333 may be disposed in a region that does not correspond to the second piezoelectric device 320. For example, the third yoke 333 may be disposed in a region that does not overlap the second piezoelectric device 320 in the second direction.

The third magnet 353 may be disposed under the first housing 200. The third magnet 353 may be disposed between the first housing 200 and the base member 500. The third magnet 353 may be fixed on the upper surface of the base member 500.

The third magnet 353 may be spaced apart from the second piezoelectric device 320. The third magnet 353 may be disposed in a region that does not correspond to the second piezoelectric device 320. The third magnet 353 may be disposed in a region that does not overlap the second piezoelectric device 320 in the second direction. Also, the third magnet 353 may be disposed in a region corresponding to the third yoke 333. In detail, the third magnet 353 may be disposed in a region overlapping the third yoke 333 in the second direction.

The third yoke 333 and the third magnet 353 may arrange the first housing 200 at a set position. For example, a magnetic attraction may be generated between the third yoke 333 and the third magnet 353. The first housing 200 may be pressed toward the base member 500 by the magnetic attraction. Accordingly, the first housing 200 may be disposed at a position overlapping the center of the second piezoelectric device 320 in the second direction without a separate fixing member.

Also, the third yoke 333 and the third magnet 353 may be spaced apart from the first driving unit 301. In detail, the third yoke 333 and the third magnet 353 may be disposed in a region that does not overlap with the first yoke 331 and the second yoke 332 and the first magnet 351 and the second magnet 352 in the second direction (y-axis direction). Accordingly, when the first driving unit 301 is driven or the second driving unit 302 is driven, it is possible to prevent the driving force from being changed by other driving units, for example, due to the interference of the yokes and magnets of other driving units.

In addition, the second driving unit 302 may further include a fourth yoke 334 and a fourth magnet 354.

The fourth yoke 334 may be disposed on the first housing 200. The fourth yoke 334 may be disposed in the second accommodation space 255. The fourth yoke 334 may be disposed on the lower part 210. The fourth yoke 334 may be spaced apart from the third yoke 333. For example, the fourth yoke 334 may be spaced apart from the third yoke 333 in the optical axis (z-axis direction). The fourth yoke 334 may be positioned closer to a second camera actuator 2000 to be described later than the third yoke 333.

Also, the fourth yoke 334 may be disposed in a region that does not correspond to the second piezoelectric device 320. For example, the fourth yoke 334 may be disposed in a region that does not overlap the second piezoelectric device 320 in the second direction. The second piezoelectric device 320 may be disposed between the third yoke 333 and the fourth yoke 334.

The fourth magnet 354 may be disposed under the first housing 200. The fourth magnet 354 may be disposed between the first housing 200 and the base member 500. The fourth magnet 354 may be fixed on the upper surface of the base member 500. The fourth magnet 354 may be spaced apart from the third magnet 353. For example, the fourth magnet 354 may be spaced apart from the third magnet 353 in the optical axis (z-axis direction). The fourth magnet 354 may be disposed closer to a second camera actuator 2000 to be described later than the fourth magnet 354.

The fourth magnet 354 may be spaced apart from the second piezoelectric device 320. The fourth magnet 354 may be disposed in a region that does not correspond to the second piezoelectric device 320. The fourth magnet 354 may be disposed in a region that does not overlap the second piezoelectric device 320 in the second direction. Also, the fourth magnet 354 may be disposed in a region corresponding to the fourth yoke 334. In detail, the fourth magnet 354 may be disposed in a region overlapping the fourth yoke 334 in the second direction.

The fourth yoke 334 and the fourth magnet 354 may arrange the first housing 200 at a set position. For example, a magnetic attraction may be generated between the fourth yoke 334 and the fourth magnet 354. The first housing 200 may be pressed toward the base member 500 by the magnetic attraction. Accordingly, the first housing 200 may be disposed at a position overlapping the center of the second piezoelectric device 320 in the second direction without a separate fixing member.

In addition, the fourth yoke 334 and the fourth magnet 354 may be spaced apart from the first driving unit 301. In detail, the fourth yoke 334 and the fourth magnet 354 may be disposed in a region that does not overlap with the first yoke 331 and the second yoke 332, the first magnet 351 and the second magnet 352 in the second direction (y-axis direction). Accordingly, when the first driving unit 301 is driven or the second driving unit 302 is driven, it is possible to prevent the driving force from being changed by other driving units, for example, due to the interference of the yokes and magnets of other driving units.

That is, the first camera actuator 1000 may include third and fourth yokes 333 and 334, and third and fourth magnets 353, 354 disposed on the first housing 200 and the base member 500. At this time, each of the third and fourth yokes 333 and 334 and the third and fourth magnets 353 and 354 may be disposed side by side in the optical axis (z-axis direction) and may be disposed in a region surrounding the second piezoelectric device 320. Accordingly, the first housing 200 may be more stably disposed on the base member 500 and more stably tilted by the driving force of the second piezoelectric device 320. In addition, the first camera actuator 1000 according to the embodiment may have improved reliability and optical characteristics.

The second driving unit 302 may include a second sensing unit 372. The second sensing unit 372 may be disposed on one side of the partition wall 250. The first sensing unit 371 may be disposed in a region corresponding to at least one of the third magnet 353 and the fourth magnet 354 in the second direction. The second sensing unit 372 may include a hall sensor. For example, the second sensing unit 372 may sense the position of the third magnet 353. That is, the second sensing unit 372 may sense the position of the first housing 200.

FIG. 16 is a view for explaining an arrangement relationship of a second driving unit of a first camera actuator according to an embodiment.

Referring to FIG. 16, the third yoke 333 may have a shape extending in the first direction (x-axis direction). A length in the first direction of the third yoke 333 may be longer than a length in the third direction (z-axis direction).

The third magnet 353 may be disposed in a region corresponding to the third yoke 333 in the second direction. The third magnet 353 may have a shape extending in the first direction (y-axis direction). A length in the first direction of the third magnet 353 may be longer than a length in the third direction.

The third magnet 353 may include a third-first magnet 353a having the first polarity and a third-second magnet 353b having the second polarity. The third-first magnet 353a and the third-second magnet 353b may be disposed side by side in a third direction. The third-second magnet 353b may be disposed closer to the second piezoelectric device 320 than the third-first magnet 353a.

Also, the fourth yoke 334 may be spaced apart from the third yoke 333 in a third direction. The fourth yoke 334 may have a shape extending in the first direction (x-axis direction). A length in the first direction of the fourth yoke 334 may be longer than a length in the third direction.

The fourth magnet 354 may be disposed in a region corresponding to the fourth yoke 334 in the second direction. The fourth magnet 354 may be spaced apart from the third magnet 353 in a third direction. The fourth magnet 354 may have a shape extending in the first direction (x-axis direction). A length in the first direction of the fourth magnet 354 may be longer than a length in the third direction.

The fourth magnet 354 may include a fourth-first magnet 354a having the first polarity and a fourth-second magnet 354b having the second polarity. The fourth-first magnet 354a and the fourth-second magnet 354b may be disposed side by side in a third direction. The fourth-first magnet 354a may be disposed closer to the second piezoelectric device 320 than the fourth-second magnet 354b.

The second sensing unit 372 may be disposed on a region between the third-first magnet 353a and the third-second magnet 353b. For example, the second sensing unit 372 may be disposed on a region overlapping the boundary between the third-first magnet 353a and the third-second magnet 353b in the second direction.

FIGS. 17 to 19 are views for explaining another arrangement relationship of the second driving unit according to the embodiment. In the description using FIGS. 17 to 19, descriptions of the same and similar components as those of the first camera actuator described above are omitted, and the same reference numerals are assigned to the same and similar components.

Referring to FIG. 17, the third magnet 353 may be disposed in a region corresponding to the third yoke 333 in the second direction. The third magnet 353 may have a shape extending in the first direction (y-axis direction). A length in the first direction of the third magnet 353 may be longer than a length in the third direction.

The third magnet 353 may include a third-first magnet 353a having the first polarity and a third-second magnet 353b having the second polarity. The third-first magnet 353a and the third-second magnet 353b may be arranged in parallel in a first direction (x-axis direction). That is, the third-first magnet 353a and the third-second magnet 353b may be disposed at the same distance as the second piezoelectric device 320.

Also, the fourth magnet 354 may be disposed in a region corresponding to the fourth yoke 334 in the second direction. The fourth magnet 354 may be spaced apart from the third magnet 353 in a third direction. The fourth magnet 354 may have a shape extending in the first direction (x-axis direction). A length in the first direction of the fourth magnet 354 may be longer than a length in the third direction.

The fourth magnet 354 may include a fourth-first magnet 354a having the first polarity and a fourth-second magnet 354b having the second polarity. The fourth-first magnet 354a and the fourth-second magnet 354b may be arranged side by side in the first direction. That is, the fourth-first magnet 354a and the fourth-second magnet 354b may be disposed at the same distance as the second piezoelectric device 320.

The second sensing unit 372 may be disposed on a region between the third-first magnet 353a and the third-second magnet 353b. For example, the second sensing unit 372 may be disposed on a region overlapping the boundary between the third-first magnet 353a and the third-second magnet 353b in the second direction. A boundary of the third-first magnet 353a and the third-second magnet 353b may overlap a center of the third magnet 353 in a first direction (x-axis direction).

That is, the second sensing unit 372 may be disposed on a region overlapping the center of the third magnet 353. Accordingly, when the first housing 200 is tilted by the second driving unit 302, the second sensing unit 372 can effectively sense the amount of rotation of the third magnet 353 to more accurately sense determine the position.

Referring to FIG. 18, the second driving unit 302 may include a seventh magnet 357 and an eighth magnet 358 instead of the third yoke 333 and the fourth yoke 334.

The seventh magnet 357 may be disposed in the second accommodation space 255. The seventh magnet 357 may be disposed on the lower part 210. The seventh magnet 357 may be disposed in a region that does not overlap the second piezoelectric device 320 in the second direction.

The seventh magnet 357 may be disposed in a region corresponding to the third magnet 353 in the second direction. The seventh magnet 357 may have a shape extending in the first direction (x-axis direction). A length in the first direction of the seventh magnet 357 may be longer than a length in the third direction.

The seventh magnet may include a seventh-first magnet 357a having the second polarity and a seventh-second magnet 357b having the first polarity. The seventh-first magnet 357a and the seventh-second magnet 357b may be disposed side by side in a third direction. The seventh-first magnet 357a may be disposed in a region overlapping the third-first magnet 353a in the second direction, and the seventh-second magnet 357b may be disposed in a region overlapping the third-second magnet 353b in the second direction.

The third magnet 353 and the seventh magnet 357 may arrange the first housing 200 at a set position. For example, a magnetic attraction may be generated between the third-first magnet 353a and the seventh-first magnet 357a and between the third-second magnet 353b and the seventh-second magnet 357b, and the first housing 200 may be pressed in the direction toward of the base member 500 by the magnetic attraction. Accordingly, the first housing 200 may be disposed at a position overlapping the center of the second piezoelectric device 320 in the second direction without a separate fixing member.

Also, the eighth magnet 358 may be disposed in the second accommodation space 255. The eighth magnet 358 may be disposed on the lower part 210. The eighth magnet 358 may be spaced apart from the seventh magnet 357. For example, the eighth magnet 358 may be spaced apart from the seventh magnet 357 in the optical axis (z-axis direction). Also, the eighth magnet 358 may be disposed in a region that does not overlap the second piezoelectric device 320 in the second direction. The second piezoelectric device 320 may be disposed between the seventh magnet 357 and the eighth magnet 358.

The eighth magnet 358 may be disposed in a region corresponding to the fourth magnet 354 in the second direction. The eighth magnet 358 may have a shape extending in the first direction (x-axis direction). A length in the first direction of the eighth magnet 358 may be longer than a length in the third direction.

The eighth magnet 358 may include an eighth-first magnet 358a having the second polarity and an eighth-second magnet 358b having the first polarity. The eighth-first magnet 358a and the eighth-second magnet 358b may be disposed side by side in a third direction. The eighth-first magnet 358a may be disposed in a region overlapping with the fourth-first magnet 354a in the second direction, and the eighth-second magnet 358b may be disposed in a region overlapping with the fourth-second magnet 354b in the second direction.

The fourth magnet 354 and the eighth magnet 358 may arrange the first housing 200 at a set position. For example, a magnetic attraction may be generated between the fourth-first magnet 354a and the eighth-first magnet 358a and between the fourth-second magnet 354b and the eighth-second magnet 358b, and the first housing 200 may be pressed in the direction toward of the base member 500 by the magnetic attraction. Accordingly, the first housing 200 may be disposed at a position overlapping the center of the second piezoelectric device 320 in the second direction without a separate fixing member.

The second sensing unit 372 may be disposed on a region between the third-first magnet 353a and the third-second magnet 353b. For example, the second sensing unit 372 may be disposed on a region overlapping the boundary between the third-first magnet 353a and the third-second magnet 353b in the second direction.

That is, the first camera actuator 1000 may include a plurality of magnets 353, 354, 357, and 358 disposed inside and below the first housing 200. In this case, the plurality of magnets 353, 354, 357, and 358 may be disposed in a region surrounding the second piezoelectric device 320. Accordingly, the first housing 200 may be more stably disposed on the base member 500 and more stably tilted by the driving force of the second piezoelectric device 320.

Also, referring to FIG. 19, the third magnet 353 may include a third-first magnet 353a having the first polarity and a third-second magnet 353b having the second polarity. The third-first magnet 353a and the third-second magnet 353b may be arranged in parallel in a first direction (x-axis direction).

Also, the fourth magnet 354 may include a fourth-first magnet 354a having the first polarity and a fourth-second magnet 354b having the second polarity. The fourth-first magnet 354a and the fourth-second magnet 354b may be arranged side by side in the first direction.

In addition, the seventh magnet 357 may include a seventh-first magnet 357a having the second polarity and a seventh-second magnet 357b having the first polarity. The seventh-first magnet 357a and the seventh-second magnet 357b may be arranged side by side in the first direction. In addition, the seventh-first magnet 357a may be disposed in a region overlapping the third-first magnet 353a in the second direction, and the seventh-second magnet 357b may be disposed in a region overlapping the third-second magnet 353b in the second direction.

Also, the eighth magnet 358 may include an eighth-first magnet 358a having the second polarity and an eighth-second magnet 358b having the first polarity. The eighth-first magnet 358a and the eighth-second magnet 358b may be arranged side by side in the first direction. In addition, the eighth-first magnet 358a may be disposed in a region overlapping the fourth-first magnet 354a in the second direction, and the eighth-second magnet 358b may be disposed in a region overlapping the fourth-second magnet 354b in the second direction.

The second sensing unit 372 may be disposed on a region between the third-first magnet 353a and the third-second magnet 353b. For example, the second sensing unit 372 may be disposed on a region overlapping the boundary between the third-first magnet 353a and the third-second magnet 353b in the second direction. A boundary between the third-first magnet 353a and the third-second magnet 353b may overlap a center of the third magnet 353 in a second direction (y-axis direction).

That is, the second sensing unit 372 may be disposed on a region overlapping the center of the third magnet 353. Accordingly, when the first housing 200 is tilted by the second driving unit 302, the second sensing unit 372 can effectively sense the amount of rotation of the third magnet 353 to more accurately sense the position.

FIG. 20 is another exploded perspective view of the first camera actuator according to the embodiment. Also, FIG. 21 is an exploded perspective view of the prism unit of the first camera actuator according to FIG. 20, and FIG. 22 is a perspective view of the prism unit of the first camera actuator according to FIG. 20.

In the description using FIGS. 20 to 22, descriptions of the same and similar components as those of the first camera actuator described above are omitted, and the same reference numerals are assigned to the same and similar components.

Referring to FIGS. 20 to 22, the first camera actuator 1000 according to the embodiment may include a cover member 100, a first housing 200, a prism unit 400, a first driving unit 301, a second driving unit. 302, a base member 500.

The first housing 200 may have a structure in which a plurality of side surfaces are opened. For example, the first housing 200 may include a lower part 210, a first side part 221, a second side part 222, and an upper part 230.

The first housing 200 may include a plurality of accommodation spaces. For example, the first housing 200 may include a first accommodating space 205 and a second accommodating space 255 separated by the partition wall 250.

The first accommodation space 205 may be disposed between the partition wall 250 and the second side part 222. The prism unit 400 may be disposed in the first accommodation space 205. In addition, the second accommodation space 255 may be disposed between the partition wall 250 and the first side part 221. A part of the configuration of the first driving unit 301 may be disposed in the second accommodation space 255.

The prism unit 400 may include a prism 410 and a prism mover 430 disposed on the prism 410.

The prism 410 may reflect the direction of the light incident from the outside. That is, the prism 410 may change the path of the light incident on the first camera actuator 1000 from the outside toward the second camera actuator 2000 to be described later.

The prism mover 430 may accommodate the prism 410. In addition, the prism mover 430 may include a plurality of outer surfaces. The prism mover 430 may include a first outer surface 430S1 facing the partition wall 250 and a second outer surface 430S2 facing the second partition wall 250. In addition, the prism mover 430 may include a third outer surface 430S3 facing the lower part 210 and a fourth outer surface 430S4 disposed between the first to third outer surfaces 430S1, 430S2, and 430S3, and the surfaces 430S1 and connecting the surfaces 430S1, 430S2 and 430S3 to each other.

The prism mover 430 may include at least one recess. For example, the prism mover 430 may include a first recess 430R1 disposed on the first outer surface 430S1. The first recess 430R1 may be disposed in a region overlapping the center of the prism unit 400 in the first direction (x-axis direction). The first recess 430R1 may have a concave groove shape in a direction from the first outer surface 430S1 to the second outer surface 430S2.

The first recess 430R1 may be disposed in a region corresponding to the first guide protrusion 271. In detail, the first recess 430R1 may be disposed in a region overlapping the first guide protrusion 271 in the first direction. The first recess 430R1 may have a shape corresponding to that of the first guide protrusion 271 and a depth corresponding to that of the first guide protrusion 271. The first recess 430R1 may provide a space in which the first guide protrusion 271 is inserted. The prism unit 400 may be tilted in the vertical direction (y-axis direction) using the first guide protrusion 271 as a rotation axis.

Also, the prism mover 430 may include a second recess 430R2. The second recess 430R2 may be disposed on the second outer surface 430S2. The second recess 430R2 may be disposed in a region overlapping the center of the prism unit 400 in the first direction (x-axis direction). The second recess 430R2 may have a concave groove shape in a direction from the second outer surface 430S2 to the first outer surface 430S1.

The second recess 430R2 may be disposed in a region corresponding to the first recess 430R1 and the first guide protrusion 271. The second recess 430R2 may be disposed in a region overlapping the first recess 430R1 in the first direction. The second recess 430R2 may provide a space in which an end of the first elastic member 610, which will be described later, is inserted.

FIG. 23 is a front view of the first camera actuator according to FIG. 20, and FIGS. 24 and 25 are views for explaining the arrangement relationship of the first driving unit of the first camera actuator according to FIG. 20.

Referring to FIGS. 23 to 25, the first driving unit 301 may be disposed in the first housing 200. The first driving unit 301 may be disposed adjacent to the prism unit 400.

The first driving unit 301 may include a first piezoelectric device 310 and a first elastic member 610.

The first piezoelectric device 310 may be disposed in the first accommodation space 205. The first piezoelectric device 310 may be disposed between the prism unit 400 and the partition wall 250. The first piezoelectric device 310 may be disposed on a region corresponding to the first guide protrusion 271 and the first recess 430R1. The first piezoelectric device 310 may be disposed in a region corresponding to the center of the prism unit 400 in the first direction. The first piezoelectric device 310 may be disposed in direct contact with the first outer surface 430S1.

The first elastic member 610 may be disposed in the first housing 200. The first elastic member 610 may be disposed on a region that does not obstruct the path of the light incident on the first camera actuator 1000. For example, the first elastic member 610 may be disposed on the first side part 221 of the first housing 200. The first elastic member 610 may extend in a first direction (x-axis direction) from the first side part 221 and may be bent in a region corresponding to the second outer surface 430S2 to extend in the third direction (z-axis direction). The first elastic member 610 may be spaced apart from the fourth outer surface 430S4 of the prism unit 400 and may be disposed in contact with the second outer surface 430S2. In addition, an end of the first elastic member 610 may be disposed to be inserted into the second recess 430R2. An end of the first elastic member 610 may be disposed in a region overlapping the first guide protrusion 271 in the first direction.

The first elastic member 610 may include an elastically deformable material. For example, the first elastic member 610 may include a leaf spring.

The first elastic member 610 may press the prism unit 400 in the direction toward of the first piezoelectric device 310. That is, the first elastic member 610 may press the prism unit 400 in the direction of toward the first side part 211. The first elastic member 610 may connect and support the prism unit 400 tilted in the vertical direction (y-axis direction) by the first piezoelectric device 310 with the first piezoelectric device 310.

The prism unit 400 may have a set position. In detail, the first guide protrusion 271 may be disposed by being inserted into the first piezoelectric device 310 and the first outer surface 430S1 of the prism unit 400. A first elastic member 610 for pressing in the direction toward of the partition wall 250 may be disposed on the second outer surface 430S2.

Accordingly, the prism unit 400 may be disposed at a set position in the first housing 200, and the first driving unit 301 may omit the above-described first yoke 331, second yoke 332, the first magnet 351 and the second magnet 352.

Accordingly, the first camera actuator 1000 may have a simpler structure and may be implemented in a smaller size. In addition, in the process in which the prism unit 400 is tilted in the vertical direction (y-axis direction), it is possible to prevent the configuration of at least one of the prism unit 400 and the first piezoelectric device 310 from being separated from the rotation axis.

FIGS. 26 to 28 are views for explaining the arrangement relationship of the second driving unit of the first camera actuator according to FIG. 20.

Referring to FIGS. 26 to 28, the second driving unit 302 may be disposed on the base member 500. The second driving unit 302 may be disposed adjacent to the first housing 200.

The second driving unit 302 may include a second piezoelectric device 320, a second elastic member 620, and a third elastic member 630.

The second piezoelectric device 320 may be disposed on the base member 500. The second piezoelectric device 320 may be disposed between the base member 500 and the first housing 200. In detail, the second piezoelectric device 320 may be disposed between the upper surface of the base member 500 and the lower part 210 of the first housing 200. The second piezoelectric device 320 may be disposed in a region corresponding to the second guide protrusion. The second piezoelectric device 320 may be disposed in a region corresponding to the center of the prism unit 400 in the second direction (y-axis direction). The second piezoelectric device 320 may be disposed in a region overlapping the center of the prism 410 in the second direction.

The second elastic member 620 and the third elastic member 630 may be disposed on the base member 500. The second elastic member 620 and the third elastic member 630 may be disposed on a region that does not obstruct the path of the light incident on the first camera actuator 1000.

For example, the second elastic member 620 may be disposed at one end of the base member 500. The second elastic member 620 may extend in the second direction (y-axis direction) from the upper surface of the base member 500, and may be bent in a region corresponding to the upper part 230 of the first housing 200 to extend in the first direction (x-axis direction). In this case, the second elastic member 620 extending in the first and second directions may be spaced apart from the first housing 200. In addition, the end of the second elastic member 620 extending in the first direction may be bent to extend in the third direction (z-axis direction), and may be in contact with the upper part 230 of the first housing 200.

Also, the third elastic member 630 may be disposed at one end of the base member 500. The second elastic member 620 may extend in the second direction (y-axis direction) from the upper surface of the base member 500, and may be bent in a region corresponding to the upper part 230 of the first housing 200 to extend in the first direction (x-axis direction). In this case, the second elastic member 620 extending in the first and second directions may be spaced apart from the first housing 200. In addition, the end of the second elastic member 620 extending in the first direction may be bent to extend in the third direction (z-axis direction), and may be in contact with the upper part 230 of the first housing 200.

The second elastic member 620 and the third elastic member 630 may have a shape symmetrical to each other. In addition, the second elastic member 620 and the third elastic member 630 may be disposed in a symmetrical area with respect to the center of the prism unit 400.

The second elastic member 620 and the third elastic member 630 may include an elastically deformable material. For example, the second elastic member 620 and the third elastic member 630 may include a leaf spring. The second and third elastic members 620 and 630 may press the first housing 200 toward the second piezoelectric device 320. That is, the second and third elastic members 620 and 630 may press the first housing 200 in the direction toward of the base member 500. The second and third elastic members 620 and 630 may support and connect the first housing 200 tilted in the left and right direction (x-axis direction) by the second piezoelectric device 320 with the second piezoelectric device 320.

The first housing 200 may have a set position. In detail, the second guide protrusion 270 may be disposed to be inserted into the second guide hole 321 of the second piezoelectric device 320, and a second elastic member 620 and a third elastic member 630 for pressing in the direction of the base member 500 may be disposed on the upper part 230 of the first housing 200.

Accordingly, the first housing 200 may be disposed at a position set on the base member 500, and the second driving unit 302 may omit the above-described third yoke 333, the fourth yoke 334, the third magnet 353 and the fourth magnet 354.

Accordingly, the first camera actuator 1000 may have a simpler structure and may be implemented in a smaller size. In addition, it is possible to prevent the configuration of at least one of the first housing 200 and the second piezoelectric device 320 from being separated from the rotation shaft, in the process in which the first housing 200 is tilted in the vertical direction (y-axis direction).

FIG. 29 is a perspective view of a camera module according to an embodiment, and FIG. 30 is a perspective view in which some components are omitted from the camera module according to the embodiment.

Referring to FIGS. 29 and 30, the camera module 10 according to the embodiment may include one or a plurality of camera actuators. For example, the camera module 10 may include the first camera actuator 1000 and the second camera actuator 2000 described above, and a cover case 15 for protecting the first camera actuator 1000 and the second camera actuator 2000.

The first camera actuator 1000 may be an optical image stabilizer (OIS) actuator. In this case, the light incident on the camera module 10 from the outside may first be incident on the first camera actuator 1000. Also, the light incident on the first camera actuator 1000 may be incident on the second camera actuator 2000 by changing a path of the light. Subsequently, the light passing through the second camera actuator 2000 may be incident on the image sensor 2900.

The second camera actuator 2000 may be a zoom and/or auto focus actuator. The second camera actuator 2000 may include a plurality of lenses. The second camera actuator 2000 may perform a zoom or autofocus function by moving at least one lens in the optical axis direction according to a control signal of the controller. The second camera actuator 2000 will be described in more detail with reference to the drawings to be described later.

FIG. 31 is an exploded perspective view of a second camera actuator according to an embodiment, FIG. 32 is a cross-sectional view of a second camera actuator according to an embodiment, FIG. 33 is a front view of a second camera actuator according to an embodiment, FIG. 34 is a perspective view illustrating third and fourth driving units disposed in a first housing of a second camera actuator according to an embodiment, FIG. 35 is an exploded perspective view of a third driving unit according to an embodiment, FIG. 36 is an exploded perspective view of a fourth driving unit according to the embodiment, and FIG. 37 is a perspective view of a partial configuration of the second camera actuator according to the embodiment.

Referring to FIGS. 31 to 37, the second camera actuator 2000 according to the embodiment may include a second housing 2100, a first lens unit 2105, a first lens barrel 2200, a third driving unit 2300, a second lens barrel 2400, and a fourth driving unit 2500.

The second housing 2100 may form an exterior of the second camera actuator 2000. The second housing 2100 may have upper and lower partial regions open and may have a hexahedral shape.

The second housing 2100 may include an accommodating space therein. The first lens barrel 2200, the third driving unit 2300, the second lens barrel 2400, and the fourth driving unit 2500 may be accommodated in the accommodating space of the second housing 2100.

The second housing 2100 may include a first sub-housing 2110 and a second sub-housing 2120.

The first sub-housing 2110 may include a first hole 2111. The first hole 2111 may be formed on one side of the first sub-housing 2110. The first hole 2111 is a hollow hole and may be a hole passing through outside and inside of the first sub-housing 2110.

The first sub-housing 2110 may further include a second hole 2112 and a third hole 2113. The second hole 2112 and the third hole 2113 may be disposed on one side of the first sub-housing 2110. The second hole 2112 and the third hole 2113 may be hollow holes passing through the outside and the inside of the first sub-housing 2110. The second hole 2112 and the third hole 2113 may be spaced apart from the first hole 2111. In detail, the first hole 2111 may be disposed between the second hole 2112 and the third hole 2113. The first hole 2111 may be disposed at equal intervals to the second hole 2112 and the third hole 2113.

The second hole 2112 may include a plurality of protrusions protruding from an inner circumferential surface of the second hole 2112 toward the center of the second hole 2112. For example, the plurality of protrusions may include a first protrusion 2112a disposed at an upper end of the second hole 2112 and a second protrusion 2112b disposed at a lower end of the second hole 2112 in the optical axis direction.

In detail, the first protrusion 2112a may include a plurality of first sub-protrusions (not shown) spaced apart from each other. The plurality of first sub-protrusions may be arranged at equal intervals from the center of the second hole 2112 along a circumference of a concentric circle shape. Also, the second protrusion 2112b may be spaced apart from the first protrusion 2112a in the optical axis direction. The second protrusion 2112b may be disposed below the first protrusion 2112a. The second protrusion 2112b may include a plurality of second sub-protrusions (not shown) spaced apart from each other. The plurality of second sub-protrusions may be arranged at equal intervals from the center of the second hole 2112 along a circumference of a concentric circle shape. The first protrusion 2112a and the second protrusion 2112b may provide a space in which a portion of the third driving unit 2300 to be described later, for example, the first buffer member 2321 is disposed.

The third hole 2113 may include a plurality of protrusions protruding from an inner circumferential surface of the third hole 2113 toward the center of the third hole 2113. The plurality of protrusions may include a third protrusion 2113a disposed at an upper end of the third hole 2113 and a fourth protrusion 2113b disposed at a lower end of the second hole 2112 with respect to the optical axis direction.

The third protrusion 2113a may include a plurality of third sub-protrusions (not shown) spaced apart from each other. The plurality of third sub-protrusions may be arranged at equal intervals from the center of the third hole 2113 along a circumference of a concentric circle shape. Also, the fourth protrusion 2113b may be spaced apart from the third protrusion 2113a in the optical axis direction. The fourth protrusion 2113b may include a plurality of fourth sub-protrusions (not shown) spaced apart from each other. The plurality of fourth sub-protrusions may be arranged at equal intervals from the center of the third hole 2113 along a circumference of a concentric circle shape. The third protrusion 2113a and the fourth protrusion 2113b may provide a space in which a portion of the fourth driving unit 2500 to be described later, for example, a third buffer member 2521 is disposed.

The second sub-housing 2120 may be disposed under the first sub-housing 2110. In detail, the second sub-housing 2120 may be disposed under the first sub-housing 2110 in a third direction (z-axis, optical-axis direction). The second sub-housing 2120 may be disposed closer to an image sensor 2900 to be described later than the first sub-housing 2110. The first lens barrel 2200, the third driving unit 2300, the second lens barrel 2400, and the fourth driving unit 2500 may be disposed in the second sub-housing 2120.

The second sub-housing 2120 may be coupled to the first sub-housing 2110. For example, the first sub-housing 2110 and the second sub-housing 2120 may be coupled by a separate fastening member (not shown) such as a screw. In addition, the first sub-housing 2110 and the second sub-housing 2120 may be coupled to each other by physical coupling of coupling jaws and coupling grooves respectively formed therein.

The first lens unit 2105 may be disposed in the second housing 2100 and may include at least one lens. For example, the first lens unit 2105 may be disposed in the first sub-housing 2110. In detail, the first lens unit 2105 may be disposed in the first hole 2111 of the first sub-housing 2110. For example, the first lens unit 2105 may be coupled to the first sub-housing 2110 by a screw thread formed on an inner circumferential surface of the first hole 2111.

The first lens barrel 2200 may be disposed in the second housing 2100. The first lens barrel 2200 may be disposed in the second sub-housing 2120. The first lens barrel 2200 may be disposed under the first lens unit 2105. For example, the first lens barrel 2200 may be disposed below the first lens unit 2105 in the optical axis direction, and may be closer to the image sensor 2900 than the first lens unit 2105. The first lens barrel 2200 may be coupled to the third driving unit 2300. The first lens barrel 2200 may move in the second housing 2100 by the third driving unit 2300. In detail, the first lens barrel 2200 may be moved in the optical axis direction by the third driving unit 2300.

The first lens barrel 2200 may include a first barrel part 2210, a second lens unit 2205, a first guide part 2220, and a first elastic part 2230.

The first barrel part 2210 may be disposed in a region overlapping the optical axis and may have an open shape on one surface and the other surface. For example, the first barrel part 2210 may have a cylindrical shape in which one surface and the other surface are open.

The first barrel part 2210 may include the first through hole 2211. The first through hole 2211 may be a through hole penetrating through one surface and the other surface of the first barrel part 2210. Here, one surface of the first barrel part 2210 may be a surface facing the first lens unit 2105, and the other surface may be a surface opposite to the one surface and facing the image sensor 2900.

The second lens unit 2205 may be disposed on the first barrel part 2210. In detail, the second lens unit 2205 may be disposed in the first through hole 2211. For example, a screw line may be formed on an inner circumferential surface of the first through hole 2211, and the second lens unit 2205 may be coupled to the first barrel part 2210 by the screw line.

The second lens unit 2205 may include at least one lens. The second lens unit 2205 may perform a zoom function. The second lens unit 2205 may move in the optical axis direction. In detail, the second lens unit 2205 may move in the optical axis direction with respect to the first lens unit 2105.

The first guide part 2220 may extend outwardly from the first barrel part 2210. For example, the first guide part 2220 may extend from the first barrel part 2210 in a direction perpendicular to the optical axis, for example, in a first direction (x-axis direction).

The first guide part 2220 may include a first upper surface 2221, a first side surface 2222, and a first lower surface 2223.

The first upper surface 2221 may face an inner upper surface of the second housing 2100. The first upper surface 2221 may face the inner upper surface of the second housing 2100 in the second direction (y-axis direction). The first upper surface 2221 may include a plurality of sub upper surfaces. In detail, the first upper surface 2221 may include a first sub upper surface 2221a and a second sub upper surface 2221b that is disposed lower than the first sub upper surface 2221a in a second direction (y-axis direction). That is, the second sub upper surface 2221b may be disposed adjacent to the first lower surface 2223 than the first sub upper surface 2221a. At least one first fastening protrusion (not shown) may be disposed on the second sub upper surface 2221b. The first fastening protrusion may have a shape protruding upward on the second sub upper surface 2221b. The first fastening protrusion may be inserted into a first fixing groove (not shown) formed in a first elastic part 2230 to be described later.

Also, the first upper surface 2221 may include a first stepped surface 2225 disposed between the first sub upper surface 2221a and the second sub upper surface 2221b. The first stepped surface 2225 may be connected to ends of the first sub upper surface 2221a and the second sub upper surface 2221b. The first stepped surface 2225 may be defined as the first stepped portion 2225. That is, the first upper surface 2221 may include the first sub upper surface 2221a, the second sub upper surface 2221b, and the first stepped portion 2225, and may have a stepped structure.

The first lower surface 2223 may face an inner lower surface of the second housing 2100 to be described later. A first groove 223h1 may be disposed on the first lower surface 2223. The first groove 223h1 may have a concave shape in a direction from the first lower surface 2223 to the first upper surface 2221. A first magnetic scaler 2610, which will be described later, may be disposed in the first groove 223h1.

Also, a second groove 2223h2 may be disposed on the first lower surface 2223. The second groove 2223h2 may be spaced apart from the first groove 223h1. The second groove 2223h2 may be disposed in an edge region of the first lower surface 2223. The second groove 2223h2 may provide a region in which a portion of the first elastic part 2230, which will be described later, is disposed. In detail, the second groove 2223h2 may provide a region in which the first elastic part 2230 is mounted and fixed.

The first side surface 2222 may be disposed between the first upper surface 2221 and the first lower surface 2223. In detail, the first side surface 2222 may be a surface connecting the first upper surface 2221 and the first lower surface 2223. In more detail, the first side surface 2222 may be a surface connecting the second sub upper surface 2221b and the first lower surface 2223. The first side surface 2222 may face a second inner surface of the second sub-housing 2120 to be described later.

A first recess 2222h may be disposed on the first side surface 2222. The first recess 2222h may have a concave shape in a direction from the first side surface 2222 to the first barrel part 2210. Also, the first recess 2222h may have a groove shape extending in the optical axis direction (z-axis direction). The first recess 2222h may have a V-shape when viewed from a front.

The first guide part 2220 may include a first insertion hole 2220h1. The first insertion hole 2220h1 may be a hole passing through one surface and the other surface of the first guide part 2220. Here, one surface of the first guide part 2220 may be a surface facing the first lens unit 2105, and the other surface may be a surface opposite to the one surface and facing the image sensor 2900.

A first pin 2250 may be disposed in the first insertion hole 2220h1. The first pin 2250 may be disposed to pass through the first insertion hole 2220h1. The first pin 2250 may have a shape extending in the optical axis direction (z-axis direction), and may have a length in the optical axis direction longer than that of the first lens barrel 2200. The first pin 2250 may be coupled to at least one of the first sub-housing 2110 and the second sub-housing 2120. The first lens barrel 2200 may move the first pin 2250 as a movement axis in the optical axis direction. Through this, the second lens unit 2205 disposed in the first lens barrel 2200 may perform a zoom function and/or an autofocus function.

The first elastic part 2230 may be disposed on the first guide part 2220. For example, the first elastic part 2230 may be disposed on the first upper surface 2221, the first lower surface 2223, and the first side surface 2222 of the first guide part 2220. The first elastic part 2230 may be coupled to the first guide part 2220.

The first elastic part 2230 may include a first elastic member 2231 and a second elastic member 2232.

The first elastic member 2231 may be coupled to the first guide part 2220. The first elastic member 2231 may be disposed at a set position on the first side surface 2222.

The first elastic member 2231 may have a shape corresponding to the first side surface 2222. For example, the first elastic member 2231 may include a first region 2231a, a second region 2231b, and a third region 2231c.

The first region 2231a and the second region 2231b may be disposed on the first side surface 2222 of the first guide part 2220 and may be spaced apart from each other. The first region 2231a and the second region 2231b may be disposed on a region of the first side surface 2222 in which the first recess 2222h is not disposed.

The third region 2231c may be disposed between the first region 2231a and the second region 2231b to connect the two regions 2231a and 2231b. The third region 2231c may be disposed in a region corresponding to the first recess 2222h. The third region 2231c may have a V-shape corresponding to the first recess 2222h.

The second elastic member 2232 may be disposed on the first guide part 2220. The second elastic member 2232 may be coupled to the first guide part 2220.

The second elastic member 2232 may include a fourth region 2232a, a fifth region 2232b, and a sixth region 2232c.

The fourth region 2232a may be disposed on the first upper surface 2221 of the first guide part 2220. In detail, the fourth region 2232a may be disposed on the second sub upper surface 2221b of the first guide part 2220. The fourth region may include a first fixing groove (not shown). The first fixing groove may be disposed in a region corresponding to the first fastening protrusion, and may have a shape corresponding to the first fastening protrusion.

The fifth region 2232b may be connected to the fourth region 2232a. For example, the fifth region 2232b may be bent at one end of the fourth region 2232a and may be disposed on the first side surface 2222 of the first guide part 2220. The fifth region 2232b may be disposed on the first elastic member 2231. The fifth region 2232b may be parallel to the first region 2231a and the second region 2231b. The fifth region 2232b may be disposed to cover the first elastic member 2231.

The sixth region 2232c may be connected to the fifth region 2232b. For example, the sixth region 2232c may be bent at one end of the fifth region 2232b and may be disposed on the first lower surface 2223 of the first guide part 2220. A portion of the sixth region 2232c may be inserted into the second groove 2223h2 disposed on the first lower surface 2223.

That is, the second elastic member 2232 may be physically coupled to the first guide part 2220 by inserting the sixth region 2232c into the second groove 2223h2 while the first fixing groove formed in the fourth region 2232a engages the first fastening protrusion. Accordingly, the first elastic part 2230 may maintain a state firmly coupled to the first guide part 2220.

In addition, the first lens barrel 2200 may further include a first guide groove 2210h1. The first guide groove 2210h1 may be disposed in a region extending outwardly from the first barrel part 2210. The first guide groove 2210h1 may be disposed in a region corresponding to a second pin 2450 to be described later. The first guide groove 2210h1 may provide a space into which the second pin 2450 is inserted. The first lens barrel 2200 may move in the optical axis direction by the first pin 2250 and the second pin 2450. In this case, the first guide groove 2210h1 may have an open shape at one side. For example, the first guide groove 2210h1 may have an open shape at one side facing the first inner surface of the second housing 2100. Accordingly, friction and vibration generated when the first lens barrel 2200 is moved by the third driving unit 2300 may be minimized.

The second camera actuator 2000 may include a third driving unit 2300. The third driving unit 2300 may be disposed in the second housing 2100. The third driving unit 2300 may be coupled to the first lens barrel 2200. The third driving unit 2300 may move the first lens barrel 2200 in the optical axis direction (z-axis direction).

The third driving unit 2300 may include a first piezoelectric device 2310, a first extension bar 2320, a first buffer member 2321, and a second buffer member 2322.

The first piezoelectric device 2310 may include a piezoelectric device. For example, the first piezoelectric device 2310 may include a material that causes mechanical deformation by applied power. The first piezoelectric device 2310 may contract or expand by applied power and may cause mechanical deformation in a set direction. For example, the first piezoelectric device 2310 may generate vibration while causing mechanical deformation in the optical axis direction (z-axis direction) by the applied power.

The first piezoelectric device 2310 may include a first disk part 2311 and a first protrusion 2512. The first disk part 2311 may have a plate shape and may be disposed on the second hole 2112. For example, the first disk part 2311 may be disposed on the first protrusion 2112a of the second hole 2112. In detail, the first disk part 2311 may be disposed on the plurality of first sub-protrusions. The first protrusion 2112a may support the first disk part 2311.

The first protrusion 2512 may be disposed under the first disk part 2311. In detail, the first protrusion 2512 may be disposed under the first disc part 2311 in the third direction (z-axis direction) and may be connected to the first disc part 2311. A portion of the first protrusion 2512 may be disposed in the second hole 2112. The first protrusion 2512 may have a shape protruding toward the image sensor 2900. A width (x-axis, y-axis direction) of the first protrusion 2512 may change toward the optical axis direction. For example, the width of the first protrusion 2512 may decrease as it approaches the image sensor 2900.

The first extension bar 2320 may extend in the optical axis direction. The first extension bar 2320 may be disposed parallel to the optical axis and may be connected to the first piezoelectric device 2310. For example, an upper end of the first extension bar 2320 may be connected to the first protrusion 2512. In addition, a lower end of the first extension bar 2320 may be inserted into a lower end of the second housing 2100, for example, a fourth hole (not shown) formed at the lower end of the second sub-housing 2120.

In addition, one region of the first extension bar 2320 may be connected to the first lens barrel 2200. For example, the first extension bar 2320 may be connected to the first lens barrel 2200 by the first elastic part 2230. In detail, the first extension bar 2320 may be disposed between the first elastic member 2231 and the second elastic member 2232. In more detail, the first extension bar 2320 may be disposed between the third region 2231c of the first elastic member 2231 and the fifth region 2232b of the second elastic member 2232. The first extension bar 2320 may be fixed by the elastic force of the first elastic member 2231 and the second elastic member 2232.

The first extension bar 2320 may transmit the vibration generated in the first piezoelectric device 2310 to the first lens barrel 2200. The first lens barrel 2200 may move upward or downward (z-axis direction, optical-axis direction) according to the vibration direction of the first extension bar 2320. Through this, the second lens unit 2205 in the first lens barrel 2200 may move to perform a zooming function of zooming up or zooming out.

The first buffer member 2321 may be disposed on the first extension bar 2320. The first buffer member 2321 may be disposed on an upper region of the first extension bar 2320. The first buffer member 2321 may be disposed in the second hole 2112 of the second housing 2100. For example, the first buffer member 2321 may be disposed between the first protrusion 2112a and the second protrusion 2112b of the second hole 2112. The first buffer member 2321 may be fixed to a position set by the first protrusion 2112a and the second protrusion 2112b. In addition, the first buffer member 2321 may include a through hole into which the first extension bar 2320 is inserted.

The second buffer member 2322 may be disposed on the first extension bar 2320. The second buffer member 2322 may be disposed on a lower region of the first extension bar 2320. The second buffer member 2322 may be spaced apart from the first buffer member 2321 in the optical axis direction. The second buffer member 2322 may be disposed in a fourth hole (not shown) of the second housing 2100. The second buffer member 2322 may be disposed to be inserted into the fourth hole. The second buffer member 2322 may include a through hole into which the first extension bar 2320 is inserted.

The first buffer member 2321 and the second buffer member 2322 may prevent noise caused by the vibration of the first extension bar 2320. In addition, the first buffer member 2321 and the second buffer member 2322 may prevent the first extension bar 2320 from being deformed or damaged by an external impact.

The second lens barrel 2400 may be disposed in the second housing 2100. The second lens barrel 2400 may be disposed in the second sub-housing 2120. The second lens barrel 2400 may be disposed under the first lens barrel 2200. For example, the second lens barrel 2400 may be disposed under the first lens barrel 2200 in the optical axis direction, and may be closer to the image sensor 2900 than the first lens barrel 2200. The second lens barrel 2400 may be coupled to the fourth driving unit 2500. The second lens barrel 2400 may move in the second housing 2100 by the fourth driving unit 2500. In detail, the second lens barrel 2400 may be moved in the optical axis direction by the fourth driving unit 2500.

The second lens barrel 2400 may include a second barrel part 2410, a third lens unit 2405, a second guide part 2420, and a second elastic part 2430.

The second barrel part 2410 may be disposed in a region overlapping the optical axis and may have an open shape on one surface and the other surface. For example, the second barrel part 2410 may have a cylindrical shape in which one surface and the other surface are open.

The second barrel part 2410 may include the second through hole 2411. The second through hole 2411 may be a through hole penetrating through one surface and the other surface of the second barrel part 2410. Here, one surface of the second barrel part 2410 may be a surface facing the first lens barrel 2200, and the other surface may be a surface opposite to the one surface and facing the image sensor 2900.

The third lens unit 2405 may be disposed on the second barrel part 2410. In detail, the third lens unit 2405 may be disposed in the second through hole 2411. For example, a screw line may be formed on an inner circumferential surface of the second through hole 2411, and the third lens unit 2405 may be coupled to the second barrel part 2410 by the screw line.

The third lens unit 2405 may include at least one lens. The third lens unit 2405 may perform an auto focus function. The third lens unit 2405 may move in the optical axis direction. In detail, the third lens unit 2405 may move in the optical axis direction with respect to the first lens unit 2105. The third lens unit 2405 may move separately from the second lens unit 2205. Also, the distance at which the third lens unit 2405 can move in the optical axis direction may be the same as or different from that of the second lens unit 2205.

The second guide part 2420 may extend outwardly from the second barrel part 2410. For example, the second guide part 2420 may extend from the second barrel part 2410 in a direction perpendicular to the optical axis, for example, in a first direction (x-axis direction). In this case, the second guide part 2420 may extend in a direction opposite to the first guide part 2220. For example, the first guide part 2220 may extend from the first barrel part 2210 in a +x-axis direction, and the second guide part 2420 may extend from the second barrel part 2410 in a −x-axis direction.

The second guide part 2420 may include a second lower surface 2421, a second side surface 2422, and a second upper surface 2423.

The second upper surface 2423 may face an inner upper surface of the second housing 2100. The second upper surface 2423 may face the inner upper surface of the second housing 2100 in the second direction (y-axis direction). A third groove 2423h1 may be disposed on the second upper surface 2423. The third groove 2423h1 may have a concave shape in a direction from the second upper surface 2423 to the second lower surface 2421. A second magnetic scaler 2620, which will be described later, may be disposed in the third groove 2423h1.

In addition, a fourth groove 2423h2 may be disposed on the second upper surface 2423. The fourth groove 2423h2 may be spaced apart from the third groove 2423h1. The fourth groove 2423h2 may be disposed in an edge region of the second upper surface 2423. The fourth groove 2423h2 may provide a region in which a portion of the second elastic part 2430, which will be described later, is disposed. In detail, the fourth groove 2423h2 may provide a region in which the second elastic part 2430 is mounted and fixed.

The second lower surface 2421 may face an inner lower surface of the second housing 2100. The second lower surface 2421 may face the inner lower surface of the second housing 2100 in the second direction (y-axis direction). The second lower surface 2421 may include a plurality of sub lower surfaces. In detail, the second lower surface 2421 may include a first sub lower surface 2421a and a second sub-lower surface 2421b disposed above the first sub-lower surface 2421a in a second direction (y-axis direction). That is, the second sub lower surface 2421b may be disposed closer to the second upper surface 2423 than the first sub lower surface 2421a. At least one second fastening protrusion (not shown) may be disposed on the second sub lower surface 2421b. The second fastening protrusion may have a shape protruding downward from the second sub-lower surface 2421b. The second fastening protrusion may be inserted into a second fixing groove (not shown) formed in a second elastic part 2430 to be described later.

Also, the second lower surface 2421 may include a second stepped surface 2425 disposed between the first sub lower surface 2421a and the second sub lower surface 2421b. The second stepped surface 2425 may be connected to ends of the first sub-lower surface 2421a and the second sub-lower surface 2421b. The second stepped surface 2425 may be defined as the second stepped portion 2425. That is, the second lower surface 2421 may include the first sub lower surface 2421a, the second sub lower surface 2421b, and the second stepped portion 2425 and may have a stepped structure.

The second side surface 2422 may be disposed between the second upper surface 2423 and the second lower surface 2421. In detail, the second side surface 2422 may be a surface connecting the second upper surface 2423 and the second lower surface 2421. In more detail, the second side surface 2422 may be a surface connecting the second sub-lower surface 2421b and the second upper surface 2423. The second side surface 2422 may face a first inner surface of the second sub-housing 2120 to be described later.

A second recess 2422h may be disposed on the second side surface 2422. The second recess 2422h may have a concave shape from the second side surface 2422 toward the second barrel part 2410. Also, the second recess 2422h may have a groove shape extending in the optical axis direction (z-axis direction). The second recess 2422h may have a V-shape when viewed from a front.

The second guide part 2420 may include a second insertion hole 2420h1. The second insertion hole 2420h1 may be a hole passing through one surface and the other surface of the second guide part 2420. Here, one surface of the second guide part 2420 may be a surface facing the first lens barrel 2200, and the other surface may be a surface opposite to the one surface and facing the image sensor 2900.

A second pin 2450 may be disposed in the second insertion hole 2420h1. The second pin 2450 may be disposed to pass through the second insertion hole 2420h1. The second pin 2450 may have a shape extending in the optical axis direction (z-axis direction). The second pin 2450 may be spaced apart from the first pin 2250 and may be parallel to the first pin 2250. The second pin 2450 may have a length in the optical axis direction longer than that of the second lens barrel 2400. The second pin 2450 may be coupled to at least one of the first sub-housing 2110 and the second sub-housing 2120. The second lens barrel 2400 may move the second pin 2450 as a movement axis in the optical axis direction. Through this, the third lens unit 2405 disposed in the second lens barrel 2400 may perform a zoom function and/or an autofocus function.

The second elastic part 2430 may be disposed on the second guide part 2420. For example, the second elastic part 2430 may be disposed on the second upper surface 2423, the second lower surface 2421, and the second side surface 2422 of the second guide part 2420. The second elastic part 2430 may be coupled to the second guide part 2420.

The second elastic part 2430 may include a third elastic member 2431 and a fourth elastic member 2432.

The third elastic member 2431 may be coupled to the second guide part 2420. The third elastic member 2431 may be disposed at a set position on the second side surface 2422.

The third elastic member 2431 may have a shape corresponding to the second side surface 2422. For example, the third elastic member 2431 may include a seventh region 2431a, an eighth region 2431b, and a ninth region 2431c.

The seventh region 2431a and the eighth region 2431b may be disposed on the second side surface 2422 of the second guide part 2420 and may be spaced apart from each other. The seventh region 2431a and the eighth region 2431b may be disposed on a region of the second side surface 2422 in which the second recess 2422h is not disposed.

The ninth region 2431c may be disposed between the first region 2231a and the second region 2231b to connect the two regions 2431a and 2431b. The ninth region 2431c may be disposed in a region corresponding to the second recess 2422h. The ninth region 2431c may have a V-shape corresponding to the second recess 2422h.

The fourth elastic member 2432 may be disposed on the second guide part 2420. The fourth elastic member 2432 may be coupled to the second guide part 2420.

The fourth elastic member 2432 may include a tenth region 2432a, an eleventh region 2432b, and a twelfth region 2432c.

The tenth region 2432a may be disposed on the second lower surface 2421 of the second guide part 2420. In detail, the tenth region 2432a may be disposed on the second sub lower surface 2421b of the second guide part 2420. The tenth region 2431a may include a second fixing groove (not shown). The second fixing groove may be disposed in a region corresponding to the second fastening protrusion, and may have a shape corresponding to the second fastening protrusion.

The eleventh region 2432b may be connected to the tenth region 2432a. For example, the eleventh region 2432b may be bent at one end of the tenth region 2432a and may be disposed on the second side surface 2422 of the second guide part 2420. The eleventh region 2432b may be disposed on the third elastic member 2431. The eleventh region 2432b may be parallel to the seventh region 2431a and the eighth region 2431b. The eleventh region 2432b may be disposed to cover the third elastic member 2431.

The twelfth region 2432c may be connected to the eleventh region 2432b. For example, the twelfth region 2432c may be bent at one end of the eleventh region 2432b and may be disposed on the second upper surface 2423 of the second guide part 2420. A portion of the twelfth region 2432c may be inserted into the fourth groove 2423h2 disposed on the second upper surface 2423.

That is, the fourth elastic member 243 may be physically coupled to the second guide part 2420 by inserting the twelfth region 2432c into the fourth groove 2423h2 while the second fixing groove formed in the seventh region 2431a engages the second fastening protrusion. Accordingly, the second elastic part 2430 may maintain a state firmly coupled to the second guide part 2420.

In addition, the second lens barrel 2400 may further include a second guide groove 2410h1. The second guide groove 2410h1 may be disposed in a region extending outwardly from the second barrel part 2410. The second guide groove 2410h1 may be disposed in a region corresponding to the first pin 2250. The second guide groove 2410h1 may provide a space into which the first pin 2250 is inserted. The second lens barrel 2400 may move in the optical axis direction by the first pin 2250 and the second pin 2450. In this case, the second guide groove 2410h1 may have an open shape at one side. For example, the second guide groove 2410h1 may have an open shape at one side facing the second inner surface of the second housing 2100. Accordingly, friction and vibration generated when the second lens barrel 2400 is moved by the fourth driving unit 2500 can be minimized.

The second camera actuator 2000 may include a fourth driving unit 2500. The fourth driving unit 2500 may be disposed in the second housing 2100. The fourth driving unit 2500 may be coupled to the second lens barrel 2400. The fourth driving unit 2500 may move the second lens barrel 2400 in the optical axis direction (z-axis direction).

The fourth driving unit 2500 may include a second piezoelectric device 2510, a second extension part 2520, a third buffer member 2521, and a fourth buffer member 2522.

The second piezoelectric device 2510 may include a piezo-electric device. For example, the second piezoelectric device 2510 may include a material that causes mechanical deformation by applied power. The second piezoelectric device 2510 may contract or expand by applied power and may cause mechanical deformation in a set direction. For example, the second piezoelectric device 2510 may generate vibration while causing mechanical deformation in the optical axis direction (z-axis direction) by the applied power.

The second piezoelectric device 2510 may include a second disk part 2511 and a second protrusion 2512. The second disk part 2511 has a plate shape and may be disposed on the third hole 2113. For example, the second disk part 2511 may be disposed on the third protrusion 2113a of the third hole 2113. In detail, the second disk part 2511 may be disposed on the plurality of third sub-protrusions. The third protrusion 2113a may support the second disc part 2511.

The second protrusion 2512 may be disposed under the second disk part 2511. In detail, the second protrusion 2512 may be disposed under the second disc part 2511 in the third direction (z-axis direction) and may be connected to the second disc part 2511. A portion of the first protrusion 2512 may be disposed in the third hole 2113. The second protrusion 2512 may have a shape protruding toward the image sensor 2900. A width (x-axis, y-axis direction) of the second protrusion 2512 may change toward the optical axis direction. For example, the width of the second protrusion 2512 may decrease as it approaches the image sensor 2900.

The second extension part 2520 may extend in the optical axis direction. The second extension part 2520 may be disposed parallel to the optical axis and may be connected to the second piezoelectric device 2510. For example, an upper end of the second extension part 2520 may be connected to the second protrusion 2512. Also, the lower end of the second extension part 2520 may be inserted into the lower end of the second housing 2100, for example, a fifth hole (not shown) formed at the lower end of the second sub-housing 2120.

In addition, one region of the second extension part 2520 may be connected to the second lens barrel 2400. For example, the second extension part 2520 may be connected to the second lens barrel 2400 by the second elastic part 2430. In detail, the second extension part 2520 may be disposed between the third elastic member 2431 and the fourth elastic member 2432. In more detail, the second extension part 2520 may be disposed between the ninth region 2431*c* of the third elastic member 2431 and the eleventh region 2432*b* of the fourth elastic member 2432. The second extension part 2520 may be fixed by the elastic force of the third elastic member 2431 and the fourth elastic member 2432.

The second extension part 2520 may transmit the vibration generated in the second piezoelectric device 2510 to the second lens barrel 2400. The second lens barrel 2400 may move upward or downward (z-axis direction, optical-axis direction) according to the vibration direction of the second extension part 2520. Through this, the third lens unit 2405 in the second lens barrel 2400 may move to perform a zooming function of zooming up or zooming out.

The third buffer member 2521 may be disposed on the second extension part 2520. The third buffer member 2521 may be disposed on an upper region of the second extension part 2520. The third buffer member 2521 may be disposed in the third hole 2113 of the second housing 2100. For example, the third buffer member 2521 may be disposed between the third protrusion 2113*a* and the fourth protrusion 2113*b* of the third hole 2113. The third buffer member 2521 may be fixed to a position set by the third protrusion 2113*a* and the fourth protrusion 2113*b*. In addition, the third buffer member 2521 may include a through hole into which the second extension part 2520 is inserted.

The fourth buffer member 2522 may be disposed on the second extension part 2520. The fourth buffer member 2522 may be disposed on a lower region of the second extension part 2520. The fourth buffer member 2522 may be spaced apart from the third buffer member 2521 in the optical axis direction. The fourth buffer member 2522 may be disposed in a fifth hole (not shown) of the second housing 2100. The fourth buffer member 2522 may be disposed to be inserted into the fifth hole. The second buffer member 2322 may include a through hole into which the second extension part 2520 is inserted.

The third buffer member 2521 and the fourth buffer member 2522 may prevent noise caused by vibration of the second extension part 2520. In addition, the third buffer member 2521 and the fourth buffer member 2522 may prevent the second extension part 2520 from being deformed or damaged by an external impact.

The second camera actuator 2000 may include a first magnetic scaler 2610, a first sensing unit (not shown), a second magnetic scaler 2620, and a second sensing unit (not shown).

The first magnetic scaler 2610 may be disposed on the first lens barrel 2200. For example, the first magnetic scaler 2610 may be disposed on the first lower surface 2223. In detail, the first magnetic scaler 2610 may be disposed in the first groove 223*h*1 of the first lens barrel 2200. The first magnetic scaler 2610 may move along the optical axis direction together with the first lens barrel 2200.

The first magnetic scaler 2610 may include a plurality of magnets. For example, the first magnetic scaler 2610 may have an N pole and an S pole alternately disposed in the optical axis direction.

The first sensing unit may be disposed adjacent to the first magnetic scaler 2610. For example, the first sensing unit may be disposed to face the first magnetic scaler 2610 in a first direction (x-axis direction) or a second direction (y-axis direction). The first sensing unit may detect a position of the first magnetic scaler 2610. Through this, the first sensing unit may detect the position and movement of the first lens barrel 2200 moving together with the first magnetic scaler 2610.

The second magnetic scaler 2620 may be disposed on the second lens barrel 2400. For example, the second magnetic scaler 2620 may be disposed on the second upper surface 2423. In detail, the second magnetic scaler 2620 may be disposed in the third groove 2423*h*1 of the second lens barrel 2400. The second magnetic scaler 2620 may move along the optical axis direction together with the second lens barrel 2400.

The second magnetic scaler 2620 may include a plurality of magnets. For example, the second magnetic scaler 2620 may have an N pole and an S pole alternately disposed in the optical axis direction.

Also, the second sensing unit may be disposed adjacent to the second magnetic scaler 2620. For example, the second sensing unit may be disposed to face the second magnetic scaler 2620 in a first direction (x-axis direction) or a second direction (y-axis direction). The second sensing unit may detect a position of the second magnetic scaler 2620. Through this, the second sensing unit may detect the position and movement of the second lens barrel 2400 moving together with the second magnetic scaler 2620.

Also, although not shown in the drawings, the second camera actuator 2000 according to the embodiment may further include a gyro sensor (not shown). The gyro sensor may be disposed in the second housing 2100. The gyro sensor may detect a movement of a user using the camera actuator.

The second camera actuator 2000 according to the embodiment may include a second substrate 2800. The second substrate 2800 may be disposed on the second housing 2100. The second substrate 2800 may be disposed to surround a partial region of the second housing 2100. For example, the second substrate 2800 may be disposed to surround a portion of the outer side of the second sub-housing 2120. The second substrate 2800 may provide power or current to components disposed in the second housing 2100. That is, the second substrate 2800 may be a circuit board, and may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB). The second substrate 2800 may be electrically connected to the above-described first circuit board 310.

The second substrate 2800 may include a first end 2810. The first end 2810 may be disposed on the first piezoelectric device 2310 of the third driving unit 2300. For example, the first end 2810 may be disposed on the first disk part 2311 of the first piezoelectric device 2310. In detail, the first end 2810 may be disposed on one surface of the first disk part 2311. Also, the first end 2810 may be disposed on the second piezoelectric device 2510 of the fourth driving unit 2500. For example, the second end 2820 may be disposed on the second disk part 2511 of the second piezoelectric device 2510. In detail, the first end 2810 may be disposed on one surface of the second disk part 2511.

The second substrate 2800 may include a second end 2820. The first end 2810 may be spaced apart from the first end 2810. Also, the second end 2820 may be disposed in a region that does not overlap the first end 2810 in the optical axis direction.

The second end 2820 may be disposed on the first piezoelectric device 2310 of the third driving unit 2300. For example, the second end 2820 may be disposed on the first disk part 2311 of the first piezoelectric device 2310. In detail, the first end 2810 may be disposed on the other surface opposite to one surface of the first disk part 2311. Also, the second end 2820 may be disposed on the second piezoelectric device 2510 of the fourth driving unit 2500. For example, the second end 2820 may be disposed on the second disk part 2511 of the second piezoelectric device 2510. In detail, the second end 2820 may be disposed on the other surface opposite to one surface of the second disk part 2511.

That is, the second substrate 2800 may supply power to the first piezoelectric device 2310 and the second piezoelectric device 2510. Accordingly, the third driving unit 2300 and the fourth driving unit 2500 may drive the first lens barrel 2200 and the second lens barrel 2400 by the applied power, respectively.

As described above, the second camera actuator 2000 according to the embodiment includes a third driving unit 2300 and a fourth driving unit 2500 including a piezoelectric device, and the first and second lens barrels 2200 and 2400 may be moved in the optical axis direction by the third and fourth driving units 2300 and 2500. However, the embodiment is not limited thereto, and the third and fourth driving units 2300 and 2500 may include a voice coil motor (VCM) or a shape memory alloy. In this case, the third and fourth driving units 2300 and 2500 may move the first and second lens barrels 2200 and 2400 by using the electromagnetic force of the VCM or a physical change of the shape memory alloy.

The second camera actuator 2000 according to the embodiment may include an image sensor 2900. The image sensor 2900 may collect light passing in the order of the first lens unit 2105, the second lens unit 2205, and the third lens unit 2405 and convert it into an image. The image sensor 2900 may be disposed to coincide with an optical axis of a lens of the lens units 105, 205, and 405. The optical axis of the image sensor 2900 and the optical axis of the lens may be aligned.

FIG. 38 is a perspective view of a mobile terminal to which a camera module according to an embodiment is applied.

Referring to FIG. 38, the mobile terminal 3 may include a camera module 10, an autofocus device 31, and a flash module 33 provided on the rear side.

The camera module 10 may include an image capturing function and an auto focus function. For example, the camera module 10 may include an autofocus function using an image.

The camera module 10 processes an image frame of a still image or a moving image obtained by an image sensor in a shooting mode or a video call mode. The processed image frame may be displayed on a predetermined display unit and stored in a memory. A camera (not shown) may also be disposed on the front of the mobile terminal body.

For example, the camera module 10 may include a first camera module 10A and a second camera module 10B. In this case, at least one of the first camera module 10A and the second camera module 10B may include the aforementioned camera module, for example, the camera module 10 according to FIGS. 1 to 20. Accordingly, the camera module 10 may implement an OIS function together with a zoom function and an autofocus function.

The auto focus device 31 may include an auto focus function using a laser. The auto focus device 31 may be mainly used in a condition in which the auto focus function using the image of the camera module 10 is deteriorated, for example, in proximity of 10 m or less or in a dark environment. The autofocus device 31 may include a light emitting unit including a vertical cavity surface emitting laser (VCSEL) semiconductor device and a light receiving unit that converts light energy such as a photodiode into electrical energy.

The flash module 33 may include a light emitting device emitting light therein. The flash module 33 may be operated by a camera operation of a mobile terminal or by a user's control.

Next, FIG. 39 is a perspective view of the vehicle 5 to which the camera module according to the embodiment is applied. For example, FIG. 39 is an external view of a vehicle including a vehicle driving assistance device to which the camera module 10 according to the embodiment is applied.

Referring to FIG. 39, the vehicle 5 according to the embodiment may include wheels 53FL and 53RL that rotate by a power source and a predetermined sensor. The sensor may be the camera sensor 51, but is not limited thereto.

The camera 51 may be a camera sensor to which the camera module according to the embodiment, for example, the camera module 10 according to FIGS. 1 to 37 is applied.

The vehicle 5 of the embodiment may acquire image information through a camera sensor 51 that captures a front image or a surrounding image, and it is possible to determine a lane non-identification situation using the image information, and generate a virtual lane when the lane is not identified.

For example, the camera sensor 51 may acquire a front image by photographing the front of the vehicle 5, and a processor (not shown) may obtain image information by analyzing an object included in the front image.

For example, when an object such as a median, curb, or street tree corresponding to a lane, an adjacent vehicle, a driving obstacle, and an indirect road marking is captured in the image captured by the camera sensor 51, the processor may detect such an object and include it in the image information.

In this case, the processor may further supplement the image information by acquiring distance information from the object detected through the camera sensor 51. The image information may be information about an object photographed in an image.

The camera sensor 51 may include an image sensor and an image processing module. The camera sensor 51 may process a still image or a moving image obtained by an image sensor (eg, CMOS or CCD). The image processing module may process a still image or a moving image obtained through the image sensor, extract necessary information, and transmit the extracted information to the processor.

In this case, the camera sensor 51 may include a stereo camera to improve the measurement accuracy of the object and further secure information such as the distance between the vehicle 5 and the object, but is not limited thereto.

Features, structures, effects, etc. described in the above embodiments are included in at least one embodiment, and it is not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and variations should be interpreted as being included in the scope of the embodiments.

In the above, the embodiment has been mainly described, but this is only an example and does not limit the embodiment, and those of ordinary skill in the art to which the embodiment pertains will appreciate that various modifications and applications not illustrated above are possible without departing from the essential characteristics of the present embodiment. For example, each component specifically shown in the embodiment can be implemented by modification. And the differences related to these modifications and applications should be interpreted as being included in the scope of the embodiments set forth in the appended claims.

The invention claimed is:

1. A camera actuator comprising:
    a housing;
    a prism unit disposed in the housing;
    a first driving unit disposed in the housing and controlling a tilt of the prism unit; and
    a second driving unit disposed under the housing and controlling a tilt of the housing,
    wherein the first driving unit includes a first piezoelectric device disposed in a region overlapping a center of the prism unit in a first direction,
    wherein the second driving unit includes a second piezoelectric device disposed in a region overlapping the center of the prism unit in a second direction different from the first direction,
    wherein the prism unit is provided to be tiltable in the second direction by the first driving unit,
    wherein the housing is provided to be tiltable in the first direction by the second driving unit,
    wherein the first driving unit includes a first yoke and a first magnet disposed in the housing, and
    wherein the prism unit is pressed against the housing by an attractive force of the first yoke and the first magnet.

2. The camera actuator of claim 1, wherein the housing includes:
    a lower part;
    first and second side parts extending upwardly on the lower part and facing each other; and
    an upper part disposed on the first and second side parts and connecting the first and second side parts,
    wherein the first piezoelectric device is disposed between the first side part and a first outer surface of the prism unit.

3. The camera actuator of claim 2, wherein the housing further includes a partition wall disposed between the first side part and the prism unit, and
    wherein the first piezoelectric device is disposed between the partition wall and the first outer surface.

4. The camera actuator of claim 3, wherein the first yoke is disposed between the first side part and the partition wall,
    wherein the first magnet is disposed between the partition wall and the first outer surface,
    wherein the first yoke and the first magnet are disposed in a region that does not overlap the first piezoelectric device in the first direction, and
    wherein the prism unit is pressed in a direction toward of the partition wall by an attractive force of the first yoke and the first magnet.

5. The camera actuator of claim 4, wherein the first driving unit further includes:
    a second yoke disposed between the first side part and the partition wall; and
    a second magnet disposed between the partition wall and the first outer surface, and
    wherein the first piezoelectric device is disposed between the first and second magnets.

6. The camera actuator of claim 4, wherein the first magnet includes:
    a first-first magnet having a first polarity; and
    a first-second magnet having a second polarity opposite to the first polarity,
    wherein the first-first magnet is disposed on the first-second magnet,
    wherein a first sensing unit is disposed between the first magnet and the first yoke, and
    wherein the first sensing unit is disposed in a region corresponding to a boundary of the first-first and first-second magnets.

7. The camera actuator of claim 3, further comprising a first guide protrusion disposed on one side of the partition wall and having a shape protruding toward the prism unit,
    wherein the first guide protrusion is disposed in a region overlapping the center of the prism unit in the first direction.

8. The camera actuator of claim 2, further comprising:
    a base member disposed under the housing,
    wherein the second piezoelectric device is disposed between the housing and the base member.

9. The camera actuator of claim 8, wherein the second driving unit includes:
    a third yoke disposed on the housing; and
    a third magnet disposed between the housing and the base member,
    wherein the third yoke and the third magnet are disposed in a region that does not overlap the second piezoelectric device in the second direction, and
    wherein the housing is pressed in a direction toward of the base member by an attractive force of the third yoke and the third magnet.

10. The camera actuator of claim 9, wherein the second driving unit includes:
    a fourth yoke disposed on the housing and spaced apart from the third yoke; and
    a fourth magnet disposed between the housing and the base member,
    wherein the second piezoelectric device is disposed between the third and fourth magnets.

11. The camera actuator of claim 10, further comprising a second sensing unit disposed between the third magnet and the third yoke.

12. The camera actuator of claim 2, wherein the first driving unit includes a first elastic member for pressing the prism unit in a direction toward of the first piezoelectric device.

13. The camera actuator of claim 12, wherein the second driving unit includes a second elastic member for pressing the housing in a direction toward of the second piezoelectric device.

14. The camera actuator of claim 1, wherein the first piezoelectric device is in direct contact with the prism unit, and
    wherein the second piezoelectric device is in direct contact with the housing.

15. The camera actuator of claim 8, further comprising a second guide protrusion disposed on the lower part of the housing and having a shape protruding toward the base member, wherein the second guide protrusion is disposed in a region overlapping the center of the prism unit in the second direction.

16. A camera module comprising:
a first camera actuator including:
  a housing;
  a base member disposed under the housing;
  a prism unit disposed in the housing;
  a first driving unit disposed in the housing and controlling a tilt of the prism unit; and
  a second driving unit disposed under the housing and controlling a tilt of the housing; and
a second camera actuator,
wherein the first camera actuator performs an OIS (Optical Image Stabilizer) function,
wherein the second camera actuator performs an auto focusing or zoom function,
wherein the first driving unit includes a first piezoelectric device disposed in a region overlapping a center of the prism unit in a first direction,
wherein the second driving unit includes a second piezoelectric device disposed in a region overlapping the center of the prism unit in a second direction different from the first direction,
wherein the prism unit is provided to be tiltable in the second direction by the first driving unit,
wherein the housing is provided to be tiltable in the first direction by the second driving unit,
wherein the first driving unit includes at least one magnet and at least one yoke for pressing the prism unit in a direction toward the housing, and
wherein the second driving unit includes at least one magnet and at least one yoke for pressing the prism unit in a direction toward the base member.

17. The camera module of claim 16, wherein the housing includes:
a lower part;
first and second side parts extending upwardly on the lower part and facing each other; and
an upper part disposed on the first and second side parts and connecting the first and second side parts,
wherein the first piezoelectric device is disposed between the first side part and a first outer surface of the prism unit.

18. The camera module of claim 17, wherein the housing further includes a partition wall disposed between the first side part and the prism unit,
wherein the first piezoelectric device is disposed between the partition wall and the first outer surface, and
wherein first driving unit includes:
  a first yoke and a second yoke disposed between the first side part and the partition wall; and
  a first magnet and a second magnet disposed between the partition wall and the first outer surface,
wherein the first yoke, the second yoke, the first magnet, and the second magnet are disposed in a region that does not overlap the first piezoelectric device in the first direction,
wherein the prism unit is pressed in a direction toward of the partition wall by an attractive force of the first yoke and the first magnet and the attractive force of the second yoke and the second magnet, and
wherein the first piezoelectric device is disposed between the first and second magnets.

19. The camera module of claim 17, wherein the second driving unit includes:
a third yoke disposed on the housing;
a fourth yoke disposed on the housing and spaced apart from the third yoke;
a third magnet disposed between the housing and the base member; and
a fourth magnet disposed between the housing and the base member,
wherein the third yoke, the fourth yoke, the third magnet, and the fourth magnet are disposed in a region that does not overlap the second piezoelectric device in the second direction, and
wherein the housing is pressed in a direction toward the base member by an attractive force of the third yoke and the third magnet and the attractive force of the fourth yoke and the fourth magnet.

* * * * *